US010796395B2

(12) United States Patent
Regier et al.

(10) Patent No.: US 10,796,395 B2
(45) Date of Patent: Oct. 6, 2020

(54) METHOD AND SYSTEM FOR GENERATING REPORTS

(71) Applicant: DataCo GmbH, Munich (DE)

(72) Inventors: Thomas Regier, Munich (DE);
Konstantin Greif, Munich (DE);
Christoph Wagner, Munich (DE);
Kivanc Semen, Stuttgart (DE)

(73) Assignee: DataCo GmbH, Munich (DE)

( * ) Notice: Subject to any disclaimer, the term of this patent is extended or adjusted under 35 U.S.C. 154(b) by 0 days.

(21) Appl. No.: 16/376,247

(22) Filed: Apr. 5, 2019

(65) Prior Publication Data
US 2019/0392541 A1 Dec. 26, 2019

(30) Foreign Application Priority Data

Jun. 20, 2018 (EP) .................................... 18178793

(51) Int. Cl.
| | |
|---|---|
| *G06Q 10/10* | (2012.01) |
| *G06Q 10/06* | (2012.01) |
| *G06Q 30/06* | (2012.01) |
| *G06Q 30/02* | (2012.01) |
| *G06Q 10/08* | (2012.01) |
| *G06Q 50/26* | (2012.01) |
| *G06N 20/00* | (2019.01) |
| *G06F 16/951* | (2019.01) |

(52) U.S. Cl.
CPC ......... *G06Q 50/265* (2013.01); *G06F 16/951* (2019.01); *G06N 20/00* (2019.01)

(58) Field of Classification Search
CPC .. G06Q 10/105; G06Q 50/205; G06Q 50/265; G06F 16/951; G06N 20/00

USPC .......................... 705/1.1–912, 320, 325, 326
See application file for complete search history.

(56) References Cited

U.S. PATENT DOCUMENTS

| | | | |
|---|---|---|---|
| 5,574,828 A | 11/1996 | Hayward et al. | |
| 5,893,098 A | 4/1999 | Peters et al. | |
| 6,564,207 B1 | 5/2003 | Abdoh | |
| 6,925,595 B1 * | 8/2005 | Whitledge | .......... G06F 16/9577 715/234 |

(Continued)

FOREIGN PATENT DOCUMENTS

| | | |
|---|---|---|
| CA | 2844010 A1 | 9/2014 |
| CN | 107391954 | 11/2017 |

(Continued)

OTHER PUBLICATIONS

USRP Product Selector, retrieved Apr. 3, 2019, from https://www.ettus.com/products/usrp-product-selector/.

(Continued)

*Primary Examiner* — Jonathan P Ouellette
(74) *Attorney, Agent, or Firm* — Womble Bond Dickinson (US) LLP

(57) ABSTRACT

A method for generating reports includes outputting a prompt prompting at least one user to input at least one information input; receiving the at least one information input by the at least one user; processing the at least one information input and generating a documentation report and a recommendation report based on the at least one information input; and outputting the documentation report and the recommendation report. A system for carrying out the above method is also described.

18 Claims, 16 Drawing Sheets

(56) References Cited

U.S. PATENT DOCUMENTS

| | | | | |
|---|---|---|---|---|
| 7,310,632 | B2* | 12/2007 | Meek | G06F 16/951 |
| | | | | 707/709 |
| 7,669,119 | B1* | 2/2010 | Orelind | G06F 16/345 |
| | | | | 715/234 |
| 8,612,420 | B2* | 12/2013 | Sun | G06F 16/951 |
| | | | | 707/710 |
| 9,280,684 | B1* | 3/2016 | Kragh | G06F 16/245 |
| 9,729,583 | B1* | 8/2017 | Barday | H04L 63/04 |
| 10,181,019 | B2* | 1/2019 | Barday | G06F 21/316 |
| 2002/0138462 | A1 | 9/2002 | Ricketts | |
| 2002/0143659 | A1* | 10/2002 | Keezer | G06F 16/958 |
| | | | | 705/27.1 |
| 2005/0086587 | A1 | 4/2005 | Balz | |
| 2006/0004588 | A1 | 1/2006 | Ananda | |
| 2006/0053058 | A1 | 3/2006 | Hotchkiss et al. | |
| 2008/0016024 | A1 | 1/2008 | Andoh et al. | |
| 2009/0106292 | A1 | 4/2009 | Kaufman et al. | |
| 2009/0126022 | A1* | 5/2009 | Sakaki | G06F 21/12 |
| | | | | 726/25 |
| 2011/0137987 | A1 | 6/2011 | Tyree | |
| 2012/0084120 | A1 | 4/2012 | Hirsch et al. | |
| 2012/0117455 | A1* | 5/2012 | Fogel | G06Q 10/0633 |
| | | | | 715/221 |
| 2012/0151329 | A1* | 6/2012 | Cordasco | G06F 11/3006 |
| | | | | 715/234 |
| 2012/0259833 | A1* | 10/2012 | Paduroiu | G06Q 30/0201 |
| | | | | 707/709 |
| 2012/0323881 | A1* | 12/2012 | Liu | G06F 3/0482 |
| | | | | 707/709 |
| 2013/0211787 | A1 | 8/2013 | Kaufman et al. | |
| 2015/0088597 | A1* | 3/2015 | Doherty | G06Q 10/0635 |
| | | | | 705/7.28 |
| 2015/0281287 | A1* | 10/2015 | Gill | G06F 21/55 |
| | | | | 726/1 |
| 2016/0203319 | A1* | 7/2016 | Coen | G06F 21/577 |
| | | | | 726/25 |
| 2017/0357502 | A1* | 12/2017 | Barday | G06F 8/70 |
| 2017/0357983 | A1* | 12/2017 | Barday | H04W 12/02 |
| 2018/0018602 | A1* | 1/2018 | DiMaggio | G06Q 30/018 |
| 2018/0137305 | A1* | 5/2018 | Barday | G06F 21/6245 |
| 2018/0276355 | A1* | 9/2018 | Barday | G06F 21/316 |

FOREIGN PATENT DOCUMENTS

| | | |
|---|---|---|
| CN | 107784080 | 3/2018 |
| WO | WO 02/065301 | 8/2002 |
| WO | WO 2014/024190 | 2/2014 |

OTHER PUBLICATIONS

Extended European Search Report dated Oct. 10, 2018, issued in European Application No. 18178793.8.

* cited by examiner

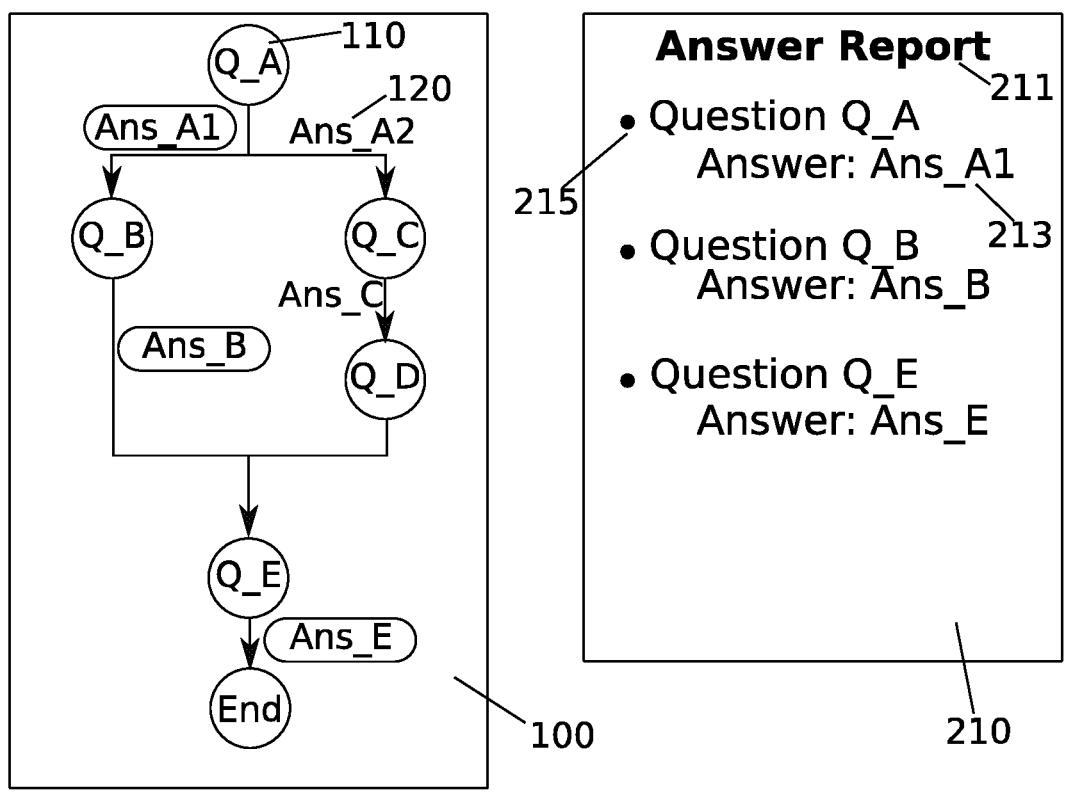
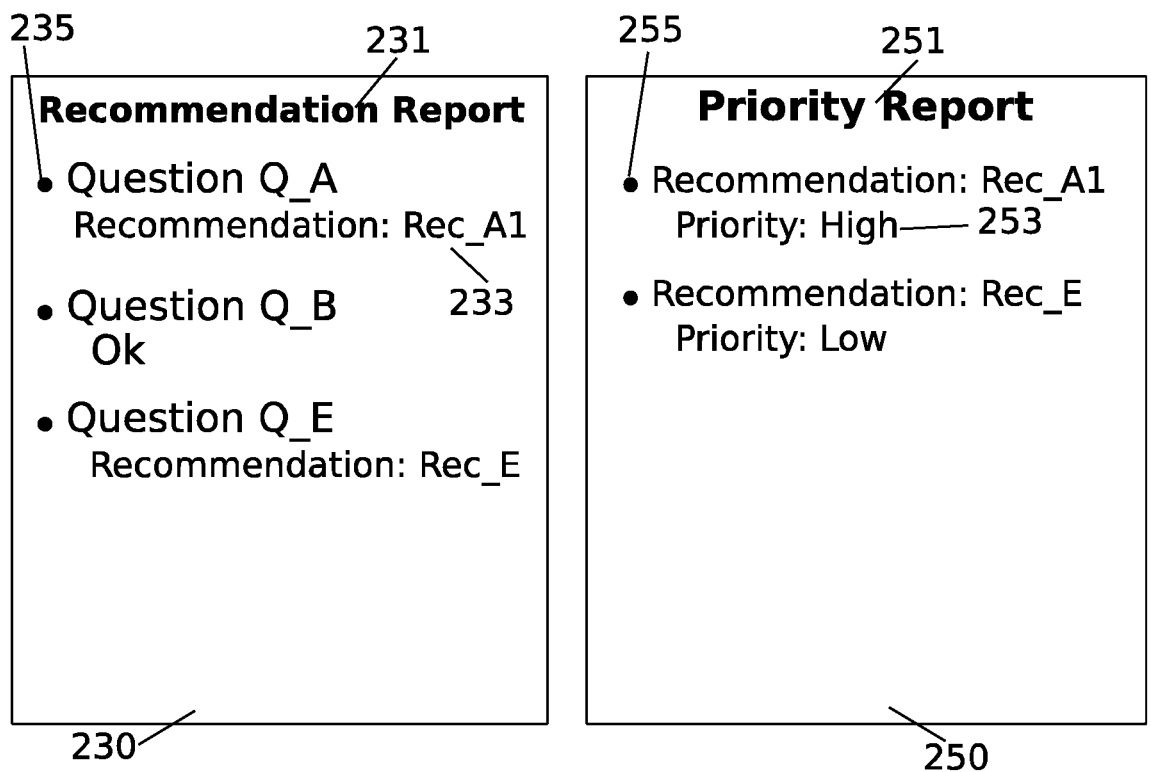
Fig. 5a

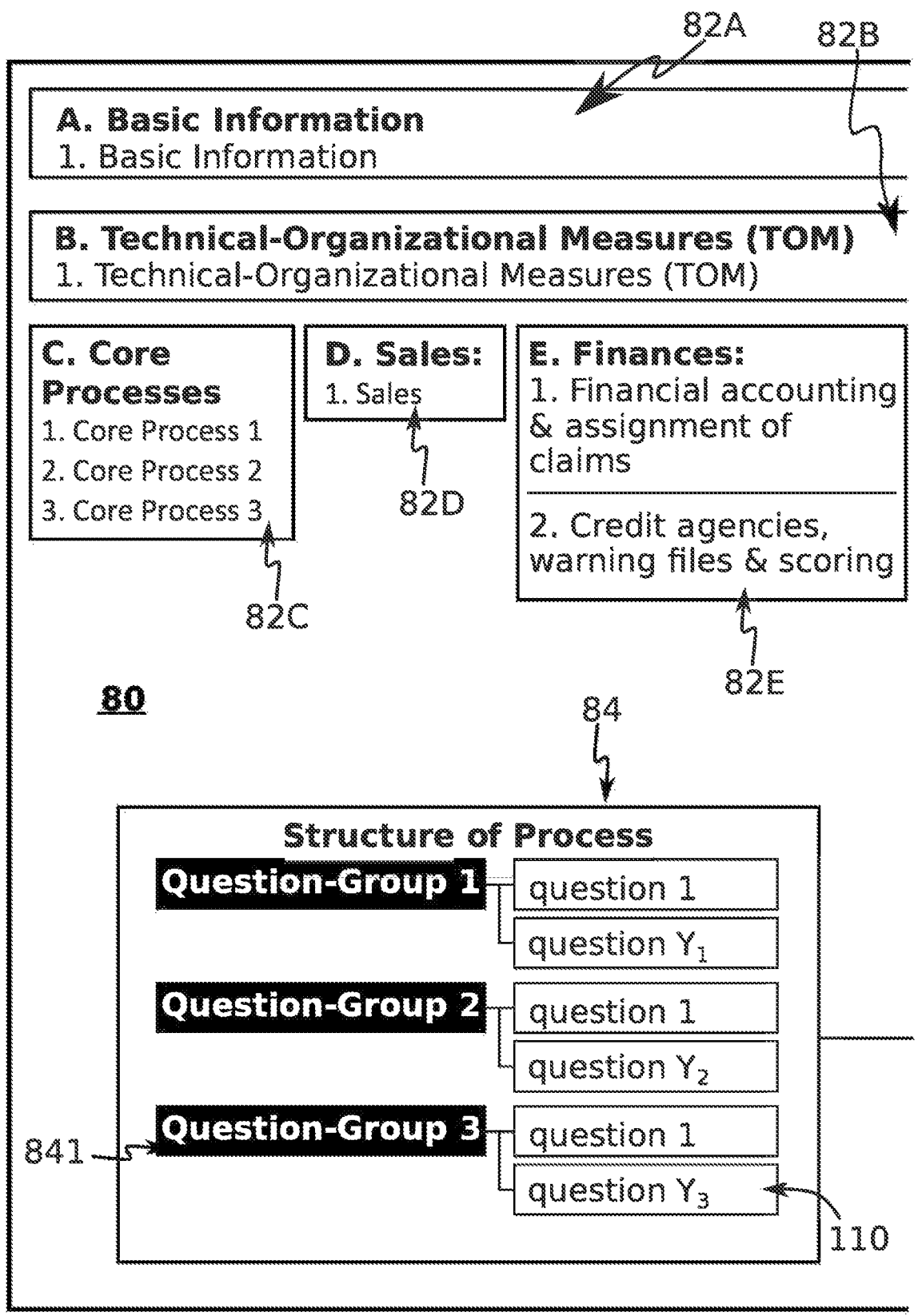
Fig. 8a - left half

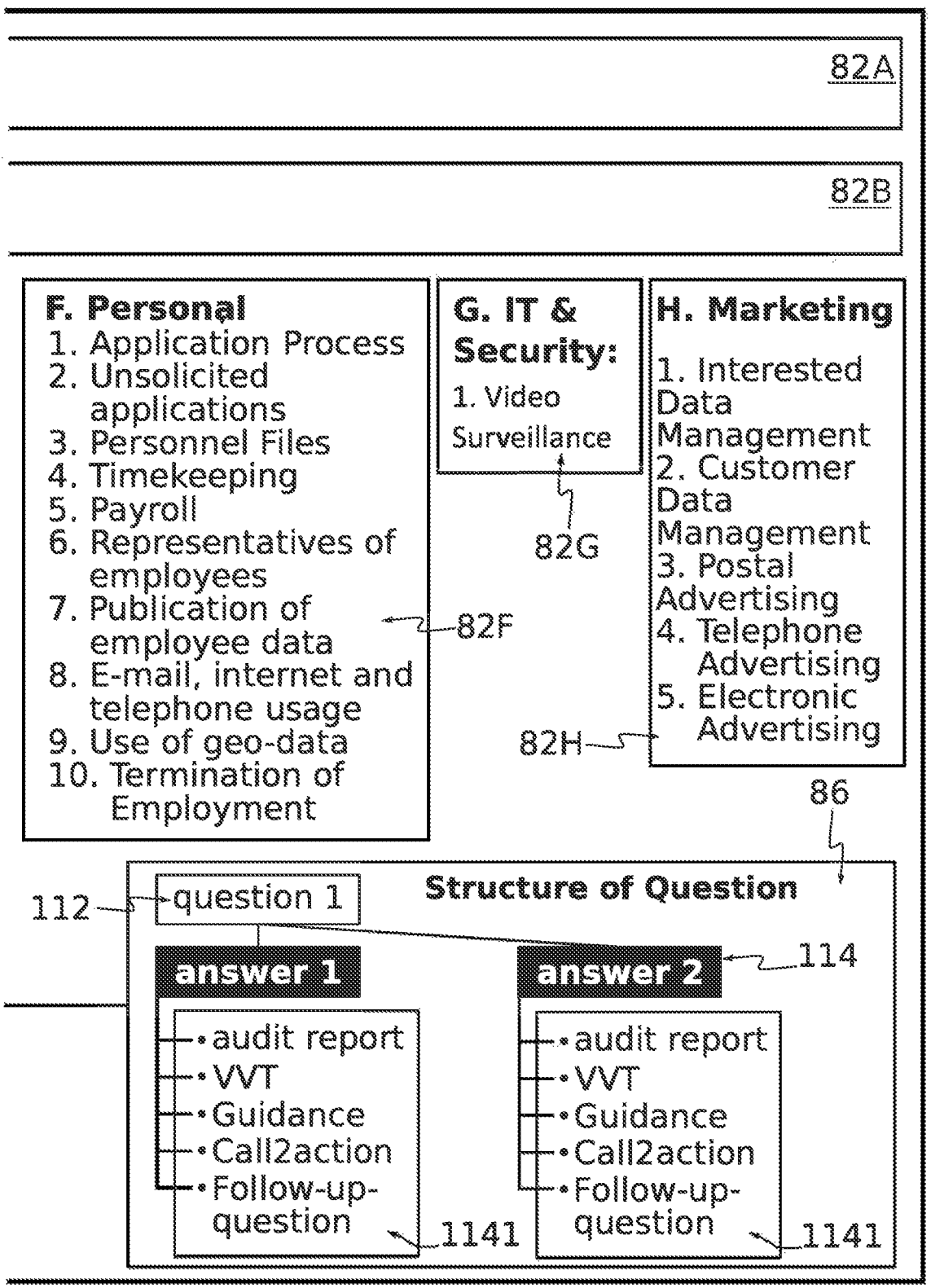
Fig. 8b - right half

METHOD AND SYSTEM FOR GENERATING REPORTS

RELATED APPLICATIONS

The present application claims priority to EP 18178793.8 filed Jun. 20, 2018. The contents of the aforementioned application are incorporated by reference in their entirety.

FIELD OF THE INVENTION

The present invention generally relates to conducting a questionnaire. While the present invention will be primarily described with reference to questionnaires relating to data security and/or data privacy topics, it should be understood that the present invention may also be applicable to other fields.

BACKGROUND

For different purposes, it may be of interest to conduct a questionnaire. One example relates to data security and/or data privacy considerations. If a company deals with personal data (e.g., data that is associated with people, e.g., job applicants, customers, suppliers), there may be certain requirements the company has to fulfil as regards this personal data. The requirements may, e.g., be of organizational (e.g., which people in the company have access to the data and how are these people trained) and/or of technical nature (e.g., which technical measures are used to protect the personal data). It may be of interest to summarize the data protection policies that are in place in a company. To summarize or report such findings, a questionnaire may be conducted.

Normally, such questionnaires will be conducted by a data protection officer, which may also be referred as a data protection expert. That is, the data protection officer interviews the responsible person (e.g., the managing director), asks him/her the relevant questions and summarizes the answers in a report.

While this procedure may be satisfactory to some extent, it has certain drawbacks and limitations. As an initial matter, such a process may be prone to errors or mistakes. The data protection officer may forget to ask a relevant question, he/she may misunderstand an answer or mistakenly note a wrong answer, thereby leading to inferior results. Further, having a data protection officer performing such a simple task may not be the most efficient way of performing such as task. Further still, it will be understood that the described process requires the data protection officer to interact with the person providing the information at a certain point of time—that is, both the presence of the person answering the questions and the data protection officer is required, which may lead to a bottleneck and may hinder the timely completion of the questionnaire.

SUMMARY

In a first embodiment a method for generating reports is disclosed. The method comprises outputting a prompt prompting at least one user to input at least one information input. The method further comprises receiving at least one information input by the at least one user. Further still, the method comprises processing the at least one information input and generating a documentation report and a recommendation report based on the at least one information input and outputting the documentation report and the recommendation report.

That is, the current method can allow the conduction of questionnaires of surveys by presenting at least one prompt to at least one user. Alternatively or additionally, the current method can allow data gathering from at least one user by presenting at least one prompt to the at least one user and receiving at least one information input by the at least one user. Furthermore, the information input by the user can be processed such that a documentation report can be generated and output. The documentation report may comprise a summary or an accumulation of the information input by the user. This may include data provided by the user as well as interpretation of the data, such as, graphs, plots and statistical data that can be inferred, calculated or generated during the processing of the information input by the user. Thus, the current method may provide efficient means of gathering information from a user and storing, interpreting and/or outputting the received information. Additionally, a recommendation report can be generated based on the at least one information input. The recommendation report can provide instructions instructing for a better course of action. For example, based on the at least one information input by the user, current course of action can be inferred and, in some instances, a better course of action than the current course of action may be provided in the recommendation report. Thus, the current method may facilitate directing a user towards better courses of actions.

Further a user terminal can be provided. The user terminal can output the prompt prompting at least one user to input at least one information input and can receive at least one information by the at least one user. Alternatively or additionally, the user terminal can output the documentation report and the recommendation report. Thus, a user terminal, such as, a personal computer, workstation, laptop, tablet, smartphone or the like, can facilitate the data gathering from at least one user by outputting a prompt to the at least one user and receiving at least one information input from the at least one user. For example, the user terminal can comprise input and output user interfaces—e.g. a screen, keyboard, mouse or the like. Similarly, the user terminal can facilitate outputting the documentation report and the recommendation report. For example, the user terminal may provide a graphical user interface wherein at least one prompt can be displayed to the user and the user can interact, using input user interfaces of the user terminal, with the graphical user interface for providing the at least one user answer and for receiving the documentation and recommendation report. Thus, the user terminal can provide an efficient and automatic manner for at least one of outputting a prompt to at least one user, receiving information input from the at least one user, outputting the documentation report and outputting the recommendation report. Furthermore, using the user terminal can allow the prompt, information input, documentation report and/or recommendation report to be changed and/or updated more easily during and/or after outputting the prompt, providing the information input, outputting the documentation report and/or outputting the recommendation report, respectively.

Further still, a data processing unit can be provided. The data processing unit can process the at least one information input and can generate the documentation report and the recommendation report based on the at least one information input. The data processing unit may thus provide processing means, such as, a processor (e.g. general-purpose processor, central processing unit, processing core, etc.) which can execute human-designed algorithms provided to the data processing unit in a machine-readable format (e.g. written in a programming language which can further be interpreted and/or compiled into object code). Thus, processing the at least one information input with a data processing unit, can allow a more efficient—such as, faster—manner of processing the data. As a result, more data can be processed for the same unit of time, as compared to the case when the data are processed by human operators. This may also allow more complex processing of the data to be executed—which in the case of human operator may require more time. Hence, the documentation report and the recommendation report may be generated faster. Additionally, while processing data using human operators may be an error prone process, when using the data processing unit more accurate results can be expected. This may result in the generation of accurate documentation reports and recommendations reports. Additionally still, using the data processing device may allow changes conducted on the prompt output to the user and/or information input by the user to be easier and faster reflected on the documentation report and/or recommendation report.

Thus, in some embodiments, the documentation report and the recommendation report can be automatically generated. This can be advantageous, as it can increase the automation of the method, e.g. by shifting the tasks of processing the information input and generating a recommendation report and documentation report to a machine, such as, to a data processing unit.

In some embodiments, when the user terminal and the data processing unit can be provided, the data processing unit can be a server external to the user terminal. A bi-directional data transfer connection can be established between the user terminal and the server. Hence, the server can provide the prompts to the user terminal which can output the prompts to the at least one user. Additionally, the server can receive, from the user terminal, at least one information input by the user to the user terminal. The server can process the at least one information input and can generate the documentation report. The server can be operated or accessed by a human operator. The server can provide the documentation report and the recommendation report to the user terminal, which can output them to the at least one user, and/or can provide the documentation report and the recommendation report to a human operator (or human operator terminal) such that, the documentation report and the recommendation report can be output to the human operator. The server can be advantageous as it may provide better processing means—e.g. may comprise more powerful processors—and hence processing of information input and generation of the documentation report and the recommendation report can be executed faster. The server can also be advantageous, as it can allow one or more user terminals to remotely be connected to it (e.g. through Internet). Thus, one or more terminal can remotely be provided with the prompts and one or more terminals can remotely provide the information input by the user to the server.

Generally, a plurality of prompts can be output wherein, each prompt can prompt the at least one user to input at least one information input. Hence, prompts can ask the at least one user to provide information input on different aspects. This can allow more data and information to be gathered from the at least one user, which can result in more accurate recommendations provided in the recommendation report.

Further, when a plurality of prompts can be output, it can be determined, for at least one of the prompts, whether the prompt is output to the at least one user. Said determination can depend on at least one information input by the at least one user. That is, a plurality of prompts can be output to the at least one user, e.g. a questionnaire with multiple questions. In some instance, two prompts may be configured to ask information related to opposing aspects. However, only one of the aspects can be relevant to the user and thus only one of the two prompts can be provided to the user. Hence, based on an already input information by the user it can be determined which prompts can be relevant to the user and only those prompts determined to be relevant to the user can be output. This can be advantageous, as it can reduce the redundant or irrelevant questions. Hence, less questions can be provided to the user, while the same amount of information can be gathered from the user, as compared to the case when all prompts, including irrelevant or redundant prompts, are output to the user.

The determination of whether the prompt is output to the at least one user, can be performed by the data processing unit, in embodiments wherein a data processing unit is provided.

However, in other embodiments, the determination may also be performed by the user terminal. In such embodiments, a questionnaire comprising prompts (e.g., in a tree like structure) may be provided (i.e., loaded) onto the user terminal. Depending on inputs by the user, the user terminal may then output subsequent prompts. In other words, in such embodiments, the questionnaire may be loaded and locally stored on the user terminal and the user terminal may adapt visibility features of the questionnaire. This may be faster than having such steps performed on a device external to the user terminal.

In some method embodiments, the step of generating a recommendation report can comprise processing background data. Thus, the generation of a recommendation report can be based on the at least one information input by the at least one user and on background data. The background data can relate to at least one of the following: legal documents and/or the interpretation thereof and state of the art. This can allow the recommendation report to comprise recommendations and instructions instructing the at least one user based on actions suggested or defined on the background data. For example, a more efficient course of action may be suggested to the at least one user based on state of the art. Similarly, a course of action complying with regulations and laws can be instructed to the at least one user, based on suggestions and instructions stated in legal documents. In general, background data can comprise information which courses of action are recommended as based on information input by the at least one user. Further, based on the information comprised by the background data, a better or required course of action can be suggested to the at least one user on the recommendation report.

Further still, the background data can be time dependent such that the same information input at different times may lead to different recommendations. In other words, the background data can be updated or changed. For example, the background data can be updated such that they can reflect new regulations, laws and/or developments on the state of the art. As the recommendation report can depend on information input and background data and the background data can be updated, the same information input can thus lead to different recommendations. This can allow better recommendations to be provided to the at least one user which can be based on updated or newer developments or regulations.

In some method embodiments, the step of outputting a prompt can comprise outputting a first prompt set comprising a plurality of prompts to a first user using a first user profile and outputting a second prompt set comprising a plurality of prompts to a second user using a second user profile. Further, the step of receiving at least one information input can comprise receiving a first information input set comprising a plurality of information inputs by the first user using the first user profile and receiving a second information input set comprising a plurality of information inputs by the second user using the second user profile. In such embodiments, the documentation report and the recommendation report can be based on both the first information input set and the second information input set. In other words, different user profiles or categories can be considered and at least one prompt can differ or can be adapted based on the user profile or category. This can be advantageous, as it can allow the adaptation of the prompts based on the user profile, Hence, information relevant to the user can be prompted or prompts for which a user can provide information can be output to the user. This may also result in an improved accuracy of the gathered information.

Further, the documentation report and the recommendation report cannot be output to the first user or cannot be output to the second user. That is, based on his/her user profile it can be determined whether a user can be provided with the documentation report and the recommendation report. This can allow for example the provision of documentation report and recommendation report only to relevant individuals, which may increase privacy and security of the documentation report and recommendation report.

Further still, different documentation reports and recommendation reports can be output to the first and the second user. That is, a documentation report and a recommendation report only relevant to the respective user can be provided, e.g. a documentation report and a recommendation report generated based on respective user information input. More particularly, tailored documentation reports and recommendation reports which specifically address the issues of the respective user can be output to the user. Thus, the user can be instructed only on topics or issues that are relevant to that user or that address that user.

In some method embodiments, wherein the recommendation report can comprise a plurality of recommendations, the method can further comprise prioritizing the recommendations and outputting the prioritization of the recommendations. That is, in a recommendation report with multiple recommendations, some of them can be more relevant or more critical than others. For example, some actions can be required by laws or regulations and recommendations instructing such actions can comprise a high priority. Thus, prioritizing the recommendations can be advantageous as it can allow the at least one user to understand the relevancy of each recommendation. This may help the at least one user to know which recommendations can be critical and may require immediate actions.

In embodiments, wherein a data processing device can be provided, the step of prioritizing the recommendations can be performed by a data processing unit.

In embodiments, wherein a user terminal can be provided, the step of outputting the prioritization of recommendations can be performed by the user terminal.

The prioritization of recommendation can be output in the recommendation report. For example, recommendations in the recommendation report can be ordered according to their priority. Hence, the order of recommendations in the recommendation report may imply priority of respective recommendations. This can be advantageous as it can enrich the recommendation report with further information indicating priorities of the respective recommendation comprised therein.

The step of prioritizing the recommendations can alternatively or additionally comprise assigning a rank to each recommendation. The rank may imply a level of priority which can be denoted with a number (e.g. a number from 1 to 10) or with words (e.g. "Low", "Medium", "High") or color codes (e.g. "Green", "Orange", "Red"). A mapping or description of priority levels can be provided to facilitate understanding of priority levels.

Similarly, as discussed for the recommendation report, the prioritization of the recommendations can be based on at least one information input by the user. Further, the prioritization of recommendations can be based on background data. Said background data can relate to at least one of the following: legal documents and/or the interpretation thereof and state of the art. The background data can be time dependent such that the same information input at different times can lead to different prioritization of recommendations and/or different recommendations. For example, at first time, the background data may indicate that the use of a certain technology (e.g., an encryption technology) is safe. At a second time, which is later than the first time, the respective technology (e.g., the encryption technology) may no longer be considered safe. It will be understood that the recommendation based on this technology may then also change from the first time to the second time. E.g., if a user indicates that the encryption technology is used, this may not result in a recommendation to change the technology at the first time but may lead to such a recommendation at the second time. This renders the present technology very versatile and adaptive.

In some method embodiments, the method can further comprise receiving at least one command from the at least one user and the at least one command may facilitates receiving at least one information input by the at least one user. The command can comprise a select, drag-and-drop, click, button press or the like.

In some method embodiments, wherein a user terminal is provided, the at least one command can allow the user to operate the terminal. For example, the user can switch-on the terminal, can open a questionnaire program wherein prompts can be output to the user, can provide information input by selecting, dragging, clicking or the like.

Hence, the at least one command can facilitate the output of a prompt to at least one user and/or the input of information input by the user, particularly when a user terminal is provided.

Further, the method can comprise outputting at least one information input and/or interpretation of the at least one information input in the documentation report. That is, a summary of the information input by the user can be provided in the documentation report. Alternatively or additionally, an interpretation of the at least one information input by the user can be output on the documentation report, such as, graphs, plots and/or statistical data calculated and generated based on at least one information input by the user. Hence, the documentation report can summarize findings based on the at least one user answer or information input by the user.

In some embodiments, the method can further comprise generating at least one recommendation, suggestion, guideline and/or proposal that can provide guidance to a course of action different to at least one action inferred from the at least one information input by the user. Said recommendation, suggestion, guideline and/or proposal can be output on the recommendation report.

In some embodiments, the method can be a computer-implemented method. This can allow the automation of outputting prompts to at least one user, receiving, storing and/or processing information input by the at least one user, generating a documentation report and recommendation report and outputting the documentation report and recommendation report. That is, the method can be implemented as a set of computer-instructions which can be carried out by a computer. This can be particularly advantageous when a user terminal and a data processing device are provided.

In some embodiments, the method can be used to assess data security of a firm, preferably personal data security, such as data that is associated with people.

In such embodiments, the method can comprise determining whether processes of the firm related to the said data gathering, storing and/or processing comply with legal requirements.

Further, the at least one user inputting at least one information input can be an employee of the firm.

The method can further comprise grouping a plurality of prompts in sections, wherein each section can comprise at least one prompt related to a department of the firm. Further, the user can choose a section based on the department of the firm the user works for.

The method can further comprise providing a data protection officer to review and/or evaluate at least one information input by the user.

The method can further comprise providing a bi-directional communication link, preferably a remote bi-directional communication link, between the user and a data protection officer. Thus, the data protection officer can facilitate an understanding of the at least one prompt by the user and/or topics related to data security.

That is, at least one prompt can be output to a user which can relate to a particular aspect. One such particular aspect can relate to data security and/or data privacy considerations. Thus, the method can be used to assess data security of a firm by outputting prompt(s) to at least one user, which can be an employee of the firm, regarding data security and/or privacy considerations. Hence, based on the information input by the users, preferably employees of the firm, processes of the firm related to data gathering, storing and/or processing comply with legal requirements. Usually, such evaluation or assessment can be conducted by a data protection officer, who can manually provide prompts to the at least one user, receive information input by the at least one user and evaluate processes of a firm based on the user answers and his/her background. The current method can facilitate this process, by partially or fully automating some tasks that normally would be performed manually by the data protection officer. Such tasks may comprise outputting prompts to at least one user, storing and/or processing information input by the user, generating and outputting documentation and recommendation reports based on the at least one user answer. However, in some embodiments, the data protection officer may review some or all the information input by the user.

Further, the at least one prompt prompting at least one user to input at least one information can be of at least one of the following types: single select questions that can provide multiple answer choices to the user, wherein the user can input the information input by choosing one of the answer choices; multiple select questions that can provide multiple answer choices to the user, wherein the user can input the information input by choosing at least one of the answer choices; text input questions that can provide at least one text input field, i.e., one or several text input fields, wherein the user can input the information input by inputting text in the at least one text input field; multiple text input questions that can provide to the user an option of creating at least one text input field, that is, the user can input the information input by creating at least one text input field and inputting text on at least one of the at least one created input text fields; object select questions that can provide a graphical user interface comprising multiple objects, wherein the user can input the information input by selecting at least one of the objects; document upload prompts that can comprise at least one document upload field wherein the user can input the information input by uploading at least one document in the user terminal; multiple document upload prompts, wherein the user can create one or more document upload fields, that is, the user can provide the information input by creating at least one document upload field and uploading at least one document on the created, such as, each of the created, document upload fields; and preselected questions wherein the answer options of the questions can be preselected by at least one answer to at least one previous question; more particularly, the text label of each answer option of the preselected questions can correspond to at least one answer of at least one previous question.

For the single select questions and the multiple select questions, discussed in the previous paragraph, there can be one option allowing the user to provide a different answer from the provided answer choices. For example, one of the answer choices may be labelled as "other" and when selected by the user it can appear a text input field wherein the user can input text in response to the question.

The document upload prompts and/or the multiple document upload questions, discussed above, can further comprise text input fields assigned to the document upload fields, allowing the user to provide comments regarding the document uploaded in the respective document upload fields.

The preselected questions, discussed above, can be of at least one of the following question types: single select questions, multiple select questions, text input questions and document upload questions. In the preselected questions the answer choices, text input fields (such as a label of the text input field) and/or document upload fields (such as a label of the document upload field) can be selected based on an answer choice of at least one previous question. The at least one previous question can be of at least one of the following types: single select question, wherein the selected answer choice can be used to generate at least one answer choice, text input field and/or document upload field for at least one preselected question; multi select questions wherein the at least one selected answer choice can be used to generate at least one answer choice, text input field and/or document upload field for at least one preselected question; text input question wherein the text input provided by the user in response to such a question can be used to generate at least one answer choice, text input field and/or document upload field for at least one preselected questions; multiple text input question wherein the text input provided by the user in response to such questions can be used to generate at least one answer choice, text input field and/or document upload field for at least one preselected questions; object select questions wherein the object (such as, label of the object) selected by the user in response to such questions can be used to generate at least one answer choice, text input field and/or document upload field for at least one preselected question.

In some method embodiments, the step of processing the at least one information input and generating a documentation report and a recommendation report based on the at least one information input can comprise utilizing a machine learning algorithm, such as an artificial neural network algorithm.

In some method embodiments, wherein the generation of the recommendation report and/or prioritization of recommendations can be based on background data, the method can further comprise the step of updating the background data. That is, the background data can be time-dependent. This can be advantageous, as it can allow the background data to reflect new changes or developments or regulations. Hence, the information comprised in the background data does outdate in the present technology, as it may be updated. Further, updating the background data can particularly be advantageous if the generation of the recommendation report and/or prioritization of recommendations can be based on background data, thus, the recommendations can be generated by considering up-to-date information, such as, up-to-date state of the art, developments, regulations and/or laws. In other words, updating the background data can provide better or more accurate suggestions or recommendations during the step of generating the recommendations report. Furthermore, in some instances, the update of background data may be a necessary process, especially when background data comprise laws, regulations and/or their respective interpretations. Hence, as recommendations can be generated such that they instruct for actions that comply with laws or regulations, it can be advantageous to have the background data updated—i.e. comprise the latest laws.

The step of updating the background data can comprise visiting at least one electronic source and obtaining the data comprised by the electronic sources. While, in general any source, preferably trusted sources with reliable information, can be used, it can be particularly advantageous to use electronic sources as it can allow automation of such a process. That is, for a non-electronic source, such as, sources in paper format, it may be required that a human operator read the sources to obtain the information comprised in them and further use such information to update background data. However, the use of electronic sources can allow the use of computer-implemented processes or other automatic processes, to obtain (e.g. download) the information that can be comprised therein. Nevertheless, a human operator can also access electronic sources, e.g. by browsing web pages, in order to obtain information.

Thus, the step of visiting at least one electronic source and obtaining the data comprised by the at least one electronic source can be executed by a processing unit. That is, said process can be automated. Instead of having a human operator access the electronic sources, read or comprehend the information comprised therein, such process can be automated by having a processing unit, such as, a server, visiting a provided list of electronic sources, such as, a list of URL-s of web pages, and downloading the data, such as, text data, comprised therein. In some embodiments, the process of visiting at least one electronic source and obtaining the data comprised by the at least one electronic source can be carried out by a web crawler. The web crawler can be an automatic process, such as, a computer-implemented process, that systematically, or periodically or at predefined times, crawls or visits a provided list of electronic sources and obtains the information provided therein.

The automation of the step of visiting at least one electronic source and obtaining the data comprised by the at least one electronic source can be advantageous for multiple reasons. It can be an exhausting and time-consuming process for a human operator to visit a list of electronic sources and comprehend the information comprised therein. Such a process can be optimized by the use of at least one processing unit and/or web crawlers, which can execute it faster. Further, the processing unit and/or web crawlers can handle bigger amounts of electronic sources. That is, while a human operator can be limited due to his/her tiredness, which can influence the ability to comprehend the information comprised in the accessed sources, utilization or efficiency of a processing unit and/or web crawler is not influenced or at least is less influenced by the number of electronic sources visited. In addition, the data processing unit and/or web crawlers can be continuously used to obtain information from electronic sources without interruption—which can allow the background data to be updated more frequently, hence ensuring that up-to-date information can be comprised by the background data.

Further, the step of updating background data using electronic sources may comprise processing the obtained data and generating at least one update proposal. The update proposal may concern at least one rule for generating the recommendation report based on the at least one information input. The update proposal can comprise updates or new information that can be made or added to the background data. That is, the update proposal can comprise information that is new or is not reflected correctly or at all in the background data. The update proposals can be generated by processing the obtained data during the step of visiting at least one electronic source and obtaining the data comprised therein. In other words, interpretations or inferences of the obtained data can be deducted during the processing of the obtained data and can be used to generate the update proposals.

In some method embodiments, the step of processing the obtained data of the electronic sources and generating at least one update proposal can be automated. That is, the processing of the obtained data during the step of visiting at least one electronic source and obtaining the data comprised therein and generating at least one update proposal can be carried out by a processing unit, such as, a server. For different reasons, such as time efficiency, it can be advantageous to use a processing unit for processing the obtained data and generating at least one update proposal.

Further, the step of processing the obtained data of the electronic source and generating at least one update proposal can comprise searching for the presence of at least one keyword on the obtained data of the electronic sources. The use of keywords can be advantageous as it can allow selection of relevant information or the search of relevant information on the obtained data. Hence, generation of update proposals can be facilitated. Furthermore, when the processing of the obtained data is automated, it can be more efficient for a processing unit to search for relevant information in the obtained information from the electronic sources, using keywords.

The update proposals can be provided to a human operator and the human operator can accept or reject the at least one update proposal. That is, the update proposals can comprise new information that cannot be reflected on the background data. In other words, they can comprise proposals that can cause changes or updates on the background data. It can be advantageous, such that correctness of background data can be remained, that before updating the background data using the update proposals a human operator can review the update proposal. Hence, the human operator can either accept or reject the update proposals.

Accepting at least one update proposal can comprise at least one of removing, adding, changing information comprised in the background data. In other words, if an update proposal is accepted, the background data can be updated accordingly as can be instructed by the update proposal—i.e. the information comprised in the update proposal can be reflected on the background data. As discussed, in some embodiments, the change of background data can cause changes on the recommendation report and/or prioritization of recommendations. Hence, indirectly the update proposals may instruct changes on the recommendation report and/or prioritization of recommendations.

Further, accepting at least one update proposal can comprise at least one of removing, adding and changing at least one prompt.

Further still, the step of accepting at least one update proposal can influence the determination whether the prompt is output to the at least one user.

The plurality of prompts may be comprised in a questionnaire.

The method comprises locally storing the questionnaire on the user terminal. This may allow the questionnaire to be filled out more rapidly, thus increasing the efficiency of the present technology.

The questionnaire may comprise a tree structure of nodes corresponding to prompts.

The above discussed update proposal may relate to at least one node.

The prompt may be output as part of a questionnaire page.

The questionnaire page may comprise a photo of a human operator. Presenting a photo of a human operator may give the questionnaire page a more chat-like appearance. This may motivate the user to respond to the prompts and may thus increase user compliance and efficiency of the present technology.

The questionnaire page may comprise a chat-box surrounding the prompt. Again, this may motivate the user to respond to the prompts and may thus increase user compliance and efficiency of the present technology.

In a second embodiment, a system configured for generating reports is disclosed. The system comprises a user terminal configured to output a prompt prompting at least one user to input at least one information input and to receive the at least one information input by the at least one user. Further, the system comprises a data processing device configured to process the at least one information input and to generate a documentation report and a recommendation report based on the at least one information input. The system additionally comprises an output user interface that is configured to output the documentation report and the recommendation report.

Thus, the system can be used for carrying out at least one questionnaire—i.e. presenting to at least one user one or more prompts and receiving information input by the user in response to the presented prompts—using a user terminal. Hence, instead of having a human operator providing one or more prompts to at least one user and receiving at least one information input in response to the prompts, for example, for carrying out a questionnaire, the current system can use a user terminal for this purpose. Further, the system can automatically process the at least one information input by the user and generate a documentation report and a recommendation report based on the at least one information input by utilizing a data processing device to carry out such processes. Additionally, the generated documentation and recommendation report can be output using an output user interface.

This may provide advantages vis-à-vis the case when questionnaires are conducted by a human operator. One use case may relate to questionnaires assessing data security and/or privacy in a company, which can be usually carried out by data protection officers. That is, the data protection officer can interview users, such as, employees of the firm and can ask him/her the relevant questions, the answers of which the data protection officer can summarize in a report. While this procedure may be satisfactory to some extent, it has certain drawbacks and limitations, such as, it may be prone to errors or mistakes, thereby leading to inferior results, it may consume a lot of time and it requires both the presence of the person answering the questions and the data protection officer, which may lead to a bottleneck and may hinder the timely completion of the questionnaire. The current system can alleviate such drawbacks, by providing computerized interfaces for the user to take the questionnaire (i.e. the user terminal), automatic means for processing the information input by the user and generating a documentation and recommendation report (i.e. the data processing device) and also means for outputting said documentation and recommendation report.

Further still, the current system provides manners to generate recommendations, and the step of generating recommendations can be fully or to some extent automated. That is, courses of action of the at least one user can be inferred from the processing of the information input and better courses of action can be recommended in the recommendation report.

The user terminal can comprise the output user interface, such as, at least one screen and/or at least one speaker and/or at least one printer. The output user interface can be configured to facilitate outputting at least one prompt to the at least one user. Further, the user terminal comprises an input user interface, such as, at least one keyboard and/or pointing device and/or microphone and/or camera and/or scanner and/or data uploading means, which can be configured to allow the user to insert at least one information input.

In some embodiments, the output user interface and the input user interface can be realized as a smart speaker.

The output user interface can be configured to output the least one prompt prompting the at least one user to input at least one information input.

The input user interface can be configured to receive the at least one information input by the at least one user.

The user terminal can be configured to output the recommendation report in the documentation report. That is, the recommendation report and the documentation report can be output by the user terminal—i.e. can be output to the at least one user. Further, the recommendation and the documentation report can be output in the same report, such as, the recommendation report can be output in the documentation report. Hence, a single report can comprise a summary of the information input by the user and/or interpretation of the information input by the user and recommendations generated based on the at least one information input by the user.

The data processing device can be configured to automatically generate the documentation report and the recommendation report. That is, the data processing device can automatically process the at least one information input by the user and can automatically generate a recommendation report and a documentation report based on the information input by the user.

In some system embodiments, the user terminal can comprise the data processing device. Hence, the processing of the information input by the at least one user and the generation of the documentation report and the recommendation report can be executed locally on the user terminal—i.e. by the processing means comprised by the user terminal. For example, the user terminal can be a computer, workstation, laptop, tablet, smartphone, notebook, and the central processing units of the respective devices can be configured for processing the information input by the user and for generating the documentation and recommendation report. In such embodiments, the data processing device can further facilitate the user terminal to output a prompt prompting at least one user to input at least one information input and to receive the at least one information input by the at least one user. That is, the data processing device can control devices of the user terminal and can executed a set of instructions that allow the user terminal to output at least one prompt and to receive at least one information input.

However, in some other system embodiments, the data processing device can be external to the user terminals, such as, a server external to the user terminal. The user terminal can provide the at least one information input to the external server, for example, using a bi-directional communication link, preferably a remote connection, between the user terminal and the server. The server can be configured to receive the at least one information input from the user terminal and to process the at least one information input. Based on the information input the server can be configured to generate a recommendation report and a documentation report. The server can comprise an output user interface configured to output the documentation report and recommendation report. Further, in such embodiments, the server can be configured to receive information input from multiple user terminals. This can allow the server to serve (i.e. receive and process information input and generate documentation report and recommendation report) multiple user terminals.

The user terminal can be configured to output a plurality of prompts each prompting the at least one user to input at least one user answer. In such embodiments, the data processing device can be configured to determine, for at least one prompt of the plurality of prompts, whether the prompt is output to the at least one user, wherein the determination depends on at least one information input by the at least one user. That is, when a plurality of prompts can be output to at least one user, the plurality of prompts can be dependent on each other or on the information input provided for the respective prompt. Hence, the information input provided to a prompt may cause another prompt to be output to the user or not output to the user. Thus, a determination can be made for each of the prompts from the plurality of prompts, whether to output the prompt to the user. This determination, based on at least one information input by the user, can be made by the data processing device. When the data processing device is a server external to the user terminal, the determination whether to output the prompt to the user can be done either by a processing unit comprised by the user terminal or by the server which can communicate the decision to the user terminal.

The data processing device can be further configured to process background data to generate the recommendation report. That is, the generation of the recommendation report can be based on background data.

The background data can relate to legal documents and/or the interpretation of the legal documents and/or the state of the art. Hence, the recommendation report can be generated by considering regulations, laws and/or state of the art. For example, recommendations in the recommendation report can instruct for courses of action that can comply with regulations and laws and that take into considerations developments in the state of the art.

The background data can be time dependent such that the same information input at different times leads to different recommendations. In other words, the background data can be updated or changed. For example, the background data can be updated such that they can reflect new regulations, laws and/or developments on the state of the art. As the recommendation report can depend on information input and background data and the background data can be updated, the same information input can thus lead to different recommendations. This can allow better recommendations to be provided to the at least one user which can be based on updated or newer developments or regulations.

Further, the recommendation report can comprise a plurality of recommendations and the data processing device can be configured to prioritize the recommendations. That is, in a recommendation report with multiple recommendations, some of them can be more relevant or more critical than others. For example, some actions can be required by laws or regulations and recommendations instructing such actions can comprise a high priority. Thus, the data processing device configured to prioritize the recommendations can be advantageous as it can allow the at least one user to understand the relevancy of each recommendation. This may help the at least one user to know which recommendations can be critical and may require immediate actions.

The data processing device can be configured to prioritize the recommendations by assigning a rank to each recommendation. The rank may imply a level of priority which can be denoted with a number (e.g. a number from 1 to 10) or with words (e.g. "Low", "Medium", "High") or color codes (e.g. "Green", "Orange", "Red"). A mapping or description of priority levels can be provided to facilitate understanding of priority levels.

The user terminal can be configured to output the prioritization of the recommendations. Hence, the at least one user can become aware of the priority of recommendations.

In some embodiments, the output user interface can be configured to output the prioritization of the recommendations.

The data processing device can be configured to prioritize the recommendations based on at least one information input. That is, the information input can be considered while prioritizing the recommendations. For example, the data processing device may infer from at least one information input by the user, the current course of action of the user and based on this the data processing device can generate a recommendation and determine how critical it can be to change current course of action and thus, provide a priority to the recommendation.

Additionally, the data processing device can be configured to prioritize the recommendations based on background data. Hence, information related to legal documents, regulations and/or state of the art can be considered while prioritizing the recommendations. Further, the background data can be time dependent such that the same information input at different times leads to different prioritization of recommendations.

The at least one prompt prompting at least one user to input at least one information input can comprise at least one information request section that can facilitate prompting at least one information input from the at least one user and at least one user answer section that can facilitate inputting the information input by the user. That is, a prompt can comprise a section wherein the prompt can be stated—e.g. a sentence describing the prompt. Further, the prompt can comprise another section wherein the user can provide the answer—e.g. a textbox for receiving text, multiple-choices for selecting an answer, etc.

The at least one prompt prompting at least one user to input at least one information can be of at least one of the following types: single select questions that can provide multiple answer choices to the user, wherein the user can input the information input by choosing one of the answer choices; multiple select questions that can provide multiple answer choices to the user, wherein the user can input the information input by choosing at least one of the answer choices; text input questions that can provide at least one text input field, i.e., one or several text input fields, wherein the user can input the information input by inputting text in the at least one text input field; multiple text input questions that can provide to the user an option of creating at least one text input field, that is, the user can input the information input by creating at least one text input field and inputting text on at least one of the at least one created input text fields; object select questions that can provide a graphical user interface comprising multiple objects, wherein the user can input the information input by selecting at least one of the objects; document upload prompts, wherein the user can input the information input by uploading at least one document in the user terminal; multiple document upload prompts, wherein the user can create one or more document upload fields, that is, the user can provide the information input by creating at least one document upload field and uploading at least one document on the created, such as, each of the created, document upload fields and preselected questions wherein the answer options of the questions can be preselected by at least one answer to at least one previous question; more particularly, the text label of each answer option of the preselected questions can correspond to at least one answer of at least one previous question.

For the single select questions and the multiple select questions, discussed in the previous paragraph, there can be one option allowing the user to provide a different answer from the provided answer choices. For example, one of the answer choices may be labelled as "other" and when selected by the user it can appear a text input field wherein the user can input text in response to the question.

The document upload prompts and/or the multiple document upload questions, discussed above, can further comprise text input fields assigned to the document upload fields, allowing the user to provide comments regarding the document uploaded in the respective document upload fields.

The preselected questions, discussed above, can be of at least one of the following question types: single select questions, multiple select questions, text input questions and document upload questions. In the preselected questions the answer choices, text input fields (such as, a label of the text input field) and/or document upload fields (such as, a label of the document upload field) can be selected based on an answer choice of at least one previous question. The at least one previous question can be of at least one of the following types: single select question, wherein the selected answer choice can be used to generate at least one answer choice, text input field and/or document upload field for at least one preselected question; multi select questions wherein the at least one selected answer choice can be used to generate at least one answer choice, text input field and/or document upload field for at least one preselected question; text input question wherein the text input provided by the user in response to such questions can be used to generate at least one answer choice, text input field and/or document upload field for at least one preselected questions; multiple text input question wherein the text input provided by the user in response to such questions can be used to generate at least one answer choice, text input field and/or document upload field for at least one preselected questions; object select questions wherein the object (such as, label of the object) selected by the user in response to such questions can be used to generate at least one answer choice, text input field and/or document upload field for at least one preselected question.

In some system embodiments, the user can input at least one command to the user terminal, wherein the at least one command can allow the user to operate the user terminal and/or facilitate the user to input the at least one information input. The command can comprise a select, drag-and-drop, click, button press or the like. The at least one command can allow the user to operate the user terminal. For example, the user can switch-on the user terminal, can open a questionnaire program wherein prompts can be output to the user, can provide information input by selecting, dragging, clicking or the like. Hence, the at least one command can facilitate the output of a prompt to at least one user and/or the input of information input by the user.

The documentation report can comprise at least one information input and/or the interpretation of the at least one information input. In some instances, the documentation report can comprise at least one graph, plot, histogram and/or statistical data that can be inferred from the at least one information input.

The recommendation report can comprise at least one recommendation, suggestion, guideline and/or proposal that can provide guidance to a course of action different to at least one action inferred from the at least one information input.

The system can facilitates acquiring and automatically evaluating data, said data acquired from the at least one information input. That is, the system can be used to acquire data. The data can be acquired by configuring one or more prompts to prompt a user to provide required data and configuring a user terminal to output the at least one prompt to the user.

In some embodiments, the system can be used for an assessment of data security of a firm, preferably of personal data security, such as, data that is associated with people. Hence, the at least one prompt that can be output to the user can be configured to prompt for information related to how the firm gathers, stores and/or processes data, such as, personal data. Thus, the system can be used to determine whether processes of the firm relate to the said data gathering, storing and/or processing can comply with legal requirements.

The at least one prompt that can be output to the user can be part of an audit that can be conducted to assess data security of a firm.

The at least one user, to whom a prompt can be output can who can provide at least one information input, can be an employee of the firm.

In some system embodiments, wherein a plurality of prompts are output to the user, a plurality of prompts can be grouped in sections, wherein each section can comprise at least one prompt related to a department of the firm. In other words, sections can be configured to prompt the user to input information related to a department of the firm.

Further, the user can choose a section based on the department he/she works for in the firm.

Further still, a data protection officer can review and/or evaluate at least one information input by the user.

A bi-directional communication link, preferably a remote bi-directional communication link can be established between the user and the data protection officer. This can allow the data protection officer to facilitate an understanding of the at least one prompt by the user and/or topics related to data security.

The system can be configured to carry out the method according to any of the preceding method embodiments, discussed.

In some system embodiments, the data processing device can be configured to process the at least one information input and to generate the documentation report and the recommendation report based on the at least one information input by utilizing a machine learning algorithm, such as an artificial neural network algorithm.

In some embodiments, the system can comprise a crawler data processing device that can be configured to visit and obtain data, such as, text data, from a provided list of electronic sources. The crawler data processing device can be a server. For example, in embodiments wherein the data processing device can be provided in a server external to the user terminal, the crawler data processing device can be provided in the server as well or can be provided in the data processing device itself. The crawling data processing device can be provided with a list of electronic sources, for example, a list of URL-s of web pages, which the crawling data processing device can visit and can obtain (e.g. download) data comprised therein.

Further, the system can comprise a search engine configured to access the data that can be obtained by the crawler data processing device and search for the presence of at least one provided keyword on the obtained data. The use of keywords can be advantageous as it can allow the search engine to select relevant information or search for relevant information on the obtained data.

The crawler data processing device and the search engine can be part of a data processing device, terminal or server.

The search engine can be configured to generate at least one update proposal. An update proposal can comprise updates or new information that can be made or added to the background data. That is, the update proposal can comprise information that is new or is not reflected correctly or at all in the background data. The update proposals can be generated by processing the obtained data using the search engine. In other words, interpretations or inferences of the obtained data can be deducted during the processing of the obtained data and can be used to generate the update proposals.

Thus, the at least one update proposal can be configured to facilitate updates to the background data.

A human operator can accept or reject the at least one update proposal and the acceptation of at least one update proposal triggers updates to the background data. That is, the at least one update proposal can be provided to a human operator and the human operator can accept or reject the at least one update proposal. As discussed, the update proposals can comprise new information that cannot be reflected on the background data. In other words, they can comprise proposals that can cause changes or updates on the background data. It can be advantageous, such that correctness of background data can be remained, that before updating the background data using the update proposals, a human operator can review the update proposals. Hence, the human operator can either accept or reject the update proposals.

The system can further comprise an operator terminal that can be configured to output the update proposal to the human operator. Further, the operator terminal can facilitate the update of the background data. That is, accepting at least one update proposal can comprise at least one of removing, adding, changing information comprised in the background data. In other words, if an update proposal can be accepted, the background data can be updated accordingly as can be instructed by the update proposal—i.e. the information comprised in the update proposal can be reflected on the background data. As discussed, in some embodiments, the change of background data can cause changes on the recommendation report and/or prioritization of recommendations. Hence, indirectly the update proposals may instruct changes on the recommendation report and/or prioritization of recommendations.

In some system embodiments, the user terminal can be configured to output at least one questionnaire page comprising at least one prompt. The questionnaire page can comprise at least one profile photo of a human operator. Further still, the questionnaire page may comprise a chatbox surrounding at least one prompt. Hence, the questionnaire page can comprise chat-like features. This can improve user experience and compliance, during the process of the user inputting the at least one information input. The user may feel less tired during the provision of at least one information input. Hence, less time may be required to provide the prompted information input. Furthermore, the improvement of user experience (e.g. making the user feel like being in a communication a human operator through the chat-like features) can improve user concentration which may improve the correctness of the provided information input.

In a third embodiment, the use of any of the discussed system embodiments for carrying out the method according to any of the discussed method embodiments is disclosed.

Generally, it will be understood that the features discussed above (and below) with respect to the method can also be used in conjunction with the system and vice versa.

The present invention also relates to the following numbered embodiments.

Below, method embodiments will be discussed. These embodiments are abbreviated by the letter "M" followed by a number. Whenever reference is herein made to "method embodiments", these embodiments are meant.

M1. A method for generating reports, the method comprising
  outputting a prompt prompting at least one user to input at least one information input;
  receiving the at least one information input by the at least one user;
  processing the at least one information input and generating a documentation report and a recommendation report based on the at least one information input; and
  outputting the documentation report and the recommendation report.

M2. The method according to the preceding embodiments, wherein a user terminal outputs the prompt prompting the at least one user to input at least one information input, and the user terminal receives the at least one information input by the at least one user.

M3. The method according to the preceding embodiment, wherein the user terminal outputs the documentation report and the recommendation report.

M4. The method according to any of the preceding embodiments, wherein a data processing unit processes the at least one information input and generates the documentation report and the recommendation report based on the at least one information input.

M5. The method according to any of the preceding embodiments, wherein the documentation report and the recommendation report are automatically generated.

M6. The method according to any of the preceding embodiments and with the features of embodiment M2 and M4, wherein the data processing unit is a server external to the user terminal.

M7. The method according to any of the preceding embodiments, wherein the method comprises outputting a plurality of prompts each prompting the at least one user to input at least one information input.

M8. The method according to the preceding embodiment, wherein the method comprises, for at least one prompt of the plurality of prompts, determining whether the prompt is output to the at least one user, wherein this determination depends on at least one information input by the at least one user.

M9. The method according to the preceding embodiment and with the features of embodiment M4, wherein the data processing unit performs the determination.

M10. The method according to the penultimate embodiment and with the features of embodiment M2, wherein the user terminal performs the determination.

M11. The method according to any of the preceding embodiments, wherein the step of generating a recommendation report comprises processing background data.

M12. The method according to the preceding embodiment, wherein the background data relates to at least one of the following: legal documents and/or the interpretation thereof and state of the art.

M13. The method according to any of the 2 preceding embodiments, wherein the background data is time dependent such that the same information input at different times leads to different recommendations.

M14. The method according to any of the preceding embodiments with the features of embodiment M6,
wherein the step of outputting a prompt comprises:
outputting a first prompt set comprising a plurality of prompts to a first user using a first user profile, and
outputting a second prompt set comprising a plurality of prompts to a second user using a second user profile;
wherein the step of receiving at least one information input comprises:
receiving a first information input set comprising a plurality of information inputs by the first user using the first user profile, and
receiving a second information input set comprising a plurality of information inputs by the second user using the second user profile;
and wherein the documentation report and the recommendation report are based on both the first information input set and the second information input set.

M15. The method according to the preceding embodiment, wherein the documentation report and the recommendation report are not output to the first user or are not output to the second user.

M16. The method according to any of the preceding embodiments, wherein the recommendation report comprises a plurality of recommendations, and wherein the method further comprises prioritizing the recommendations and outputting the prioritization of the recommendations.

M17. The method according to the preceding embodiment and with the features of embodiment M4, wherein the step of prioritizing the recommendations is performed by the data processing unit.

M18. The method according to any of the preceding 2 embodiments and with features of embodiment M2, wherein the step of outputting the prioritization of recommendations is performed by the user terminal.

M19. The method according to any of the 3 preceding embodiments, wherein the prioritization is output in the recommendation report.

M20. The method according to any of the 4 preceding embodiments, wherein the step of prioritizing the recommendations comprises assigning a rank to each recommendation.

M21. The method according to any of the 5 preceding embodiments, wherein the step of prioritizing the recommendations is based on at least one information input by the user.

M22. The method according to any of the 6 preceding embodiments, wherein the step of prioritizing the recommendations is based on background data.

M23. The method according to the preceding embodiment, wherein the background data relates to at least one of the following: legal documents and/or the interpretation thereof and state of the art.

M24. The method according to any of the 2 preceding embodiments, wherein the background data is time dependent such that the same information input at different times leads to different prioritization of recommendations.

M25. The method according to any of the preceding embodiments, wherein the method comprises receiving at least one command from the at least one user wherein the at least one command facilitates receiving at least one information input by the at least one user.

M26. The method according to the preceding embodiment and with the features of embodiment M2, wherein the at least one command allows the user to operate the user terminal.

M27. The method according to any of the preceding embodiments, wherein the method further comprises outputting at least one information input and/or interpretation of the at least one information input in the documentation report.

M28. The method according to any of the preceding embodiments, wherein the method further comprises processing at least one information input to generate and output at least one graph, plot, histogram and/or statistical data in the documentation report.

M29. The method according to any of the preceding embodiments, wherein the method further comprises generating at least one recommendation, suggestion, guideline and/or proposal that provide guidance to a course of action different to at least one action inferred from the at least one information input by the user.

M30. The method according to any of the preceding embodiments, wherein the method is a computer-implemented method.

M31. The method according to any of the preceding embodiments, wherein the method is used to assess data security of a firm, preferably personal data security, such as data that is associated with people.

M32. The method according to the preceding embodiment, wherein the method comprises determining whether processes of the firm related to the said data gathering, storing and/or processing comply with legal requirements.

M33. The method according to any of the preceding 2 embodiments, the method further comprising conducting an audit to assess data security of the firm.

M34. The method according to any of the 3 preceding embodiments, wherein the at least one user inputting at least one information input is an employee of the firm.

M35. The method according to any of the 4 preceding embodiments, wherein the method further comprises grouping a plurality of prompts in sections, wherein each section comprises at least one prompt related to a department of the firm.

M36. The method according to any of the 2 preceding embodiments, wherein the user chooses a section based on the department of the firm the user works for.

M37. The method according to any of the 6 preceding embodiments, wherein the method further comprises providing a data protection officer to review and/or evaluate at least one information input by the user.

M38. The method according to any of the 7 preceding embodiments, wherein the method further comprises providing a bi-directional communication link, preferably a remote bi-directional communication link between the user and a data protection officer.

M39. The method according to the preceding embodiment, wherein the data protection officer facilitates an understanding of the at least one prompt by the user and/or topics related to data security.

M40. The method according to any of the preceding embodiments, wherein the at least one prompt prompting at least one user to input at least one information is of at least one of the following types:
- single select questions that provide multiple answer choices to the user and wherein the user inputs the information input by choosing one of the answer choices;
- multiple select questions that provide multiple answer choices to the user and wherein the user inputs the information input by choosing at least one of the answer choices;
- text input questions that provide at least one text input field and wherein the user inputs the information input by inputting text in the at least one text input field;
- multiple text input questions that provide to the user the option of creating at least one text input field and wherein the user inputs the information input by creating at least one text input field and inputting text on at least one of the at least one created input text fields;
- object select questions that provide a graphical user interface comprising multiple objects and wherein the user inputs the information input by selecting at least one of the objects;
- document upload prompts wherein the user inputs the information input by uploading at least one document in the user terminal;
- multiple document upload prompts, wherein the user creates one or more document upload fields, that is, the user provides the information input by creating at least one document upload field and uploading at least one document on the created, such as each of the created, document upload fields;
- preselected questions wherein the answer options of the questions are preselected by at least one answer to at least one previous question; more particularly, the text label of each answer option of the preselected questions may correspond to at least one answer of at least one previous question.

M41. The method according to any of the preceding embodiments, wherein the step of processing the at least one information input and generating a documentation report and a recommendation report based on the at least one information input comprises utilizing a machine learning algorithm, such as an artificial neural network algorithm.

M42. The method according to any of the preceding embodiments and with the features of at least one of embodiments M11 and M22, the method further comprising updating the background data.

M43. The method according to the previous embodiment, wherein the step of updating the background data comprises visiting at least one electronic source and obtaining data comprised by the at least one electronic source.

M44. The method according to the previous embodiment, wherein the step of visiting at least one electronic source and obtaining the data comprised by the at least one electronic source is executed a processing unit.

M45. The method according to any of the 2 previous embodiments, wherein the step of visiting at least one electronic source and obtaining the data comprised by the at least one electronic source is carried out by a web crawler.

M46. The method according to any of the 3 previous embodiments, the method further comprising processing the obtained data of the electronic sources and generating at least one update proposal, the update proposal preferably concerning at least one rule for generating the recommendation report based on the at least information input.

M47. The method according the preceding embodiment, wherein the step of processing the obtained data of the electronic sources and generating at least one update proposal is automated.

M48. The method according to any of the 2 previous embodiments, wherein the step of generating at least one update proposal comprises searching for the presence of at least one keyword on the obtained data of the electronic sources.

M49. The method according to any of the 3 preceding embodiments, wherein the method further comprises providing the at least one update proposal to a human operator and the human operator accepting or rejecting the at least one update proposal.

M50. The method according to the preceding embodiment, wherein the step of accepting the at least one update proposal comprises at least one of removing, adding, changing information comprised in the background data.

M51. The method according to any of the preceding 2 embodiments, wherein the step of accepting the at least one update proposal comprises at least one of removing, adding and changing at least one prompt.

M52. The method according to any of the preceding 3 embodiments and with the features of embodiment M8, wherein the step of accepting the at least one update proposal influences the determination whether the prompt is output to the at least one user.

M53. The method according to any of the preceding embodiments and with the features of embodiments M7, wherein the plurality of prompts are comprised in a questionnaire.

M54. The method according to the preceding embodiment and with the features of embodiment M2, wherein the method comprises locally storing the questionnaire on the user terminal.

M55. The method according to any of the 2 preceding embodiments, wherein the questionnaire comprises a tree structure of nodes corresponding to prompts.

M56. The method according to the preceding embodiment and with the features of embodiment M46, wherein the update proposal relates to at least one node.

M57. The method according to any of the preceding embodiments, wherein the prompt is output as part of a questionnaire page.

M58. The method according to the preceding embodiment, wherein the questionnaire page comprises a photo of a human operator.

M59. The method according to any of the 2 preceding embodiments, wherein the questionnaire page comprises a chat-box surrounding the prompt.

Below, system embodiments will be discussed. These embodiments are abbreviated by the letter "S" followed by a number. Whenever reference is herein made to "system embodiments", these embodiments are meant.

S1. A system configured for generating reports, the system comprising:
- a user terminal configured to output a prompt prompting at least one user to input at least one information input and to receive the at least one information input by the at least one user; and
- a data processing device configured to process the at least one information input and to generate a documentation report and a recommendation report based on the at least one information input; and
- an output user interface configured to output the documentation report and the recommendation report.

S2. The system according to the preceding embodiment, wherein the user terminal comprises the output user interface, such as, at least one screen and/or at least one speaker and/or at least one printer and/or fax and wherein the user terminal further comprises an input user interface, such as, at least one keyboard and/or pointing device and/or microphone and/or camera and/or scanner and/or data uploading means.

In some embodiments, the output user interface and the input user interface can be realized as a smart speaker.

S3. The system according to the preceding embodiment, wherein the output user interface is configured to output the least one prompt prompting the at least one user to input at least one information input.

S4. The system according to any of the 2 preceding embodiments, wherein the at least one input user interface is configured to receive the at least one information input by the at least one user.

S5. The system according to the preceding embodiment, wherein the user terminal is configured to output the recommendation report in the documentation report.

S6. The system according to any of the preceding system embodiments, wherein the data processing device is configured to automatically generate the documentation report and the recommendation report.

S7. The system according to any of the preceding system embodiments, wherein the user terminal comprises the data processing device.

S8. The system according to the preceding embodiment, wherein the data processing device facilitates the user terminal outputting a prompt prompting at least one user to input at least one information input and receiving the at least one information input by the at least one user.

S9. The system according to any of the embodiments S1 to S6, wherein the data processing device is a server external to the user terminal.

S10. The system according to any of the preceding system embodiments, wherein the user terminal is configured to output a plurality of prompts each prompting the at least one user to input at least one user answer.

S11. The system according to the preceding embodiment, wherein the data processing device is configured to determine, for at least one prompt of the plurality of prompts, whether the prompt is output to the at least one user, wherein the determination depends on at least one information input by the at least one user.

S12. The system according to any of the preceding system embodiments, wherein the data processing device is further configured to process background data to generate the recommendation report.

S13. The system according to the preceding embodiment, wherein background data relates to at least one of the following: legal documents and/or the interpretation thereof and state of the art.

S14. The system according to any of the 2 preceding embodiments, wherein the background data is time dependent such that the same information input at different times leads to different recommendations.

S15. The system according to any of the preceding system embodiments, wherein the recommendation report comprises a plurality of recommendations and wherein the data processing device is configured to prioritize the recommendations.

S16. The system according to the preceding embodiment, wherein the data processing device is configured to prioritize the recommendations by assigning a rank to each recommendation.

S17. The system according to any of the 2 preceding embodiments, wherein the user terminal is configured to output the prioritization of the recommendations.

S18. The system according to any of the 3 preceding embodiments, wherein the output user interface is configured to output the prioritization of the recommendations.

S19. The system according to any of the 4 preceding embodiments wherein the data processing device is configured to prioritize the recommendations based on at least one information input.

S20. The system according to any of the 6 preceding embodiments wherein the data processing device is configured to prioritize the recommendations based on background data.

S21. The system according to the preceding embodiment, wherein background data relates to at least one of the following: legal documents and/or the interpretation thereof and state of the art.

S22. The system according to any of the 2 preceding embodiments, wherein the background data is time dependent such that the same information input at different times leads to different prioritization of recommendations.

S23. The system according to any of the preceding system embodiments, wherein the at least one prompt prompting at least one user to input at least one information input comprises
- at least one information request section that facilitates prompting at least one information input from the at least one user; and
- at least one user answer section that facilitates inputting the information input by the user.

S24. The system according to any of the preceding system embodiments, wherein the at least one prompt prompting at least one user to input at least one information is of at least one of the following types:
- single select questions that provide multiple answer choices to the user and wherein the user inputs the information input by choosing one of the answer choices;
- multiple select questions that provide multiple answer choices to the user and wherein the user inputs the information input by choosing at least one of the answer choices;

text input questions that provide at least one text input field and wherein the user inputs the information input by inputting text in the at least one text input field;

multiple text input questions that provide to the user the option of creating at least one text input field and wherein the user inputs the information input by creating at least one text input field and inputting text on at least one of the at least one created input text fields;

object select questions that provide a graphical user interface comprising multiple objects and wherein the user inputs the information input by selecting at least one of the objects;

document upload prompts wherein the user inputs the information input by uploading at least one document in the user terminal;

multiple document upload prompts, wherein the user creates one or more document upload fields, that is, the user provides the information input by creating at least one document upload field and uploading at least one document on the created, such as, each of the created, document upload fields;

preselected questions wherein the answer options of the questions are preselected by at least one answer to at least one previous question; more particularly, the text label of each answer option of the preselected questions may correspond to at least one answer of at least one previous question.

S25. The system according to any of the preceding system embodiments, wherein the at least one user inputs at least one command to the user terminal, wherein the at least one command allow the user to operate the user terminal and/or facilitate the user to input the at least one information input.

S26. The system according to any of the preceding system embodiments, wherein the documentation report comprises at least one information input and/or the interpretation of the at least one information input.

S27. The system according to any of the preceding system embodiments, wherein the documentation report comprises at least one graph, plot, histogram and/or statistical data inferred from the at least one information input.

S28. The system according to any of the preceding system embodiments, wherein the recommendation report comprises at least one recommendation, suggestion, guideline and/or proposal that provide guidance to a course of action different to at least one action inferred from the at least one information input.

S29. The system according to any of the preceding system, embodiments, wherein the system facilitates acquiring and automatically evaluating data, said data acquired from the at least one information input.

S30. The system according to any of the preceding system embodiments, wherein the system is used for an assessment of data security of a firm, preferably of personal data security, such as, data that is associated with people.

S31. The system according to the preceding embodiment, wherein the system is used to determine whether processes of the firm related to the said data gathering, storing and/or processing comply with legal requirements.

S32. The system according to any of the 2 preceding embodiments, wherein the at least one prompt is part of an audit conducted to assess data security of a firm.

S33. The system according to any of the 3 preceding embodiments, wherein the user is an employee of the firm.

S34. The system according to any of the 4 preceding embodiments, wherein a plurality of prompts is grouped in sections, wherein each section comprises at least one prompt related to a department of the firm.

S35. The system according to the 2 preceding embodiments, wherein the user chooses a section based on the department of the firm the user works for.

S36. The system according to any of the 6 preceding embodiments, wherein a data protection officer reviews and/or evaluates at least one information input by the user.

S37. The system according to any of the 7 preceding embodiments, wherein a bi-directional communication link, preferably a remote bi-directional communication link is established between the user and a data protection officer.

S38. The system according to the preceding embodiment, wherein the data protection officer facilitates an understanding of the at least one prompt by the user and/or topics related to data security.

S39. The system according to any of the preceding system embodiments, wherein the system is configured for carrying out the method according to any of the preceding method embodiments.

S40. The system according to any of the preceding system embodiments, wherein the data processing device is configured to process the at least one information input and to generate the documentation report and the recommendation report based on the at least one information input by utilizing a machine learning algorithm, such as an artificial neural network algorithm.

S41. The system according to any of the preceding system embodiments, wherein the system comprises a crawler data processing device configured to visit and obtain data, such as, text data, from a provided list of electronic sources.

S42. The system according to the preceding system embodiment, wherein the system comprises a search engine configured to access the data obtained by the crawler data processing device and search for the presence of at least one provided keyword on the obtained data.

S43. The system according to the 2 preceding system embodiments, wherein the crawler data processing device and the search engine are part of the data processing device.

S44. The system according to any of the preceding embodiments and with the features of embodiment S41, wherein the search engine is configured to generate at least one update proposal.

S45. The system according to the preceding embodiment and with the features of at least one of embodiments S12 and S20, wherein the at least one update proposal is configured to facilitate updates to the background data.

S46. The system according to any of the 2 preceding embodiments, wherein a human operator accepts or rejects the at least one update proposal and the acceptation of at least one update proposal triggers updates to the background data.

S47. The system according the preceding embodiment, wherein the system comprises an operator terminal configured to output the update proposal to the human operator.

S48. The system according to the preceding embodiment, wherein the operator terminal facilitates the update of the background data.

S49. The system according any of the preceding system embodiments, wherein the user terminal is configured to output at least one questionnaire page comprising at least one prompt.

S50. The system according to the preceding embodiment, wherein the questionnaire page comprises at least one profile photo of a human operator.

S51. The system according to any of the preceding 2 embodiments, wherein the questionnaire page comprises a chat-box surrounding at least one prompt. Below, use embodiments will be discussed. These embodiments are abbreviated by the letter "U" followed by a number.

Whenever reference is herein made to "use embodiments", these embodiments are meant.

U1. Use of the system according to any of the preceding system embodiments for carrying out the method according to any of the preceding method embodiments.

BRIEF DESCRIPTION OF THE FIGURES

FIG. 5a depicts a schematic representation of an exemplary questionnaire wherein a set of user answers were provided and the respective answer report, recommendation report and priority report based on the set of the provided user answers;

FIG. 6a depicts a schematic representation of a general report of the questionnaire of FIG. 5a based on the user answers provided in FIG. 5a;

FIG. 6b depicts a schematic representation of a general report of the questionnaire of FIG. 5b based on the user answers provided in FIG. 5b;

FIG. 8 schematically illustrates the structure of a questionnaire configured for the assessment of the data security of a company;

DETAILED DESCRIPTION OF THE FIGURES

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, time delays between steps can be present between some or all of the described steps.

Figure 1:
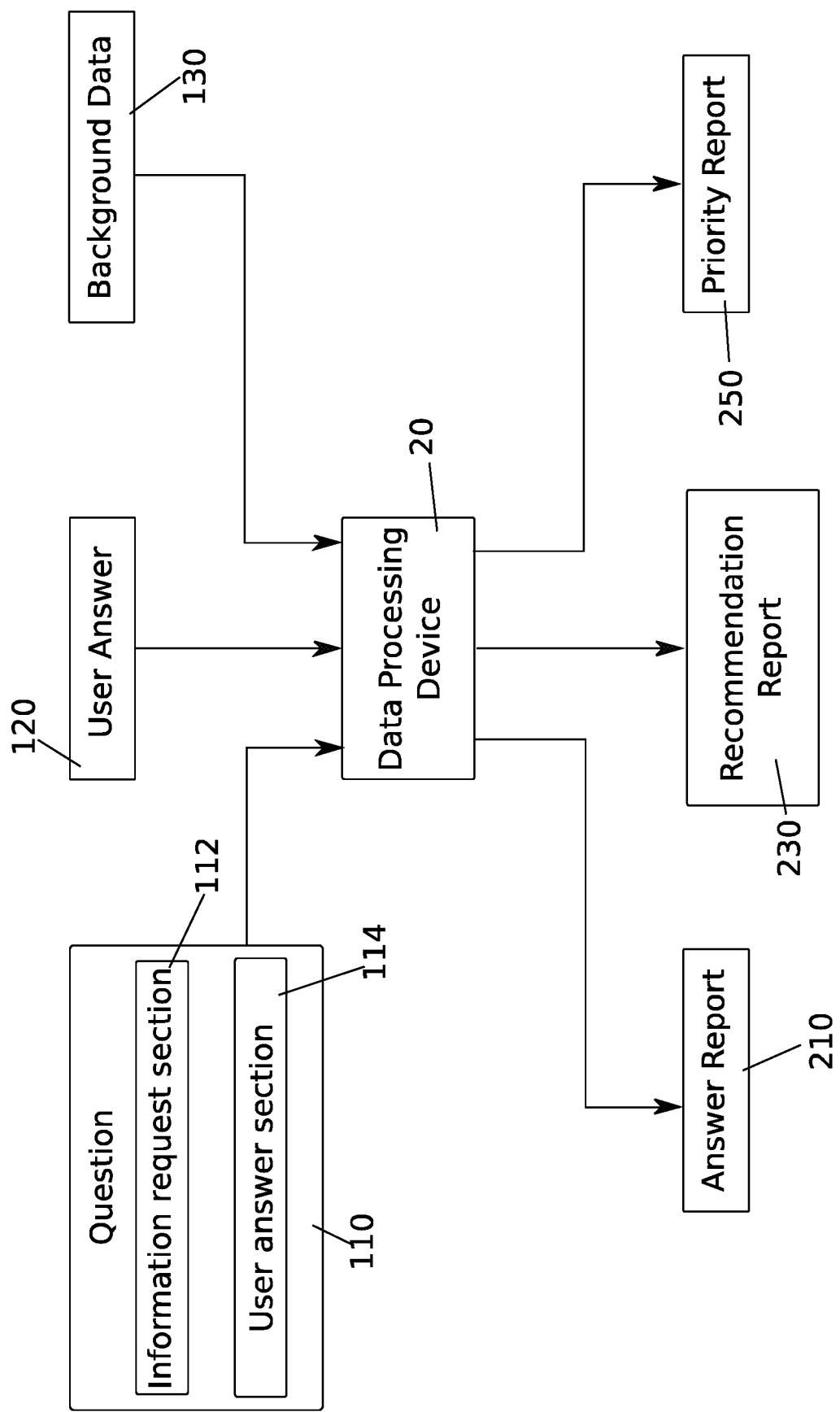
FIG. 1 depicts a schematic representation of the inputs to and outputs from a data processing unit configured to execute an interactive questionnaire according to embodiments of the present invention.

FIG. 1 depicts a schematic representation of the inputs to and outputs from a data processing device that can be configured to execute an interactive questionnaire according to embodiments of the present invention. That is, a plurality of questions can be provided to a respondent (also referred as user). The respondent can provide at least one answer for the at least one presented question. The interactive questionnaire can comprise at least one question that can be changed and/or shown or not shown to the respondent based on at least one user answer to at least one previous question.

The interactive questionnaire can be executed by a data processing device 20, which can also be referred as a data processing unit 20. The data processing device 20 can be configured to execute a machine-readable code—usually created after a source code is compiled—comprising programming instructions for executing the questionnaire. The data processing device 20 can access the source code or the object code on an internal or external memory that the data processing device 20 can access—such as a volatile memory (e.g. RAM) or non-volatile memory (e.g. ROM, EEPROM, hard-disk drive, solid-state drive). Further, the data processing device 20 can be provided with at least one question 110, at least one user answer 120 and background data 130. The data processing device 20 can access the upper mentioned input data on an internal or external memory location that can be connected to it.

Figure 2A:
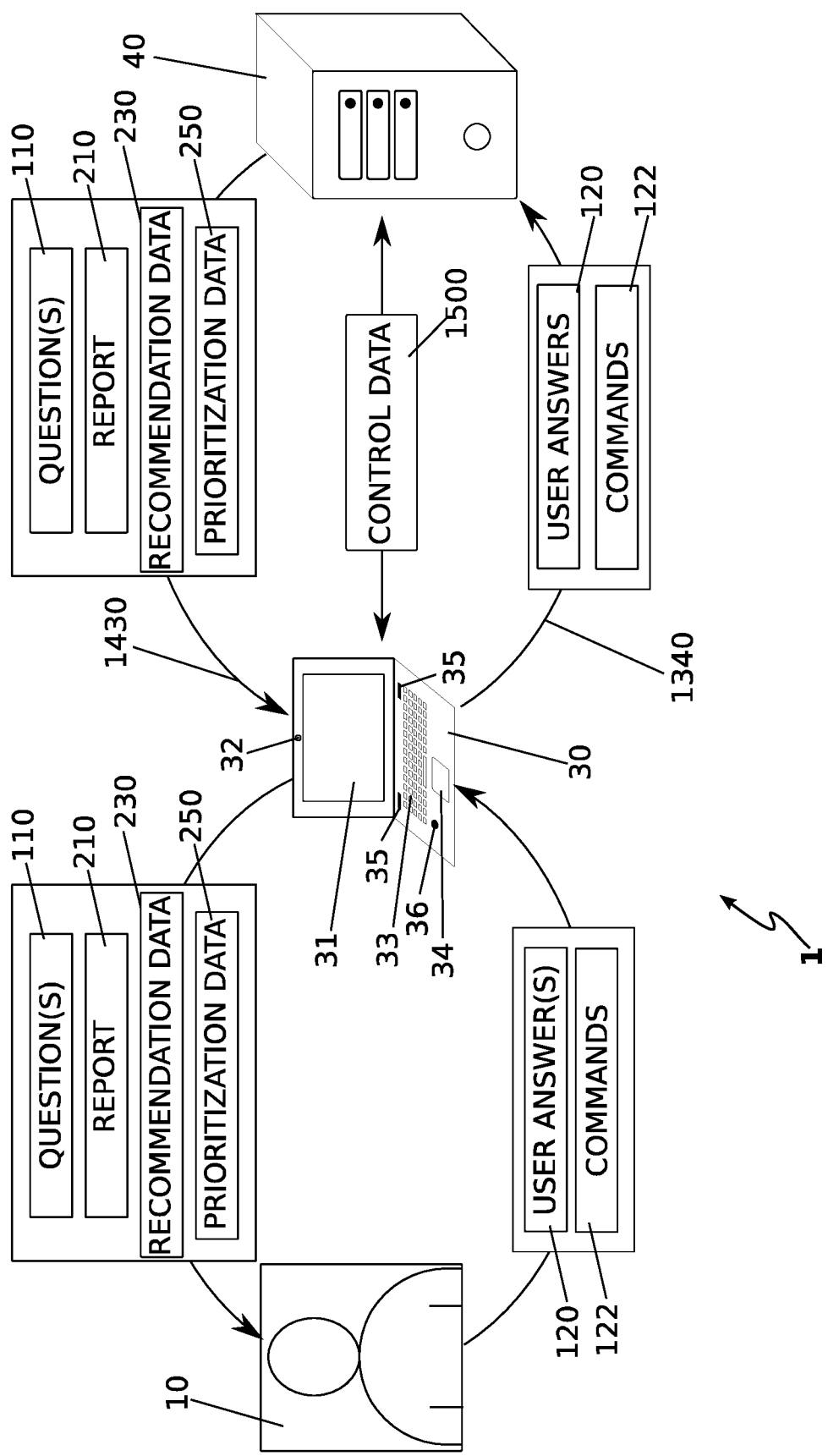
FIG. 2a depicts a schematic representation of a system configured to perform an interactive questionnaire according to embodiments of the present invention.
Figure 2B:
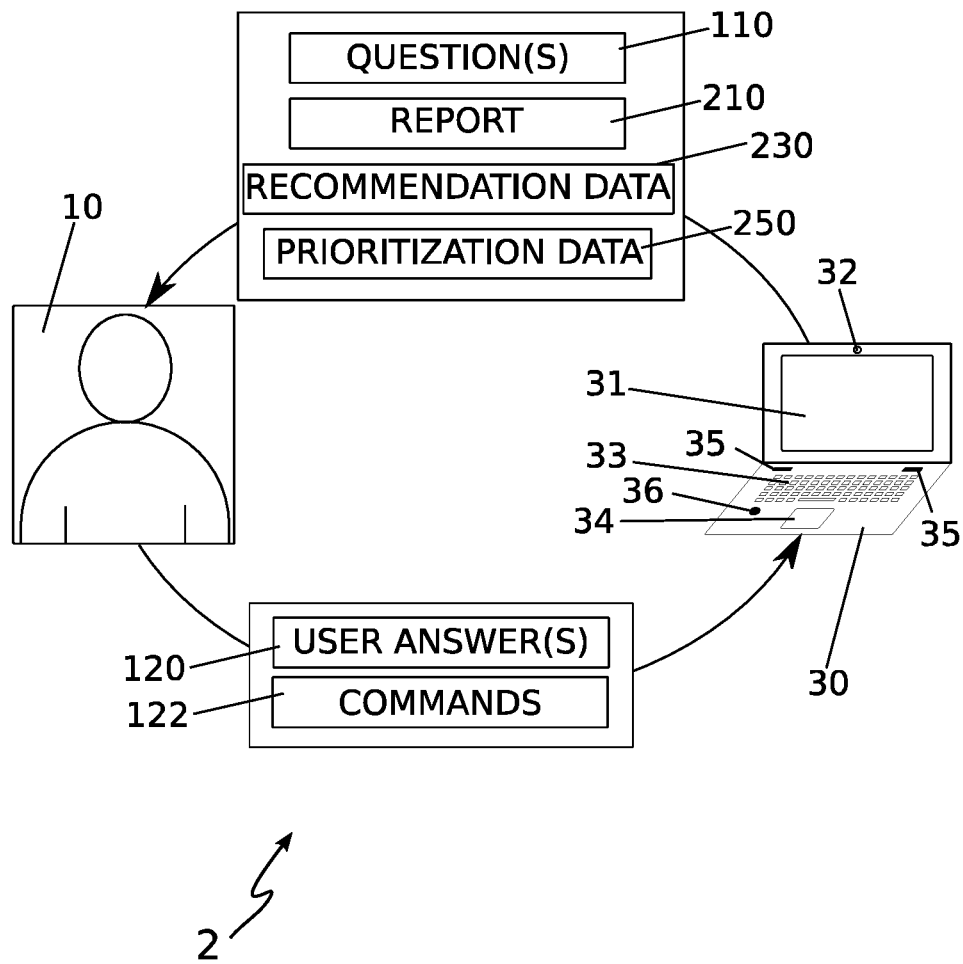
FIG. 2b depicts a schematic representation of a system configured to perform an interactive questionnaire according to other embodiments of the present invention.

A question 110, which can also be referred as a prompt 110, can be a sentence (or plurality of sentences) requesting or prompting information from a respondent 10 (refer to FIGS. 2a and 2b). A question 110 can be a data structure comprising an information request section 112 and a user answer section 114. The information request section 112 can specify the information that the respondent 10 is asked to provide by the question 110. The information request section 112 can comprise a sentence or a plurality of sentences requesting information. The user answer section 114 can facilitate providing the answer (i.e. requested information) by the respondent 10. For example, in a multiple-choice question 110 the user answer section 114 can be a list of possible answers wherein the respondent 10 may be expected to select at least one of them. The question 110 can be an open-ended question 110 wherein the user answer section 114 does not provide pre-set answers and the respondent 10 may provide the answer in a written or spoken form, e.g. the user answer section 114 can be a text box. In yet some further examples the user answer section 114 can comprise a list of elements to be ranked by the respondent 10, a rating scale requesting for the respondent 10 rating, a dropdown menu or other forms of user information requests.

The question or the prompt 110 can be of different types.

For example, the questions 110.

In addition to the above-mentioned question types, other question formulations may be used. For example, a further question type may be created as a combination of different question types. Such as a question that can ask for user text input and object select.

The questions 110 may also be associated with requirements. A question requirement can specify one or more conditions for the question to be shown to the respondent 10. There can be different cases of requirements for questions, such as:

Direct dependence: A question is only shown, if a particular answer was provided by the respondent 10 in a previous question. For example, in a previous question "Do you transmit applicants data to other companies?" the respondent answered "Yes", then in a subsequent question the user 10 is requested to insert the number of other companies.

Cumulative dependence: A question is only shown, if two or more particular answers were provided by the respondent 10 in two or more previous questions. In other words, the conditions for the two or more particular answers are in an "and" relation.

Alternative dependence: A question is only shown, if at least one of two or more particular answers were provided by the respondent 10 to at least one of two or more previous questions. In other words, the conditions for the two or more particular answers are in an "or" relation.

General dependence: A question is shown if a condition created by relating two or more previous user answers using any of the logical operators, such as, "and", "or", "not", is fulfilled.

No dependence: Question is always shown.

The user answer 120, also referred as information input 120, can be data or information provided by the user or respondent 10 of the questionnaire. The user answer 120 can be written data (e.g. text), command data (i.e. select, button-press), documents (i.e. uploaded files), recorded audio, images and/or video. The respondent 10 may provide the user answers 120 while filling the questionnaire. The respondent 10 may provide at least one user answer 120 for any of the questions 110 comprised by the questionnaire. The respondent 10 may answer all the questions 110 of the questionnaire or all the questions 110 of the questionnaire that were provided to the respondent 10 or may be allowed to skip some questions 110 of the questionnaire.

Background data 130 can comprise data related to the topic (or topics) of the questionnaire. That is, the questions 110 can ask information from a respondent 10 that can relate to a particular field or for a particular purpose. In addition, the user answers 120 may relate to a particular field as may be imposed by the asked questions 110. The related field and/or purpose of the questions 110 and/or user answers 120 may form the topic (or topics) of the questionnaire. The background data 130 may relate to such topic (or topics).

Thus, the background data 130 can comprise information regarding state of the art. That is, the background data 130 can comprise information regarding the general development of devices, techniques, methodologies used in a particular field. Additionally, or alternatively, the background data 130 can comprise or be based on regulations, rules, orders, directives, acts, laws, requirements, guidelines that relate to a particular field as dictated by the topic (or topics) of the questionnaire.

Thus, in general, an interactive questionnaire can comprise at least one question 110, preferably a plurality of questions 110, which questions 110 can be of different types, as discussed. Further, the questions 110 can be associated with at least one requirement specifying one or more conditions, which when fulfilled instruct for the provision of respective question to the user or respondent 10. The conditions for displaying a question 110 of an interactive questionnaire may be combined with each other using Boolean operators (e.g. conjunction, disjunction, negation, implication, exclusive or, or equivalence). Hence, what in the art is often referred as a decision tree, can be constructed controlling the appearance or provision of questions 110 to the user 10. Similarly, the decision tree may also control the provision of possible choices to be selected as answers to a question 110. The decision tree can have a root, e.g. the first question 110 of the questionnaire. As it can be understood, the first question 110, or the root, is always provided to the user 10—i.e. it is a question 110 with no dependence. Multiple branches may be grown from the root, which can lead to different nodes. All nodes following from the root, also referred as children, are dependent from the root. That is, the questions 110 positioned on the children nodes of the root are only shown if a specific answer is provided to the root question 110. Further, the nodes branched from the root may have their own children (i.e. dependent questions 110) and so on. In simple words, starting from the root, based on the conditions fulfilled, said conditions being based on the user answers 120, different branches can be followed which can lead to different questions 110 being provided to the user 10.

The interactive questionnaire can comprise multiple root questions 110, i.e. may comprise multiple decision trees or the questions 110 may be grouped or organized in one or more decision trees. If multiple decision trees can be present on an interactive questionnaire, there can be multiple root questions 110 or non-dependent questions 110 which are always shown to the user. The root questions 110 may either appear from the beginning to the user 10 (i.e. all the root questions 110 are immediately presented to the user 10 upon the beginning of the questionnaire and the user 10 may answer them according to his/her decision) or the root questions 110 may be assigned an order, wherein only after the termination of a decision tree the next decision tree can initiate.

Hence, the data processing device 20 may be provided with the decision tree(s) of the interactive questionnaire. The data processing device 20, such as a general processing unit, can be configured to evaluate conditions, which can comprise several other conditions combined using Boolean operations, hence allowing the data processing device 20 to "traverse" through the decision tree(s) of the interactive questionnaire. In other words, the data processing device may receive user answers 120, use them to evaluate conditions relating to which next question to provide, and determining which next question 110 to provide to the user 10. Thus, organizing the dependencies of questions 110 as decision trees can be advantageous as it can allow the data processing device 20 to efficiently evaluate them and determine which next question to provide to the user 10.

In a similar manner, recommendation report 230 and/or priority report 250 can be generated. That is, a recommendation may be associated with one or more requirements or conditions, which can be combined with each other through Boolean operations. Hence, decision trees can be constructed, which decision trees facilitate the data processing device 20 to determine whether to provide a recommendation 230, based on the user answers 120. For example, a user 10, on a questionnaire evaluating data security in an organization, can be asked "Do you store confidential personnel data on an external server?" for which user 10 answers "Yes". User 10, can further be asked "What external server is used to store confidential personnel data?" for which user 10 answers "External Server X". The data processing device 20 may check the safety of the external server X. For example, the data processing device 20 may comprise as background data 130 a list of safe servers. If server X is not part of said list, the data processing device 20 may provide the recommendation in the recommendation report 230 "Do not use server X".

In the above example, the decision tree comprises a node evaluating whether the user 10 uses an external server (first question in the above example). It further comprises following a "yes branch" of said node another node checking what server is used (second question in the above example). Following the later node, the decision tree comprises another node checking safety of the server specified in the user answer. From the server safety check node two branches may follow; one if the server used by user 10 is safe, the other if the server used by user 10 is not safe, wherein the later branch is followed by another node that provides the recommendation "Do not use server X". Traversing on the decision tree, the data processing device 20 determines to display second question "What external server is used to store confidential personnel data?" since the user answer 120 of the first question "Do you store confidential personnel data on external server?" was "Yes". The data processing device 20 further determines to provide recommendation "Do not use server X" since the user answer to the second question "What external server is used to store confidential personnel data?" was "Server X" and based on the background data 130 server X was not on the list of safe servers.

While in the above, it was said that the data processing device 20 performs these actions, it should be understood that it is possible to load the nodes comprised in the questionnaire onto the terminal 30 and to perform these actions locally on the terminal 30.

As it can be noticed, updates or changes of background data 130 can cause different recommendations 230 to be provided. Continuing the above example, server X may become safe and background data 130 can be update to reflect this, by adding server X to list of safe servers. On another execution of the above decision tree or questionnaire, if the same set of answers is provided by user 10, the data processing device 20 determines not to suggest "Do not use server X". Hence, as depicted in the example, the background data 130 and the interactive questionnaire (i.e. decision trees after the interactive questionnaires) can be configured such that, when changes occur in the background data 130, e.g. due to new developments in the art, it can be sufficient to update the background data 130 without the need to manually change the interactive questionnaire, i.e. the decision tree(s) after the interactive questionnaire. As it will become more apparent on FIG. 10, this can facilitate the automation of conducting the interactive questionnaire.

The data processing device 20 can comprise means of data processing, such as, processor units, hardware accelerators and/or microcontrollers. The data processing device 20 can comprise memory components, such as, main memory (e.g. RAM), cache memory (e.g. SRAM) and/or secondary memory (e.g. HDD, SDD). The data processing device 20 can comprise busses configured to facilitate data exchange between components of the data processing device 20, such as, the communication between the memory components and the processing components. The data processing device 20 can comprise network interface cards that can be configured to connect the data processing device to a network, such as, to the Internet. The data processing device 20 can comprise user interfaces, such as:
  output user interface, such as:
    screens or monitors configured to display visual data (e.g. displaying graphical user interfaces of the questionnaire to the user),
    speakers configured to communicate audio data (e.g. playing audio data to the user),
  input user interface, such as:
    camera configured to capture visual data (e.g. capturing images and/or videos of the user),
    microphone configured to capture audio data (e.g. recording audio from the user),
    keyboard configured to allow the insertion of text and/or other keyboard commands (e.g. allowing the user to enter text data and/or other keyboard commands by having the user type on the keyboard) and/or
    trackpad, mouse, touchscreen, joystick—configured to facilitate the navigation through different graphical user interfaces of the questionnaire.

To put it simply, the data processing device 20 can be a processing unit configured to carry out instructions of a program. The data processing device 20 can be a system-on-chip comprising processing units, memory components and busses. The data processing device 20 can be a personal computer, a laptop, a pocket computer, a smartphone, a tablet computer. The data processing device 20 can be a server. The data processing device 20 can be a processing unit or a system-on-chip that can be interfaced with a personal computer, a laptop, a pocket computer, a smartphone, a tablet computer and/or user interfaces (such as the upper-mentioned user interfaces).

The data processing device 20 can access or can be provided as input with at least one question 110 and at least one user answer 120 and advantageously background data 130. For example, the at least one question 110 and at least one user answer 120 and advantageously background data 130 can be stored in a memory component comprised by or able to be accessed from the data processing device 20. The data processing device 20 can process the at least one question 110 and at least one user answer 120 and advantageously background data 130 and can generate an answer report 210 and/or recommendation report 230 and/or priority report 250. The data processing device 20 can store to a memory component and/or transfer to a user interface (such as the upper-mentioned output user interfaces) the answer report 210 and/or recommendation report 230 and/or priority report 250. That is, the answer report 210 and/or recommendation report 230 and/or priority report 250 can be generated by the data processing device 20 and stored in a memory component (such as HDD, SDD, RAM, cache etc.). Additionally, or alternatively, the answer report 210 and/or recommendation report 230 and/or priority report 250 can be generated by the data processing device 20 and transferred to an output user interface, such that, they can be communicated to the respondent 10 of the questionnaire. Additionally, or alternatively, the answer report 210 and/or recommendation report 230 and/or priority report 250 can be generated by the data processing device 20, stored in a memory component and transferred to an output user interface, such that, they can be communicated to the respondent 10 of the questionnaire.

The answer report 210, also referred as documentation report 210, can comprise at least one question 110 (or an interpretation of the at least one question 110 which can provide a hint related to what question 110 or topic the user answer belongs to) and at least one user answer 120. Thus, the answer report 210 can be a documentation or a summary of the user answers 120 provided by a respondent 10 during the fulfilling of a questionnaire by the respondent 10 (i.e. during the answering of the at least one question 110). The answer report 210 may or may not comprise the identity of the respondent 10 based on the fact that questionnaire can be anonymous or not. The answer report 210 can comprise text, visual and/or audio data. The answer report 210 may comprise graphs, plots, histograms configured to represent (preferably in a more understandable form) the questions 110 and/or the user answers 120 and/or statistical data that can be inferred from the questions 110 and/or user answers 120.

The recommendation report 230 can be suggestions, guidelines, proposals as to the best or better course of action. The recommendation report 230 can be inferred from the user answers 120 and advantageously the background data 130. Thus, the use of background data 130 can be particularly advantageous for the output of recommendation report 230. Thus, the data processing device 20 can analyse (as instructed by a program) the user answers 120 and advantageously the background data 130 to generate recommendation report 230. For example, a respondent 10 may be asked by a question 110 whether they store confidential data in an encrypted manner. If the respondent 10 provides a negative user answer 120, then the data processing device may generate the recommendation to encrypt confidential data before storing in a memory.

Furthermore, the data processing device 20 may assign a priority to at least one recommendation provided in the recommendation report 230. Said priority can be comprised by the priority report 250. The priority report 250 may be based on a pre-defined criterion. For example, in a questionnaire related to data security, the priority of the recommendations may be based on the level of security of the user actions, such as, storing data in an encrypted form (user action as inferred by the user answer 120) may result in the recommendation 230 to store the data in an encrypted manner comprising a high priority. The priority report 250 may comprise priorities of predefined levels, such as, a score in a predefined range (e.g. from 1 to 10 wherein 1 is the lowest score with the lowers priority and 10 is the highest score with the highest priority and the numbers between 1 and 10 define intermediate priorities). The priority may also be defined with levels such as High, Medium, Low.

FIG. 2a depicts a schematic representation of a system configured to perform an interactive questionnaire according to embodiments of the present invention. The system 1 can be used by a respondent 10 (also referred as a user 10), and the system 1 may comprise a terminal 30 and a server 40. The system 1 can allow the respondent 10 to take a questionnaire comprising at least one question 110. The questionnaire comprising at least one question 110 can be stored in the server 40 and thus can be provided to the respondent 10 by the server 40 through terminal 30.

Thus, for the respondent 10 to take the questionnaire a bi-directional communicative connection can be advantageous between the terminal 30 and the server 40.

The respondent 10, also referred as the user 10, can be provided with at least one question 110 before or while taking a questionnaire. The respondent 10 may control or may provide instructions or input to the terminal 30 which can facilitate the communication of the at least one question 110 to the respondent 10. The respondent 10 can provide at least one user answer 120. The at least one user answer 120 can be a response to at least one question 110. The respondent 10 can communicate the at least one user answer 120 to the terminal 30. The user answer 120, provided by the respondent 10, can comprise text, image, audio, video data and/or a selection of choices in a multiple-choice question 110 and/or a rank. In general, the user answer 120 may comprise information that the respondent 10 can provide in accordance with at least one question 110 provided to the respondent 10. The respondent 10 can communicate to the terminal 30 at least one command 122. The command 122 can comprise instructions that can allow the user 10 to operate the terminal 30. The command 122 can comprise computer commands 122 such as select, open, close, save, delete, etc.

The terminal 30 can facilitate the communication or data exchange between the respondent 10 and the sever 40. That is, the terminal 30 can facilitate the transfer of at least one question 110 from the server 40 to the terminal 30 and from the terminal 30 to the respondent 10. The terminal 30 can be, but is not limited to, a computer, a workstation, a laptop, a smartphone, or a tablet computer. In general, the terminal 30 can be any device that can comprise user interfaces to facilitate the operability of the terminal 30—such as the communication of at least one question 110 to the respondent 10 and the communication of at least one user answer 120 to the terminal 30—and a bi-directional communication interface, such as a network interface card, configured to establish a bi-directional communication link with the server 40.

The terminal 30 can comprise at least one display 31. The display 31 can facilitate the communication of visual data, such as text, image and/or video, to the respondent 10. For example, the questions 110 can be provided to the respondent 10 on the display 31 of the terminal 30. A graphical user interface can facilitate the display of at least one question 110 to the display 31 and can enhance the ease of receiving at least one question 110 and/or providing at least one user answer 120 by the respondent 10. The terminal can comprise at least one speaker 35. The at least one speaker 35 can facilitate the communication of audio data, such as voice, recorded audio and/or audio comprised in a video, to the respondent 10. Thus, the display 31 and/or the speaker 35, which can also be referred as output user interfaces, facilitate the communication of at least one question 110 to the respondent 10.

In addition, the terminal 30 can comprise at least one keyboard 33. The keyboard 33 can allow the respondent 10 to provide text data, i.e. string of characters, as input to the terminal 30. The keyboard 33 can further facilitate the provision of commands 122 to the terminal 30, for example, an action can be confirmed or initiated by pressing of the "Enter" key on the keyboard. The terminal 30 can comprise a pointing device 34, such as a touchpad (or trackpad) and/or a computer mouse and/or a joystick and/or a trackball and/or a touchscreen and/or a stylus (or digital pen). The pointing device 34 can facilitate the motion of a pointer on the display 31 which can facilitate the selection of graphical objects displayed on the display 31, such as icons, buttons, windows etc. The pointing device 34 may also comprise means for selecting, scrolling, opening additional control menus etc. The terminal 30 can comprise at least one microphone 36 configured for recording audio in the vicinity of the terminal 30. The terminal 30 can comprise a camera 32 configured for capturing images and/or videos. Thus, the keyboard 33 and/or the pointing device 34 and/or the microphone 36 and/or the camera 32, which can also be referred as input user interfaces, can facilitate the communication of at least one user answer 120 and/or at least one command 122 from the respondent 10 to the terminal 30.

As discussed, a bi-directional communication link can be established between the terminal 30 and the server 40. That is, the terminal 30 and the server 40 can be connected to a network, which can allow the communicative connection between the terminal 30 and the server 40. Thus, it can be advantageous for the terminal 30 and the server 40 to comprise a network interface card configured to facilitate the communicative connection between the terminal 30 and the server 40. As depicted in FIG. 2a the server can transfer to the terminal 30 at least one question 110 through a communication channel 1430 and the terminal 30 can transfer at least one user answer 120 to the server 40 through a communication channel 1340. The channel link 1430 can be a unidirectional communication channel directed from the server 40 to the terminal 30. The channel link 1340 can be a unidirectional communication channel directed from the terminal 30 to the server 40. The communication channels 1340 and 1430 can compose a bidirectional communication channel link between the terminal 30 and the server 40—allowing for a bidirectional data exchange between the terminal 30 and the server 40. From the perspective of the terminal 30 the communication channel 1430 can be the download channel 1430 and the communication channel 1340 can be the upload channel 1340. In addition, the server 40 and the terminal 30 can exchange control data 1500. The exchange of control data can be done through the download channel 1430 and the upload channel 1340 and/or can be done through a separate bidirectional communication channel that can be referred as the control channel. The control data 1500 can be used for data exchange between the server 40 and the terminal 30 that can

- facilitate the establishment and maintenance of the communicative connection between the terminal 30 and the server 40; and/or
- facilitate a secure connection between the terminal 30 and the server 40, such as, means for establishing an encryption mechanism between the two for encrypting the data before sending them to the network.

In the system 1 of FIG. 2a, the questions 110 of the questionnaire can be generated on the server 40. The server 40 can have access to or comprise a memory component wherein the questions 110 of the questionnaire can be stored. For example, a question bank (i.e. all questions 110 that can be comprised by a questionnaire) can be stored in a memory location and the server 40 can select at least one question 110, or a group of questions 110 or all the questions 110 comprised in the question bank of a questionnaire. The questions 110 can then be transferred to the terminal 30 such that they can be presented to the respondent 10.

The server 40 can further comprise at least one data processing device 20 (refer to FIG. 1). As discussed in FIG. 1 the data processing device 20 can process at least one question 110 and at least one user answer 120 and advantageously background data 130 to generate the answer report 210 and/or recommendation report 230 and/or priority report 250. Thus, the server 40 using the data processing device 20 can process at least one question 110 and at least one user answer 120 and advantageously background data 130 to generate the answer report 210 and/or recommendation report 230 and/or priority report 250. After generating the answer report 210 and/or recommendation report 230 and/or priority report 250, the server 40 can communicate said data (not shown in FIG. 2a) to the terminal 30 such that they can be presented to the respondent 10.

FIG. 2b depicts a schematic representation of another embodiment of a system configured to perform an interactive questionnaire. In FIG. 2b (and throughout the description of the drawings), like reference signs denote like structures. Furthermore, some of the features and characteristics described above in conjunction with FIG. 2a are also used in the embodiment depicted in FIG. 2b. For sake of brevity of description, in the below, only additional features present in the embodiment depicted in FIG. 2b are discussed (the same rationale also applies to the description of the additional figures).

Thus, system 2 depicted in FIG. 2b depicts another embodiment of a system configured to perform an interactive questionnaire according to the present invention. The system 2 comprises a terminal 30 and may be used by a respondent 10. The terminal 30 can present or communicate at least one question 110 to the respondent 10. The respondent 10 can present or communicate at least one user answer 120 to the terminal 30. The terminal 30 can comprise user interfaces to facilitate the communication between the terminal 30 and the respondent 10, such as, at least one display 31, at least one speaker 35, at least one keyboard 33, at least one pointing device 34, at least one microphone 36, at least one camera 32.

As discussed, in the system 1 of FIG. 2a the questions 110 can be stored in the server 40 and the server 40 can select at least one question 110 and can transfer the at least one question 110 to the terminal 30 through the communication link 1430. Further, the server 40 can receive at least one user answer 120 from the terminal 30 through the communication link 1340. In addition, the server 40 can comprise background data 130 (refer to FIG. 1). The server 40 can process at least one question 110 and at least one user answer 120 and advantageously background data 130 to generate the answer report 210 and/or recommendation report 230 and/or priority report 250 (refer to FIG. 1). To facilitate this, the server 40 can comprise the data processing device 20 (refer to FIG. 1).

However, unlike the system 1 of FIG. 2a, in the system 2 of FIG. 2b the questions 110 can be stored in the terminal 30 and the terminal 30 can select at least one question 110 to present or communicate to the respondent 10 using at least one of the terminal's output user interfaces mentioned above, such as the display 31 and/or the speaker 35. Further, the terminal 30 can receive at least one user answer 120 which can be provided by the respondent 10 using at least one of the terminal's input user interfaces mentioned above, such as, the keyboard 33 and/or the microphone 36 and/or the pointing device 34 and/or the camera 32. In addition, the terminal 30 can comprise background data 130 (refer to FIG. 1). The terminal 30 of system 2 can process at least one question 110 and at least one user answer 120 and advantageously background data 130 to generate the answer report 210 and/or recommendation report 230 and/or priority report 250 (refer to FIG. 1). To facilitate this, the terminal 30 can comprise the data processing device 20 (refer to FIG. 1).

To put it simply, the terminal 30 in both system 1 and system 2 can communicate at least one question 110 and/or at least one of the answer report 210, recommendation report 230 and priority report 250 to the respondent 10. The terminal 30 can further, in both system 1 and system 2, receive input data from the respondent, such as, at least one user answer 120. However, unlike the terminal 30 in system 1, the terminal 30 in system 2 can further access background data 130 and/or can process at least one question 110 and/or at least one user answer 120 and advantageously background data 130 to generate the answer report 210 and/or recommendation report 230 and/or priority report 250. In other words, the terminal 30 of system 2 comprises the features of the terminal 30 of system 1 and some of the features of the server 40 of system 1. Or to put it in even simpler words commonly used un the art, in system 1 the questionnaire is run in the cloud and in system 2 the questionnaire is run locally.

Figure 3A:
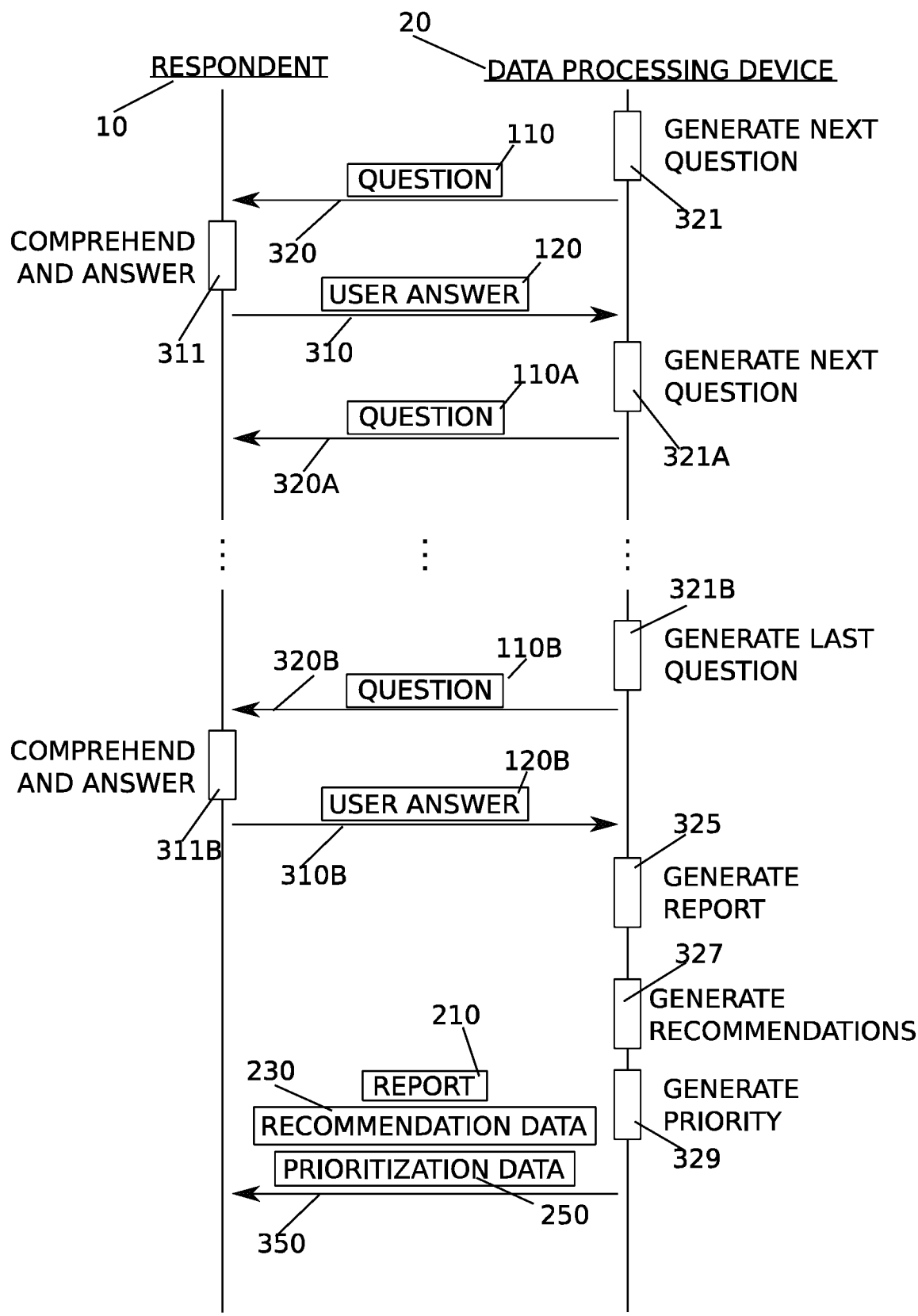
FIG. 3a depicts a sequence diagram of an interactive questionnaire execution according to embodiments of the present technology.

FIG. 3a depicts a sequence diagram of an interactive questionnaire execution according to an embodiment of the present technology. FIG. 3a depicts a plurality of steps that demonstrate how an interactive questionnaire comprising at least one question 110 can be performed. In FIG. 3a a plurality of processes that can be performed by the data processing device 20 and the respondent 10 is depicted in square empty boxes, for example, process 321 that generates the next question. Further, in FIG. 3a the exchange of data between a respondent 10 that is taking the questionnaire comprising at least one question 110 and the data processing device 20 is depicted by arrows (e.g. the transfer of a question 110 from the data processing device 20 to the respondent 10), wherein the direction of the arrow also depicts the direction of the data transfer. Above the arrows that illustrate the data transfer, the type of data that is transferred is depicted. For example, above arrow 320 a question 110 is depicted, meaning that during step 320 at least one question 110 is transferred from the data processing device 20 to the respondent 10.

Figure 4:
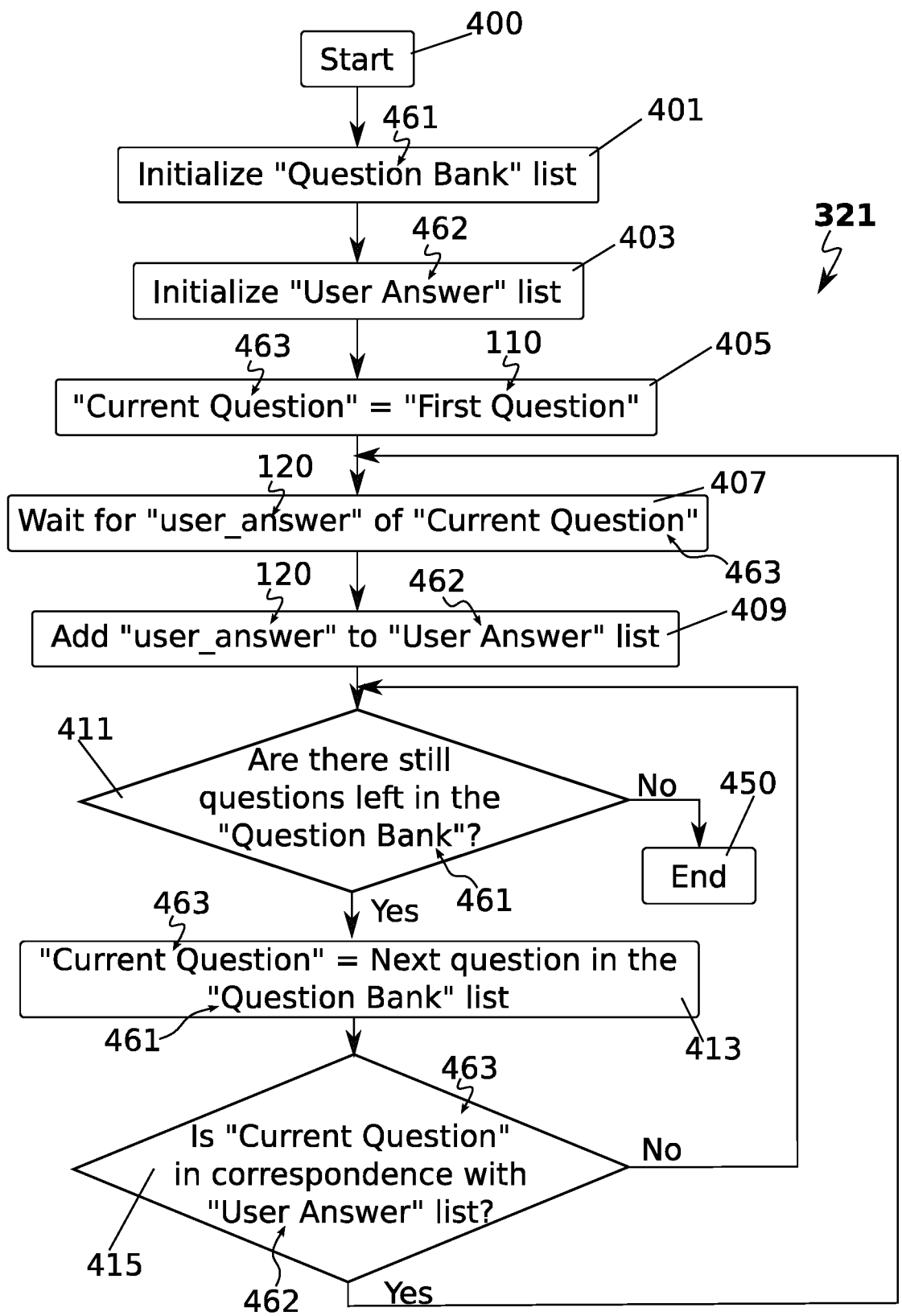
FIG. 4 depicts a flowchart of a next question generation process based on previous user answers according to one embodiment.

The data processing device 20 can be configured to execute a process 321 configured to generate a next question. During process 321 at least one question 110 can be selected from a set of questions (i.e. all questions 110 that can be comprised in the questionnaire). The selection of at least one question 110 during process 321 can be done based on at least one criteria, such as, credentials of the respondent 10, at least one previous user answer 120, at least one previous question 110, and/or background data 130. This can facilitate the performing of the questionnaire in an interactive manner. For example, based on a user answer at least one future question 110 in the questionnaire may become redundant or irrelevant. Process 321 may facilitate the skipping of such questions, such that they are not presented to the respondent 10. Process 321, may also facilitate the completion of the questionnaire faster, e.g. by skipping irrelevant or redundant questions 110. An example of process 321, wherein the next question (or questions) 110 depends on at least one previous user answer 120 is depicted in FIG. 4.

In next step 320, at least one question 110 can be transferred from the data processing device 20 to the respondent 10. That is, at least one question 110 can be generated in step 321 and can be transferred to the respondent 10 in step 320. In some embodiments, such as the one depicted in FIG. 2a, the data processing device 20 can be comprised in a server 40. Thus, the at least one question 110 can be transferred from a server 40 to a user terminal, such as the terminal 30. The terminal 30 can communicate the at least one question 110 to the respondent, using one of the terminal's user interfaces, as discussed. Thus, in such embodiments, step 320 can comprise the sub-steps of transferring the at least one question 110 from the server 40 to the terminal 30 and from the terminal 30 to the respondent 10. In some other embodiments, such as the one depicted in FIG. 2b, the data processing device 20 can be comprised in the terminal 30. Thus, step 320 can comprise the transfer of at least one question 110 from the terminal 30 to the respondent 10.

In a next step 311, the respondent 10 comprehends and answers the at least one question 110. Step 311 can comprise the respondent 10 comprehending the at least one question 110, wherein the respondent 10 can read text and/or listen audio and/or watch video that relate to the at least one question 110. In other words, the respondent 10 can interact with at least one output user interface provided as a peripheral device interfaces with the data processing device 20 and/or with the output user interfaces of the terminal 30 (refer to FIGS. 2a and 2b), such as, a display, a speaker, to comprehend the at least one question 110 provided to the respondent 10. Step 311 can further comprise the respondent 10 answering the at least one question 110, wherein the respondent 10 can use at least one user interface for typing, selecting, speaking or acting in order to respond to the at least one question 110. Said user interface can be a peripheral device (such as a keyboard, mouse, trackpad, touchscreen, microphone, camera) provided as an interface to the data processing device 20 and/or can be a user interface of the terminal 30, as discussed in FIGS. 2a and 2b.

To put it differently, in step 310 the respondent 10 provides at least one user answer 120 to the data processing device 20. In some embodiments, such as the one depicted in FIG. 2a, the respondent 10 provides at least one user answer 120 to a terminal 30, using the user interfaces of the terminal 30 and the terminal 30 can transfer the at least one user answer 120 to the server 40. Thus, step 310 can comprise the sub-steps of transferring the user answer 120 from the respondent 10 to the terminal 30 and from the terminal 30 to the data processing device 20. In some other embodiments, such as the one depicted in FIG. 2b, the respondent 10 can provide the at least one user answer 120 to the data processing device 20 by providing the at least one user 120 to the terminal 30 using the user interface devices comprised by the terminal 30.

The data processing device 20 generates at least one next questionnaire question by re-executing process 321, referred in FIG. 2a with the numeral 321A to differentiate from other instances of the process execution. In some embodiments, the data processing device 20 can initiate the execution of process 321A before receiving the at least one user answer 120 during step 310. This can increase the speed of execution of the questionnaire. That is, while the steps 321 and/or 320 and/or 311 and/or 310 are being performed the data processing device 20 can initiate and execute step 321A, which can at least decrease the time between generation of subsequent questions (i.e. the time between steps 321 and 321A). However, in such embodiments, the at least one user answers 120 cannot influence the generation of the next question in step 321A, since step 321A can initiate before the at least one user answer 120 is transferred to the respondent 10. In some other embodiments, the data processing device 20 can be configured to initiate the execution of step 321A after receiving at least one user answer 120 during step 310. This can allow for the at least one user answer 120 to influence the generation of at least one next question during step 321A. However, the time between the generation of questions (i.e. time between step 321 and 321A) is longer, as the data processing device 20 has to wait for step 310 to conclude before initiating process 321A.

Upon generating the next question in step 321A, the at least one next question 110A can be transferred to the respondent 10 during step 320A. In other words, steps 321 and 320 and 311 and 310 may be performed for each question 110 that is presented to the respondent 10. During steps 321B, 320B the last question 110B of the questionnaire can be generated and transferred to the respondent 10. During steps 311B and 310B the respondent 10 comprehends the last question 110B, provides at least one user answer 120B in response to the last question 310B and the at least one user answer 120B can be transferred to the data processing device 20.

In the embodiment depicted in FIG. 3a, the data processing device 20 generates all the questions 110 of the questionnaire and receives all the user answers 120 before initiating process 325 wherein a report, such as an answer report 210 (refer to FIG. 1), can be generated. The answer report 210 can comprise a summary or a documentation of at least one (or all) question(s) 110 and at least one (or all)

user answer(s) 120. Furthermore, the report may also summarize findings. The answer report 210 can also comprise other features as discussed in FIG. 1. Additionally or alternatively, the data processing device 20 generates all the questions 110 of the questionnaire and receives all the user answers 120 before initiating step 327 wherein recommendation report 230 (refer to FIG. 1) can be generated. The recommendation report 230 can be recommendations that can be based on at least one (or all) question(s) 110 and at least one (or all) user answer(s) 120. The recommendation report 230 can also comprise other features as discussed in FIG. 1. Additionally, or alternatively, the data processing device 20 can generate all the questions 110 of the questionnaire and receives all the user answers 120 before initiating step 329 wherein priority report 250 (refer to FIG. 1) can be generated. The priority report 250 can comprise an assignment of a priority level to at least one recommendation comprised in the recommendation report 230 generated in step 327. Examples of a questionnaire, an answer report 210, recommendation report 230 and priority report 250 are provided in FIGS. 5*a*, 5*b*, 6*a* and 6*b*.

In step 350, similarly to the transfer of at least one question 110 from the data processing device 20 to the respondent 10 in step 320, the answer report 210 generated in step 325 and/or the recommendation report 230 generated in step 327 and/or the priority report 250 generated in step 329 can be transferred from the data processing device 20 to the respondent 10.

Figure 3B:
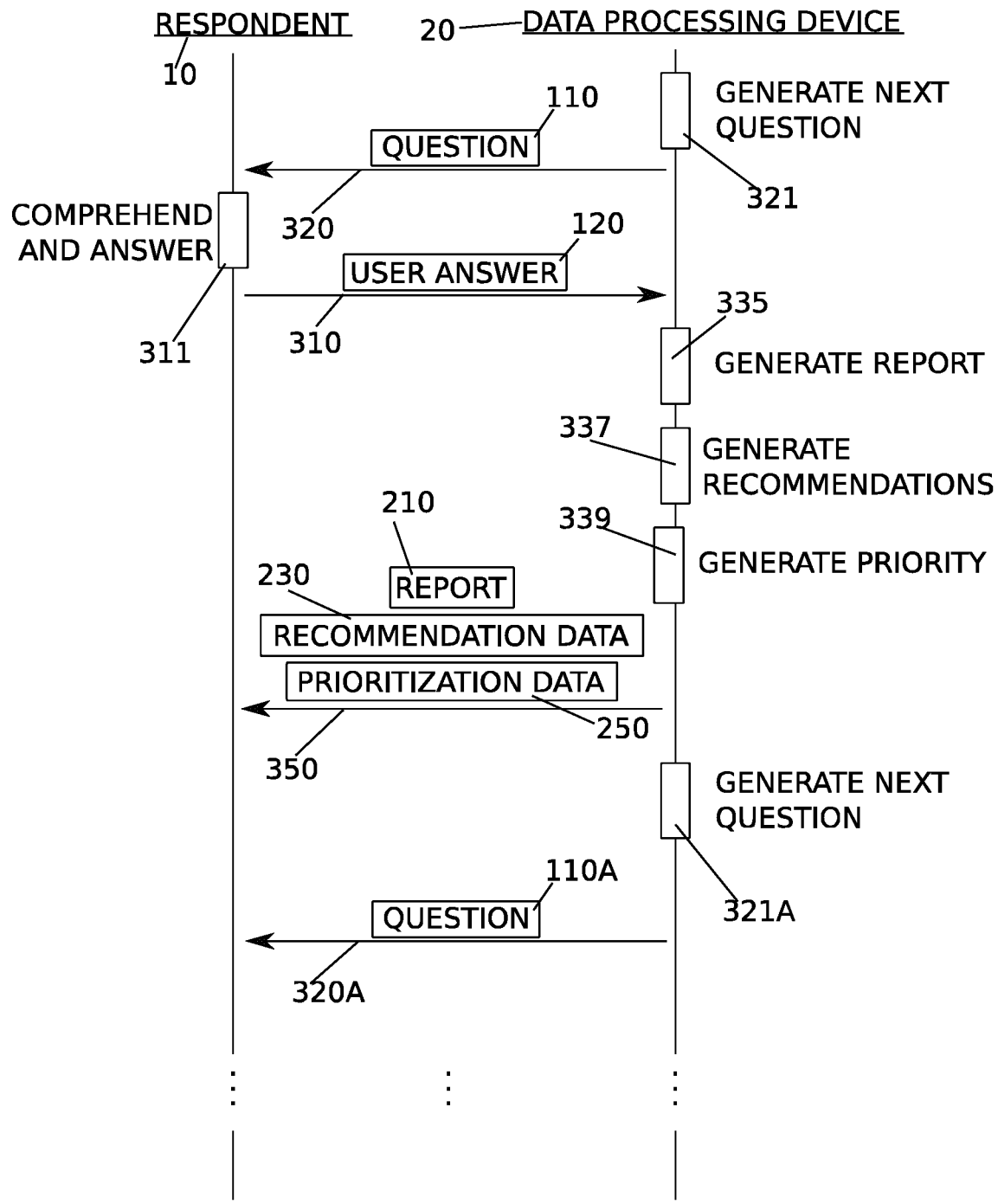
FIG. 3b depicts a sequence diagram of an interactive questionnaire execution according to embodiments of the present technology.

FIG. 3*b* depicts a sequence diagram of an interactive questionnaire execution according to another embodiment of the present technology. In FIG. 3*b* (and throughout the description of the drawings), like reference signs denote like structures or steps. Furthermore, some of the features and characteristics described above in conjunction with FIG. 3*a* are also used in the embodiment depicted in FIG. 2*b*. For sake of brevity of description, in the below, only additional features present in the embodiment depicted in FIG. 3*b* are discussed (the same rationale also applies to the description of the additional figures).

That is, in both FIGS. 3*a* and 3*b* a plurality of processes that can be performed by the data processing device 20 and the respondent 10 is depicted in square empty boxes, for example, process 321 that generates the next question. Further, in FIGS. 3*a* and 3*b* the exchange of data between a respondent 10 that is taking the questionnaire comprising at least one question 110 and the data processing device 20 is depicted by arrows (e.g. the transfer of a question 110 from the data processing device 20 to the respondent 10), wherein the direction of the arrow also depicts the direction of the data transfer. Above the arrows that illustrate the data transfer, the type of data that is transferred is depicted. For example, above arrow 320 a question 110 is depicted, meaning that during step 320 at least one question 110 is transferred from the data processing device 20 to the respondent 10.

Similar to the embodiment depicted in FIG. 3*a*, the data processing device 20 can generate at least one question 110 in a step 321. The at least one question 110 can be transferred in a step 320 from the data processing device 20 to the respondent 10. The respondent 10 can comprehend and answer the at least one question 110 during a step 311. In a step 310, the at least one user answer 120 provided by the respondent 10 during step 311, is transferred from the respondent 10 to the data processing device 20.

Upon receiving the at least one user answer 120, the data processing device 20 can generate an answer report 210 in a step 335 and/or can generate recommendation report 230 in a step 337 and/or can generate priority report 250 in a step 339. Note that while in the embodiment of FIG. 3*a* the answer report 210 and/or the recommendation report 230 and/or the priority report 250 can be generated only after all the questions 110 are transferred to the respondent 10 and all the user answers 120 are transferred to the data processing device 20, in the embodiment of FIG. 3*a* the answer report 210 and/or the recommendation report 230 and/or the priority report 250 can be generated after each question 110 and respective user answer 120 or after a group of questions 110 and the respective user answers 120. Additionally, in the embodiment of FIG. 3*b*, the answer report 210 and/or the recommendation report 230 and/or the priority report 250 can also be generated after all the questions 110 are transferred to the respondent and after all the user answers 120 are transferred to the data processing device 20 (i.e. at the end of the questionnaire). To put it simply, in the embodiment of FIG. 3*b* the answer report 210 and/or the recommendation report 230 and/or the priority report 250 are not necessarily generated only at the end of the questionnaire after all the questions 110 are transferred to the respondent and after all the user answers 120 are transferred to the data processing device 20 but can also be generated during the questionnaire, such as for example, after a question 110 is transferred to the respondent 10 and the respective user answer 120 is transferred to the data processing device 20.

FIG. 4 depicts a question generation process 321, wherein the next question (or questions) 110 can depend on at least one previous user answer 120. The question generation process 321, which can also be referred as the next question generation process 321, can be executed by the data processing device 20 (refer to FIGS. 3*a* and 3*b*).

Step 400 can initiate the question generation process 321. For example, in step 400 a command or instruction can be executed by the data processing device 20 that can call (i.e. initiate) the question generation process 321. The initiating command in step 400 can be executed after receiving of a "questionnaire start" command—i.e. a command that can initiate the questionnaire.

In step 401, a question bank list 461 can be initialized. The question bank list 461 can be a data structure, comprising a bank of questions 110 or all the questions 110 of a questionnaire. For example, the questions 110 of a questionnaire can be stored in a memory location that the data processing device 20 can access. The initialization of the question bank 461 in step 401 may transfer the questions 110 of the questionnaire in the question bank list 461. In other words, after the initialization step 401, the question bank 461 can comprise all (or at least some of) the questions 110 of the questionnaire.

In step 403, a user answer list 462 can be initialized. The user answer list 462 can be a data structure configured to comprise the user answers 120 provided by the respondent 10 of the questionnaire. In step 403, the user answer list 462 can be emptied or can be initialized with at least one previous user answer 120, wherein said previous user answer 120 can be stored in a memory location that the data processing device 20 can access.

In step 405, a current-question data structure 463 can be initialized to the first question 110 or group of questions 110 that are to be presented to the respondent 10. The current-question data structure 463 can be configured to comprise the current question 110 or the current group of questions 110 that are to be communicated to the respondent. After the initialization step 405, the current-question data structure 463 can comprise the first question 110 or the first group of questions 110 that are to be presented to the respondent 10.

If the questions 110 in the question bank list 461 can be sorted according to the time they are to be communicated to the respondent 10 (from first to last), then the current-question data structure 463 can comprise the first question 110 or group of questions 110 in the question bank list 461.

In step 407, the next question generation process 321 can be stalled waiting for at least one user answer 120 of the at least one question 110 comprised in the current-question data structure 463. It should be understood that between steps 405 and 407 the at least one question 110 comprised in the current-question data structure 463 can be communicated to the respondent 10, e.g. refer to step 320 in FIGS. 3a, 3b.

Upon receiving at least one user answer 120, the data processing unit 20 can resume the next question generation process 321 with step 409. In step 409, the received user answers 120 can be added to the user answer list 462. Thus, the user answers 120 that can be provided by the respondent 10 as responses to the questions 110 communicated to the respondent 10, can be stored in the user answer list 462.

In step 411, a check if there are still questions 110 left in the question bank list 461 can be performed. In step 409, it can be determined if all the questions 110 comprised in the question bank list 461 are considered or not. For example, if the current-question data structure 463 comprises the last question 110 in the question bank list 461 then it can be determined that the end of the question bank list 463 is reached and thus there are no more questions 110 left unconsidered in the question bank list 461.

If in step 411 it can be determined that there are no more questions 110 left in the question bank list 461 then the next question generation process 321 can proceed to step 450 that can terminate the next question generation process 321. In other words, all questions 110 comprised in the question bank list 461 were considered and thus there are no more questions 110 left.

If otherwise, in step 411 it can be determined that there are still questions 110 left in the question bank list 461, then the next question generation process 321 can proceed to step 413. In step 413, the next question 110 or group of questions 110 in the question bank list 461 can be assigned to the current-question data structure 463. Step 413 and step 411 allow for the consideration of all the questions 110 comprised in the question bank 461.

Though a question 110 in the question bank list 461 can be considered it cannot always be presented to the respondent 10. In step 415 it can be determined if a question 110 can be communicated to the respondent 10 or not, more precisely, if the questions 110 comprised in the current-question data structure 463 will be presented to the respondent 10 or not. This check in step 415 can be based on the user answers 120 comprised in the user answer list 462—i.e. in the previous user answers 120. Step 415 can facilitate the reduction of redundant or irrelevant questions 110 to be communicated to the respondent 10. For example, if in a previous user answer 120 comprised in the user answer list 462 the respondent 10 has denied the use of a particular service, then it can be irrelevant to ask the respondent 10 to provide a feedback regarding the use of the particular service. Step 415 can allow for such question to be skipped, i.e. to not be communicated to the respondent 10. Thus step 415 can reduce the efforts of respondent 10 for filling the questionnaire. In step 415 a check between the questions 110 comprised in the current-question data structure 110 and all the user answers 120 comprised in the user answer list 462 can be performed. However, in some embodiments, in step 415 a check between the questions 110 comprised in the current-question data structure 110 and at least some of the user answers 120 (i.e. not necessarily all, e.g. only the previous user answer 120) comprised in the user answer list 462 can be performed.

Thus, if in step 415 it can be determined that the question(s) 110 comprised in the current-question data structure 463 are irrelevant (i.e. not in correspondence with the user answers 120 comprised in the user answer list 462) then the next question generator process 321 can recur to step 411 wherein a check if all the questions 110 comprised in the question bank list 461 are considered and can further continue to either step 450 or 463 as discussed.

If otherwise, in step 415 it can be determined that the question(s) 110 comprised in the current-question data structure 463 are relevant (i.e. in correspondence with the user answers 120 comprised in the user answer list 462) then the next question generator process 321 can recur to step 407 wherein the next question generator process 321 can be stalled waiting for at least one user answer 120. It should be understood that between steps 415 and 407 the at least one question 110 comprised in the current-question data structure 463 can be communicated to the respondent 10, e.g. refer to step 320 in FIGS. 3a, 3b, when the at least one question 110 comprised in the current-question data structure 463 can be in correspondence with the user answers 120 comprised in the user answer list 462. After having recurred to step 407 the next question generator process 321 can proceed as discussed.

That is, in very simple words, FIG. 4 depicts a process 321. Notably, a question is output to a user, the process awaits the user's answer (see step 407) and adds the answer of the user to a list of "User Answers" (see step 409). Generally, the process 321 works through a "Question Bank" 461 list initialized in step 401. If the process determines that all the questions in the "Question Bank" list 461 have been considered, the process terminates (see steps 411 and 450). However, as long as this is not the case, the next question will be considered (see steps 411 and 415). However, before outputting a question to the user, it might be considered whether this question is a reasonable question in light of the pervious answers provided by the user (see step 415). For example, if a question (a) is "Do you use an external cloud provider to store your data?" and a further question (b) is "Which external cloud provider do you use?", it will be understood that outputting the question (b) only makes sense if the question (a) has been answered in the affirmative. Thus, the process 321 only outputs such a question (b) if it is in correspondence with the previous answers (see step 415), otherwise, the process jumps to step 411 and executes the steps as discussed above.

FIG. 5a depicts an example of a questionnaire 100. The questionnaire 100 is depicted in FIG. 5a in a structural form, i.e. as a flowchart. The questionnaire 100 comprises in total five questions, referred as Q_A, Q_B, Q_C, Q_D and Q_E. That is, the question bank, which may also be generally referred to as question set, of the questionnaire comprises said five questions. It can be noticed that the questions Q_B and Q_C are dependent on question Q_A, more precisely on the user answer 120 provided by the respondent 10 of the questionnaire 100. That is, if user answer Ans_A1 is provided the questionnaire proceeds to Q_B then to question Q_E and if user answer Ans_A2 is provided the questionnaire can proceed to question Q_C, then to question Q_D and then to question Q_E. As it can be noticed, the appearance of one or more questions 110 to the respondent 10 can depend on the user answer 120. In the exemplary questionnaire 100 depicted in FIG. 5a, the respondent 10 provided user answer Ans_A1 to question Q_A, which means that question Q_B and Q_E are communicated next to the respondent 10. The respondent 10 provided the answer Ans_B to question Q_B and answer Ans_E to question Q_E. The answers 120 provided by the respondent 10 are illustrated in FIG. 5a by being circled as opposed to the ones not circled which represent user answers 120 not provided by the respondent 10.

Further, FIG. 5a depicts the answer report 210 based on the user answers 120 provided by the respondent 10 to the questionnaire 100. The answer report 210 (as also discussed in FIG. 1) can be a documentation of at least one question 110 of a questionnaire 100 and at least one user answer 120 provided to the questions 110 of the questionnaire 100. The answer report 210 comprises a title field 211. The title field 211 can indicate that the data following the title field 211 relate to an answer report 210. The title field 211 can also indicate the title or topic or ID (e.g. a unique id) of the questionnaire 100. The title field 211 can also comprise an ID of the answer report 210. The title field 211 can also comprise data related to the respondent 10.

The answer report 210 can comprise a question field 215 and an answer field 213 for all or at least some of the questions 110 that were communicated to the respondent 10. The question filed 215 can comprise or specify a question 110 and the answer field 213 can comprise or specify at least one user answer 120 that was provided by the respondent 10 for the respective question 110 specified or comprised in question field 215. The answer field 213 can be empty, for example, in case the respondent 10 did not provide a user answer 120 for the respective question 110. The answer report 210 of the exemplary questionnaire 100 depicted in FIG. 5a, comprises three question fields 215 and three respective answer fields 213 comprising the questions 110 that were asked to the respondent 10 (Q_A, Q_B and Q_E) and the respective provided user answers 120 to the asked questions 110 (Ans_A1, Ans_B and Ans_E).

Further, FIG. 5a depicts the recommendation report 230 based on the user answers 120 provided by the respondent 10 to the questionnaire 100. The recommendation report 230 (as also discussed in FIG. 1) can be a documentation of at least one question 110 of a questionnaire 100 and at least one user answer 120 provided to the questions 110 of the questionnaire 100. The recommendation report 230 can comprises a title field 231. The title field 231 can indicate that the data following the title field 231 comprise recommendation report 230. The title field 231 can also indicate the title and/or topic and/or ID (e.g. a unique id) of the questionnaire 100. The title field 231 can also comprise an ID of the recommendation report 230. The title field 231 can also comprise data related to the respondent 10.

The recommendation report 230 can additionally comprise a question field 235 and a recommendation field 233. The recommendation report 230 can comprise a question field 235 and a recommendation field 233 for all or at least some of the questions 110 that were communicated to the respondent 10. The question filed 235 can comprise or specify a question 110 and the recommendation field 233 can comprise or specify at least one recommendation based on the user answer 120 that was provided by the respondent 10 for the respective question 110 specified or comprised in question field 235 and/or on background data 130 (refer to FIG. 1). The recommendation field 233 can be empty, for example, in case there can be no recommendation for in response to the user answer 120 provided to a question 110 or can comprise data indicating that no recommendation can be made (e.g. for question Q_B there is no recommendation and this is indicating by filling the respective recommendation field 233 with "Ok"). The recommendation report 230 of the exemplary questionnaire 100 depicted in FIG. 5a, comprises three question fields 235 and three respective recommendation fields 233 comprising the questions 110 that were asked to the respondent 10 (Q_A, Q_B and Q_E) and the respective recommendations (Rec_A1, Ok—i.e. no recommendation and Rec_E).

Further, FIG. 5a depicts the priority report 250 based on the user answers 120 provided by the respondent 10 to the questionnaire 100. The priority report 250 (as also discussed in FIG. 1) can assign a priority level or importance level based on a criterion to the provided recommendations in the recommendation report 230. The priority report 250 can comprise a title field 251. The title field 251 can indicate that the data following the title field 251 comprises a priority report 250. The title field 231 can also indicate the title and/or topic and/or ID (e.g. a unique id) of the questionnaire 100. The title field 231 can also comprise an ID of the priority report 250. The title field 231 can also comprise data related to the respondent 10.

The priority report 250 can additionally comprise a recommendation field 255 and a priority field 253. The priority data 250 can comprise a recommendation field 255 and a priority field 233 for all or at least some of the questions 110 that were communicated to the respondent 10. The priority data 250 can comprise a recommendation field 255 and a priority field 233 for all or at least some of the recommendations comprised in the recommendation report 230. The recommendation filed 255 can comprise or specify the recommendation that was provided in the recommendation field 233 of the recommendation report 230 and the priority field 233 can assign a priority level to the respective recommendation based on the user answer 120 that was provided by the respondent 10 for the respective question 110 specified or comprised in question field 235 and/or on background data 130 (refer to FIG. 1). As it can be noticed, in the recommendation report 230 two recommendations were provided: Rec_A1 and Rec_E. For the two provided recommendations provided in the recommendation report 230 a priority level is assigned to each of them in the priority report 250 of FIG. 5a. Recommendation Rec_A1 is assigned a "High" priority and the Rec_E is assigned a "Low" priority. In other words, according to the priority report 250, recommendation Rec_A1 is more important—i.e. requires immediate measures more—then recommendation Rec_E.

Figure 5B:
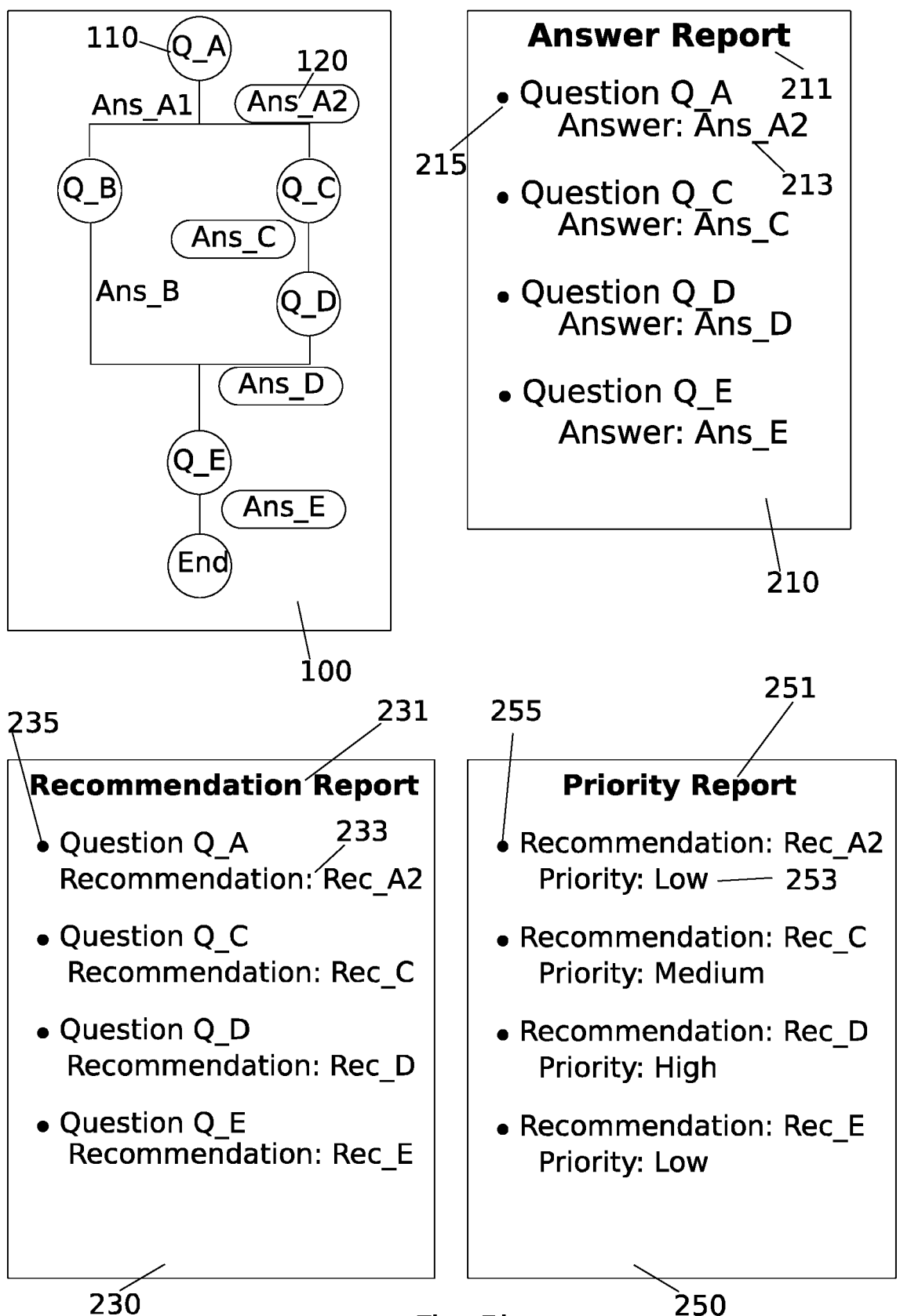
FIG. 5b depicts a schematic representation of the exemplary questionnaire of FIG. 5a wherein another set of user answers were provided and the respective answer report, recommendation report and priority report based on the set of the provided user answers.

FIG. 5b depicts a schematic representation of the questionnaire 100, the answer report 210, recommendation report 230 and priority report 250 of FIG. 5a, wherein different user answers 120 were provided to the exemplary questionnaire 100 of FIG. 5a. In FIG. 5b (and throughout the description of the drawings), like reference signs denote like structures. Furthermore, some of the features and characteristics described above in conjunction with FIG. 5a are also used in the embodiment depicted in FIG. 5b. For sake of brevity of description, in the below, only additional features present in the embodiment depicted in FIG. 5b are discussed (the same rationale also applies to the description of the additional figures).

Similar to the questionnaire 100 depicted in FIG. 5a, the questionnaire 100 depicted in FIG. 5b comprises five questions in total: question Q_A, Q_B, Q_C, Q_D, Q_E. However, in the example provided in FIG. 5b, the respondent 10 provided a different user answer 120 to question Q_A. Thus, instead of providing user answer Ans_A1, as in FIG. 5a, the respondent 10 provided Ans_A2. This causes the questionnaire 100 of FIG. 5b to follow a different "path" than the one of FIG. 5a, that is, instead of providing to the respondent 10 questions Q_A, Q_B and Q_E, as in FIG. 5a, the questions Q_A, Q_C, Q_D and Q_E were provided to the respondent in the example of FIG. 5b. Thus, even though the questionnaires 100 of FIG. 5a and FIG. 5b can comprise similar contents (i.e. can comprise the same questions 110) different user answers 120 can result in providing to the respondent 10 different questions 110, as exemplified in the questionnaires 100 of FIG. 5a and FIG. 5b.

Additionally, in FIG. 5b the answer report 210 of the questionnaire 100 and the respective user answers 120 are depicted. Similarly, to the answer report 210 of FIG. 5a, the answer report 210 of FIG. 5b comprises a title field 211, a question field 215 and an answer field 213. However, it can be noticed that the content of the answer reports 210 of FIGS. 5a and 5b differ with each other. That is, due to the fact that the questionnaires 100 of FIG. 5a and FIG. 5b follow different paths (caused by different user answers 120), the answer reports 210 will comprise different entries. For example, it can be noticed that the report in FIG. 5a comprises question fields 215 related to question Q_A, Q_B and Q_E while the report in FIG. 5b comprises question fields 215 related to questions Q_A, Q_C, Q_D and Q_E. Furthermore, while the answer report 210 of FIG. 5a comprises answer fields 213 related to the user answers Ans_A1, Ans_B and Ans_E the answer report 210 of FIG. 5b comprises the user answers Ans_A2, Ans_C, Ans_D and Ans_E. In other words, the answer report 210 of the same questionnaire 100 can differ (i.e. can comprise different content) based on the provided user answers 120. The report 21, based on the provided user answers 120, can differ in at least one location or entry, can comprise different answer fields 213 for the same question field 215, can comprise different number of question fields 215, and/or can comprise different number of answer fields 213.

Similar to the answer report 210, the recommendation report 230 and priority report 250 can differ, i.e. can comprise different content, based on the provided user answer 120. That is, different user answers 120 can result in different recommendation report 230 and different priority report 250. The recommendation data 230 for the same questionnaire 100, but provided with different user answers 120 can differ in more than one location or entry, can comprise different recommendation fields 233 for the same question field 235, can comprise different number of question fields 255, can comprise different numbers of recommendation fields 233. Similarly, the priority report 250 for the same questionnaire 100, but provided with different user answers 120 can differ in more than one location or entry, can comprise different prioritization field 253 for the same recommendation field 255, can comprise different number of prioritization recommendation fields 255, can comprise different number of prioritization fields 253.

Figures 6A, 6B:
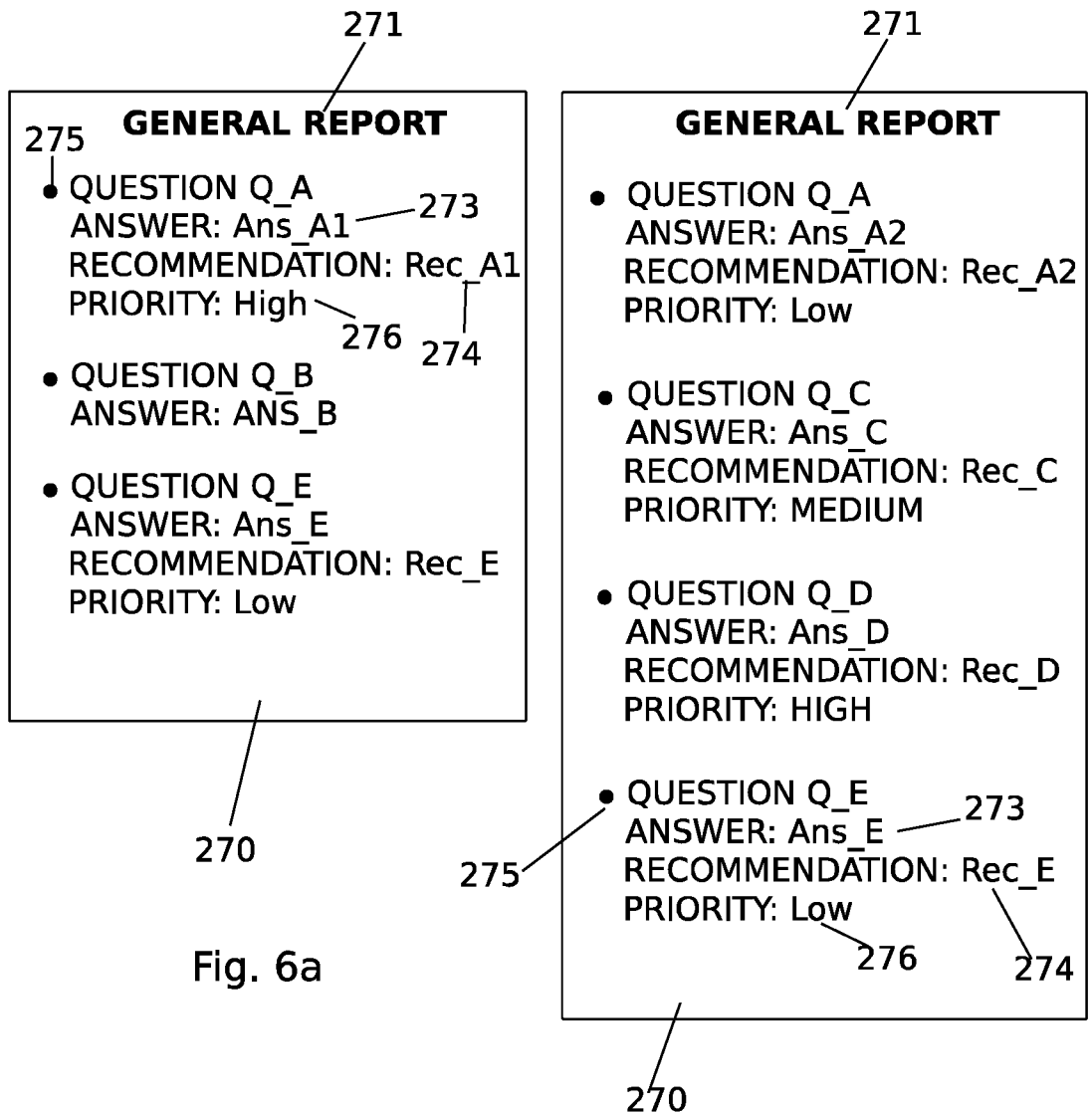

FIG. 6a depicts a schematic representation of a general report of the questionnaire of FIG. 5a based on the user answers provided in FIG. 5a. The general report 270 can be a summary of the answer report 210, recommendation report 230 and priority report 250. That is, the general report 270 can comprise at least one user answer 120 and/or at least one recommendation and/or at least one prioritization of the recommendation. A general report can also be empty which can imply that the respondent 10 did not answer any question 110.

The general report 270 can comprise a title field 271. The title field 271 can indicate that the data following the title field 271 can relate to a general report 270. The title field 271 can also indicate the title or topic or ID (e.g. a unique id) of the questionnaire 100 that the general report 270 can be about. The title field 271 can also comprise an ID of the general report 270. The title field 271 can also comprise data related to the respondent 10 who provided the user answers 120.

The general report 270 can comprise at least one entry for at least one question 110 of the questionnaire 100. The at least one general report entry can comprise a question field 275 and at least one of: at least one answer field 273, at least one recommendation field 273 and at least one priority field 276.

The question field 275 can comprise and/or can specify the question 110 that the respective general report entry can relate. As depicted in FIG. 6a, the general report 270 comprises three general report entries, each one of them comprising one question field 275 wherein each question field 275 comprises an indication that that the respective question field (and general report entry) relate respectively to question Q_A, Q_B and Q_E of the questionnaire 100.

The answer field 273 can comprise and/or can specify the user answer 120 that the respondent 10 provided for a question 110, wherein the question 110 is specified in the question field 275 of the same general report entry. For example, in FIG. 6a, it can be noticed that answer Ans_A1 was provided for Q_A, answer Ans_B was provided for Q_B and answer Ans_E was provided for Q_E.

The recommendation field 274 can comprise and/or can specify recommendation that can be inferred based on the provided user answer 120 and advantageously based on background data 130 too (refer to FIG. 1), wherein the user answer 120 was provided by the respondent 10 for a question 110, wherein the question 110 can be specified in the question field 275 of the same general report entry. For example, in FIG. 6a, it can be noticed that recommendation Rec_A1 was provided for Q_A, no recommendation was provided for question Q_B and recommendation Rec_E was provided for Q_E.

The priority field 276 can comprise and/or specify and/or assign a priority to the respective recommendation provided in the recommendation field 274 of the same general report entry. For example, in FIG. 6a, it can be noticed that recommendation Rec_A1 was assigned priority "High", no priority field 276 is provided for the general report entry relating to Q_B and recommendation Rec_E was assigned priority "Low".

FIG. 6b depicts a schematic representation of a general report of the questionnaire of FIG. 5b based on the user answers provided in FIG. 5b. In FIG. 6b (and throughout the description of the drawings), like reference signs denote like structures. Furthermore, some of the features and characteristics described above in conjunction with FIG. 5a are also used in the embodiment depicted in FIG. 5b. For sake of brevity of description, in the below, only additional features present in the embodiment depicted in FIG. 5b are discussed (the same rationale also applies to the description of the additional figures).

That is, FIG. 6a and FIG. 6b depict a general report 270 of the same questionnaire 100, wherein different user answers 120 were provided. For the general report 270 provided in FIG. 6a, the user answers 120 according to FIG. 5a were given by the respondent 10. For the general report 270 provided in FIG. 6b, the user answers 120 according to FIG. 5b were given by the respondent 10. Thus, it can be noticed that for the same questionnaire 100 different user answers 120 can result in different general reports 270 that can differ in more than one location, can comprise different number of general report entries, can comprise different number of question fields 275, answer fields 273, recommendation fields 274 and/or priority fields 276, entries related to the same question 110 can comprise different answer fields 273, recommendation fields 274 and/or priority fields 276.

Figure 7:
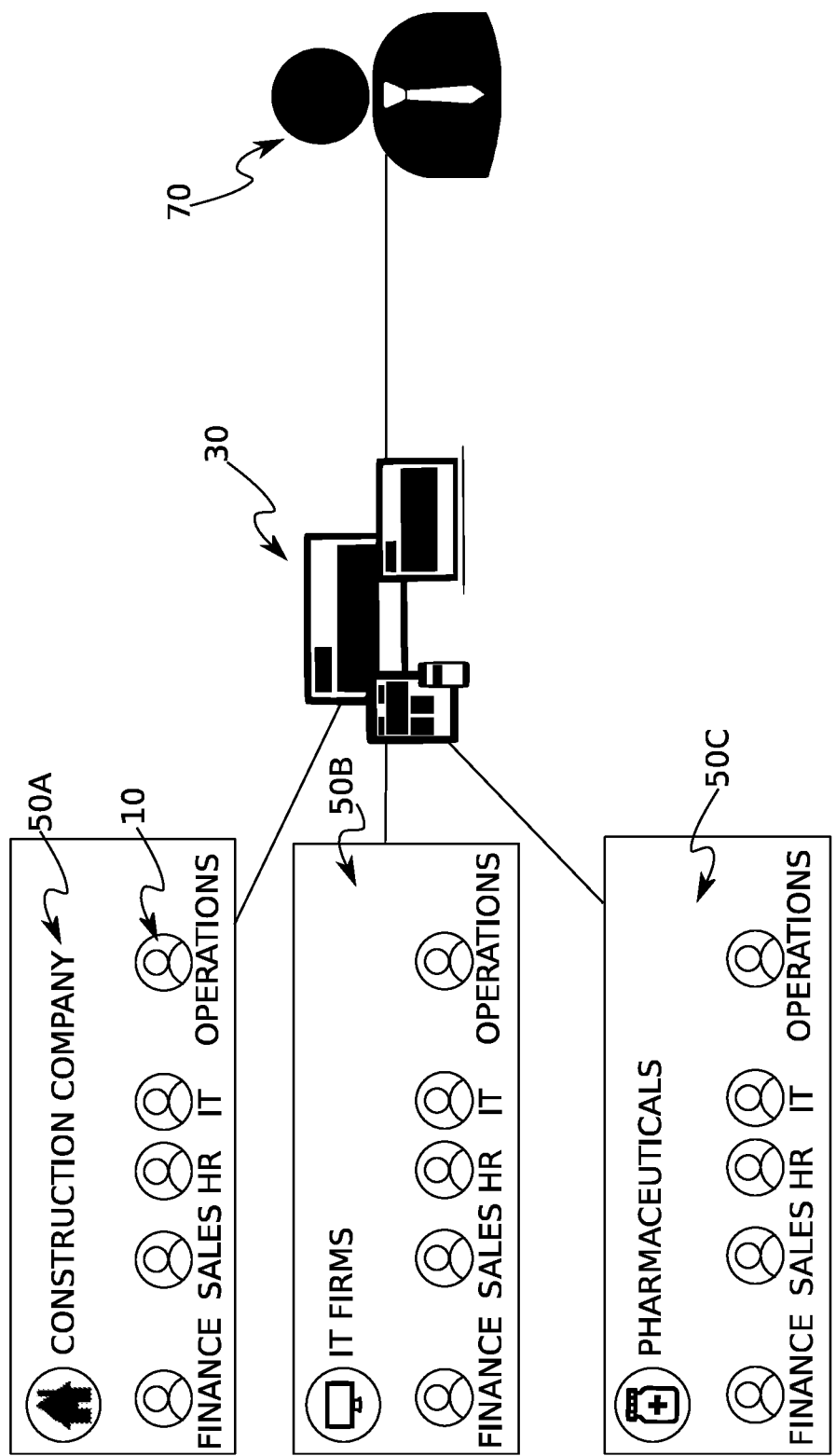
FIG. 7 depicts a system configured for an assessment of the data security of a company.

FIG. 7 depicts an embodiment of a system 3 configured for an assessment of the data security of a firm. Via system 3, data of a company (or firm) that are relevant to data protection can be queried and to a large extent automatically evaluated. For example, system 3 can be used to check whether processes of a company that relate to data gathering and/or storing comply with legal requirements. On the one hand, the quantitative extent is particularly dealt with by system 3 since data can be collected on different areas or departments of different companies. Similarly, the qualitative scope of the data can be considered as all data can be linked to the system 3 by taking into account the individuality of each individual company (and the respective data protection situation) as well as the individuality of respective departments and/or positions and/or employees of a company. This can lead on the one hand to the advantage that the companies can be individually arranged and advised by a small working time expenditure. On the other hand, data-protection-related "trends" can be discovered and researched by correlating and analysing the data.

System 3 depicted in FIG. 7 realizes an interface between a company 50 and a data protection officer 70 (also referred as data protection expert 70) by means of a terminal 30. That is, it is often the case that companies 50 are required or acquire expertise related to gathering, storing and/or processing data, particularly sensitive data, such as (but not limited to), private data of employees of a company 50. Such expertise is usually offered by data protection experts 70, who are specialized people on manners of ensuring that an organization or company 50 processes personal or sensitive data of the companies' staff, customers, providers or any other individuals (also referred to as data subjects) in a more secure manner and in compliance with any applicable data protection rules. This may require that the data protection officer 70 approaches the company in person to gather insights on how the company deals with sensitive data and to further advice the company as to a better course of action. Since such process, having the data protection officer 70 approaching and gathering data in person, may be time consuming and to some extent erroneous (due to human mistakes) it may be convenient to realize an interface between at least one company 50 and at least one data protection officer 70 through a terminal 30, such as depicted by the system 3 in FIG. 7.

As exemplary companies 50, three organizations are depicted in FIG. 7: a construction company 50A, an IT Firm 50B and a pharmaceutical firm 50C. Each company comprises its own staff working on different departments, such as, on the finance, sales, HR, IT or operations department. It should be understood that said departments are only provided for illustrative purposes and that the companies may be organized in any other way.

Terminal 30, also discussed in more detail in FIGS. 2*a* and 2*b*, can be, but is not limited to, a computer, a workstation, a laptop, a smartphone, or a tablet computer. In some embodiments, each company 50 can be equipped with a terminal 30. On the other hand, the data protection officer 70 can be equipped with another terminal 30. The terminal 30 (or terminals 30) on the company side and the terminal 30 on the data protection side can be remotely connected, e.g. through the Internet. In addition, a server 40 (see FIG. 2*a*) may be provided on the company side and/or data protection officer side and/or in the link between the terminal of the company and the terminal of the data protection officer. The server 40 (not shown in FIG. 7) can facilitate the communication between the terminals on the company and data protection officer side and/or data processing.

Terminal 30 can comprise data processing means, such as, the data processing device 20, depicted in FIG. 1. Hence, the terminal 30 can be configured to execute machine readable code for running an interactive questionnaire (see FIGS. 3*a*, 3*b*, 4 for more details on interactive questionnaire) and/or generate reports (see FIGS. 5*a*, 5*b*, 6*a* and 6*b* for more details on different types of reports) and/or conduct an audit or inspection of certain processes of a company, such as, the processing of sensitive data (see FIG. 8 for an example of an audit).

In an example scenario, a respondent 10 may be presented through terminal 30 (for example terminal 30 can comprise a display 31—see FIG. 2*a* or 2*b*) with an audit questionnaire. Respondent 10 can be an employee or part of staff of the company 50. Respondent 10 may access the audit questionnaire either on a terminal 30 provided on the company side, which can be configured and/or dedicated for such a purpose, or on his/her personal/working PC, laptop, tablet, smartphone or other terminal 30 device. The terminal 30 used by the respondent 10 can comprise and access the audit questionnaire on an internal memory that it can comprise. However, terminal 30 can also access the audit questionnaire from an external memory or device, such as a server, which can be a server owned and/or operated by staff or contractors of the company or a server which can be owned and/or operated by a data protection agency which provides the audit questionnaire and the data protection officer 70.

For better organization of the data, the audit questionnaire may be equipped with different sections (which will become more obvious when discussing FIG. 8) that can adapt the questionnaire and questions presented to the respondent 10 based on the functions of the respondent 10 on the company 50 he/she works for. For example, a respondent 10 working in the operations department can be provided with a different questionnaire than a respondent 10 working in the HR department of the company. Additionally or alternatively, the data retrieved from the respondent 10 may be marked or assigned with data that indicate the department or function that the respondent 10 works for within the company 50. For example, data can be grouped based on the department they were retrieved for. Other grouping criteria may be used. This may require the respondent 10 to provide basic information (e.g. the department he/she works for) or to select on multiple option the respective questionnaire that matches him/her more suitably.

Before, during and/or after the respondent 10 fills the audit questionnaire a communication link (not shown) may be established between the respondent 10 and the data protection officer 70. The communication link may be established via telephone, chat messages, email or in-person. The communication link may allow the respondent 10 to be advised and clarified for any unclarities he/she may have on topics dealt in the questionnaire. The respondent 10 may also be trained prior to the respondent 10 filling the questionnaire. Training may be carried out in-person or via remote connections and/or can be facilitated by video or step-by-step tutorials.

After finishing the questionnaire, the data gathered can be processed. Audit logs can be generated that can comprise reports, such as documentation report 210, recommendation report 230, priority report 250 and/or general report 270 (see FIGS. 5a, 5b, 6a, 6b). The audit logs may be sent to the respondent 10 and/or to corresponding staff of the company 50.

During the filling of the questionnaire the respondent 10 may be prompted to provide basic of personal information, such as: name, surname, role, department etc. The data protection officer 70 may review the data entered by the respondent 10 and the respondent 10 can be notified that the data protection officer 70 is reviewing his/her data and can be contacted to clarifies queries. Prior to the respondent 10 filling the questionnaire the respondent 10 can be presented, read, sign and upload a certificate of appointment. When the respondent 10 has filled out the forms of every process of an area, he can arrange an appointment with his/her data protection officer 70. After the appointment the data protection officer 70 can complete the data of the respondent 10 and in case of no errors can approve them. The respondent 10 can get a "tag", that states, that he/she finished the audit-questionnaire, which can be advantageous to keep track of the respondents that conducted the questionnaire. The respondent 10 can download reports that document the data he/she was prompted and provided. The respondent 10 can get a "tag" stating that he downloaded document reports. The respondent 10 can be scheduled after a period of time, such as 6 months, to review and update his/her data. Thus, the data for the respondent 10 can be kept up-to-date and can better reflect the reality at a point in time.

FIG. 8 schematically depicts the structure of a questionnaire configured for assessing the data security of a firm. More specifically, FIG. 8 depicts an audit 80 or questionnaire 80 configured for assessing data security of a firm.

The audit 80 can comprise multiple sections 82, also referred as processes 82. In FIG. 8 sections are referred with the number 82 followed by a letter. Each section 82 comprises at least one question 110 or prompt 110. Preferably a section 82 comprises questions 110 that belong to the same category or questions 110 that relate to the same or similar topics. For example, the audit 80 depicted in FIG. 8 comprises 8 exemplary sections, more particularly:

- a basic information section 82A, that comprises prompts 110 prompting basic information input 120 from the user 10. For example, questions 110 that belong to the basic information section 82A may ask the respondent 10 to input his/her name, surname, age, education, job type, position;
- a technical-organizational measures (TOM) section 82B that comprises questions 110 prompting the user to input information related to different technical-organizational aspects of the respective firm;
- department specific sections 82C-82H, wherein each section 82C to 82H comprises questions 110 related to a specific department of the company or specific topic, such as the core processes section 82C, the sales department section 82D, finance department section 82H, personal data section 82F, IT and security section 82G, marketing department section 82H.

A user 10 may be required to respond to prompts 110 from at least one of the sections of the audit 80. For example, a respondent 10 may respond to questions on the basic information section 82A and TOM section 82B and at least one of the department specific sections 82C to 82H. A respondent 10 may select or may be provided with at least one of the department specific sections 82C to 82H based on the department or type of job he/she works for. For example, an employee in the sales department may be asked to respond to questions 110 from the sales department while another employee working in HR (i.e. human relation) department may be asked to answer questions 110 from a HR section (not shown). Hence, different users 10 may be provided with different questions 110.

As discussed, each section 82 comprises at least one prompt 110. As depicted in structure of processes 84 in FIG. 8, questions 110 of a section 82 or process 82 may be grouped in questions groups 841. In general, a question group 841 may comprise any number of questions 110 or prompts 110 and a section 82 may comprise any number of question groups 841. The question groups 841 may allow a better organization of the questions 110.

The structure of each question 110 (also discussed in FIG. 1) is further provided in the structure of question 86, in FIG. 8. As depicted, a question 110 may comprise an information request section 112 and an answer section 114. The question example "question 1" comprises two possible answers 114, "answer 1" and "answer 2". Furthermore, each answer 114 comprises a follow-up action 1141. That is, the respective answer 114 may activate or trigger a certain follow-up action 1141. For example, an answer 114 when selected or input by the user 10 may trigger an audit report follow-up action 1141 that can document the answer 114 in the documentation report 210 and/or generate a recommendation based on the answer 114 on the recommendation report 230 and/or assign a priority indicator such as a rank to the generated recommendation in a prioritization report 250. While above it was described that the answer, the respective recommendation and prioritization of recommendation are generated in different reports, it should be understood that they can also be generated in a single general report. In another example, an answer 114 may trigger a respective follow-up-question action 1141. That is, if an answer 114 is selected or input by the user 10, then the triggered follow-up-question action 1141 can allow another question, that can be specified by the follow-up-question action 1141 to be output to the respondent 10.

That is, in very general words and with general reference to FIG. 1, embodiments of the present technology relate to interactive questionnaires.

In simple words, questions 110 are output to a user 10 by using a user terminal 30 (see FIG. 2). The user 10 answers these questions 110, i.e., inputs respective information into the user terminal 30. It will be understood that questions 110 should not only be understood to refer to questions in the literal sense (e.g., "How many employees do work in your firm?"), but also other information that prompts a user to input such information (e.g., "Number of employees:").

The answers 120 of the user 10 are processed by the present technology. Based on the answers of the user, an answer report 210 (which may also be referred to as a documentation report 210) and a recommendation report 230 are provided.

The documentation report 210 summarizes findings based on the answers. In the embodiments discussed in conjunction with FIGS. 5a and 5b, the answer or documentation reports 210 always included the individual questions. However, it will be understood that this is not necessary. It may be sufficient to only include data relating to the answers of the questions in the documentation report 210, e.g., it may be sufficient to include an information "Number of employee: 230" in the documentation report 210, without including the question therein. That is, according to a first aspect, the present technology may automatically generate a documentation report 210 based on the answers of the user.

Further, the present technology may also provide recommendations to the user, e.g., by providing a recommendation report 210. That is, based on the answers of the user, the present technology may provide such recommendations. Consider, e.g., the case that the present technology is used for an assessment of the data security of a firm. Exemplary questions may then be "Do you use an external cloud provider for personal data?" and (if this question is answered in the affirmative) "Which external cloud provider do you us for personal data?". Depending on the answers to such questions, the present technology may provide recommendations to the user.

E.g., some external cloud providers may operate in places having another jurisdiction than the firm as regards personal data and it may not be legal for a firm to use such as an external cloud provider for personal data. Thus, a recommendation may be "Do not use the external cloud provider A.".

Further, the recommendations provided to the user 10 may be prioritized. In some embodiments, this may be done by a separate priority report 250 (see FIG. 1). However, in other embodiments, this may not be done with a separate report, but the prioritization may be included in the recommendation report 230. I.e., the recommendation report 230 may include a ranking or another indication of their relative priorities.

That is, in general words, embodiments of the present technology use user answers to a questionnaire as an input to automatically generate a documentation report 210 and a recommendation report 230, and the recommendations in the recommendation report 230 may be prioritized (e.g., ranked).

Further, the discussed embodiments of the present technology may not only use the user answers to generate the documentation report 210 and the recommendation report 230, but may also utilize background data 130, particularly for providing the recommendations.

It will be understood that the recommendations provided in the recommendation report 230 typically do not only depend on the answers provided by the user, but also on additional data, which may be referred to as background data 130 (see FIG. 1).

Consider again the case of data privacy, and the above discussed questions of "Do you use an external cloud provider for personal data?" and (if this question is answered in the affirmative)

"Which external cloud provider do you us for personal data?". If the user answers these questions with: "Yes" and "External cloud provider A", the recommendation "Do not use external cloud provider A." typically depends on a multitude of different aspects, which may include the following:

Legal aspects: As an initial matter, whether or not the "external cloud provider A" may be used may depend on legal aspects. That is, there may be a rule prohibiting providers under certain circumstances to be used for handling personal data.

Factual aspects: Further, there may also be some "real world" facts involved in this assessment. For example, the location of the external cloud provider and/or certain technical standard (e.g., with regard to encryption) they guarantee.

Generally, it will be understood that such legal and factual aspects may also interact with one another, e.g., the final recommendation may depend on both. As a mere example, consider again the usage of "an external cloud provider A" for storing personal data.

The question whether or not discontinuing this may generally depend on a law, or an interpretation of a law. Consider, e.g., the case that a law stipulates that an external cloud provider can only be used if the same or equivalent form of data security laws apply in this country. To arrive at a recommendation, the following aspects may be of relevance: (1) Location of the firm for which the questionnaire is completed; (2) place of business and location of the servers for external cloud provider A; (3) are data security laws in these places equivalent with the location of the firm.

Such background data may be used by the present technology to arrive at recommendations for the user.

Further, it will be understood that the recommendations may also vary over time. That is, the embodiments of the present technology may not only be static, but may change their recommendations dynamically over time. Put differently, when answering the questionnaire at two different instances in time, the recommendations may be different from one another, as the background data may have changed.

In the above example, it will be understood that, e.g., in case the external cloud provider adds a location for their servers, this may change the assessment of whether or not it is recommendable to use their services. Similar considerations may apply, e.g., with regard to encryption that is used (e.g., an encryption method that was sufficient and recommendable 2 years ago may no longer be recommendable). Thus, the same set of answers provided by the user may lead to different recommendations, depending on the background data, which may change over time.

Further still, it should also be understood that in some embodiments of the present technology, more than one user may answer questions relating to a single questionnaire.

Consider again the use case of a data security questionnaire. Such a questionnaire may include questions to be answered by different users. For example, such a questionnaire may comprise a question (i) "Do you save personal data of job applicants on an external cloud?" and a question (ii) "Do you save personal data relating to customers on an external cloud?". It may be possible that question (i) is answered by a person in the HR department, while question (ii) is answered by a person in the sales department.

While the above is merely exemplary, it should be understood that the present technology may generally display different questions of the same questionnaire to different users, i.e., it may restrict access to certain questions depending on the position of a user.

Figure 9A:
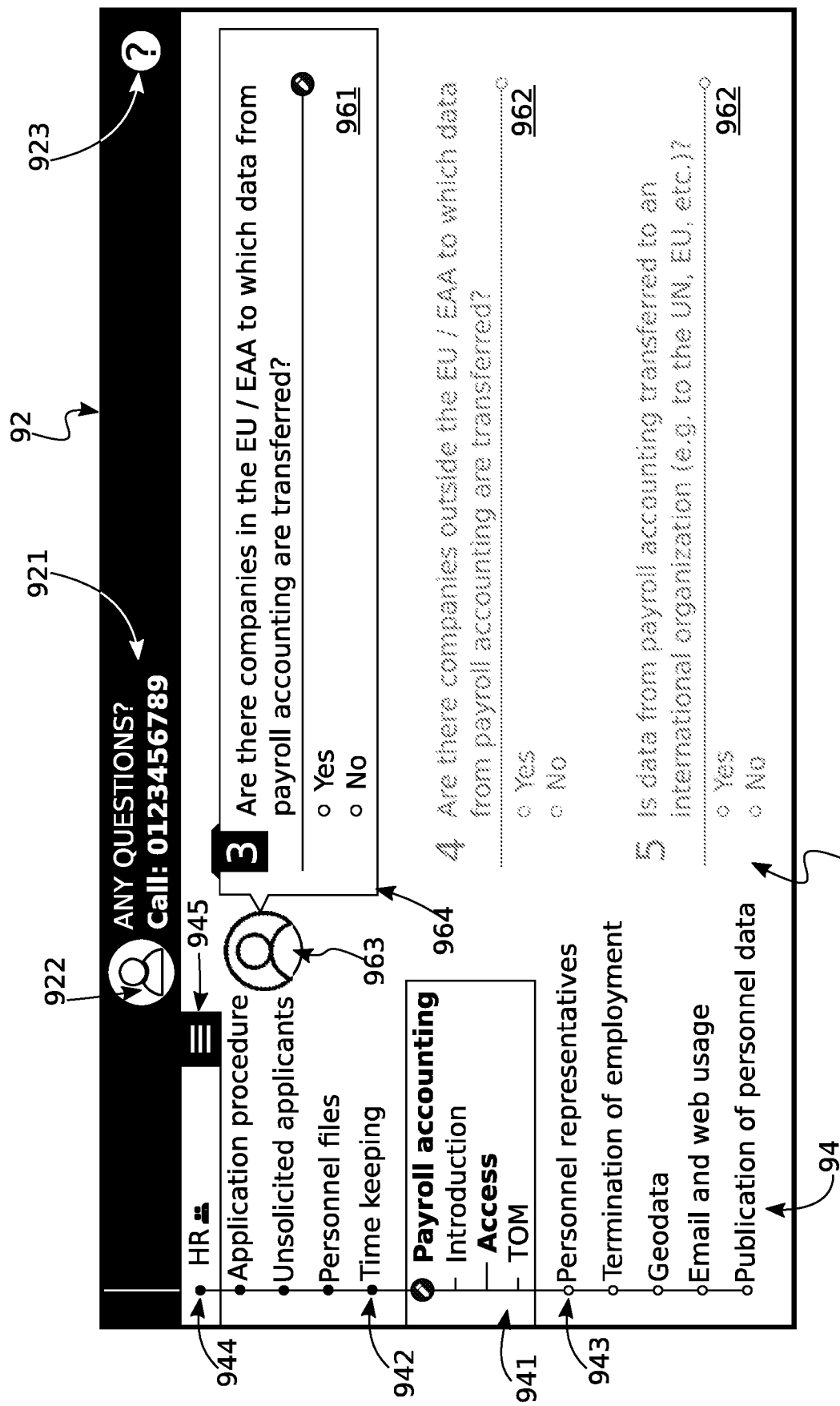
FIG. 9a provides a view of a questionnaire configured for the assessment of the data security of a company.
Figure 9B:
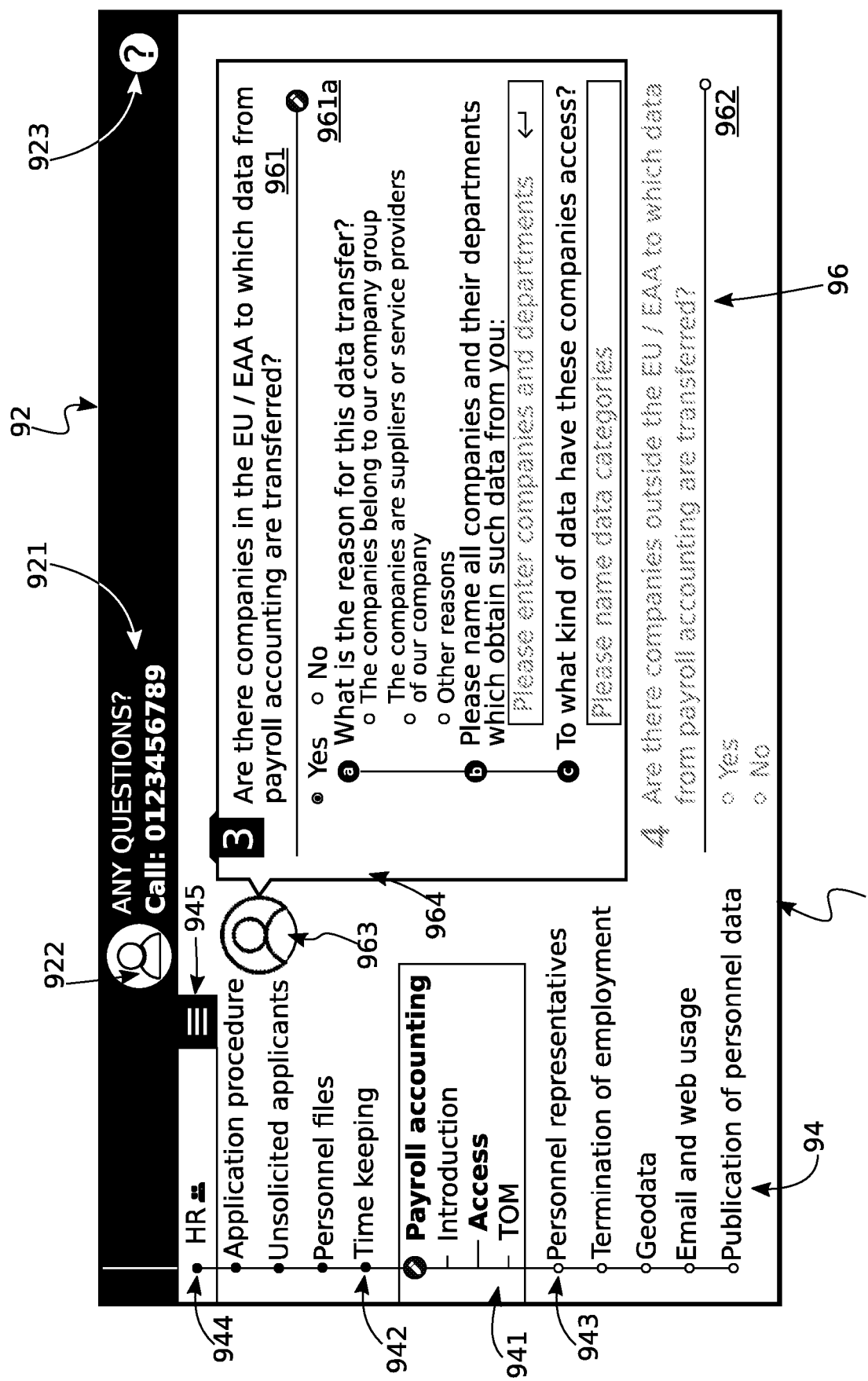
FIG. 9b provides another view of a questionnaire configured for the assessment of the data security of a company.

FIGS. 9a and 9b depict a view of an interactive questionnaire. More particularly, in FIGS. 9a and 9b a questionnaire page 90 is depicted. The questionnaire page 90 is what is provided to a user or respondent 10 during the filling of a questionnaire by the user 10. For example, the questionnaire page 90 can be a graphical user interface 90 that can facilitate the filling of the questionnaire by the user 10 on a terminal such as a desktop or mobile computer.

The questionnaire page 90 can comprise of a header section 92, navigation section 94 and a questionnaire filling section 96. As depicted in FIGS. 9a and 9b, the header section 92 can be positioned on top of the questionnaire page 90, the navigation section 94 may be positioned on the side of the questionnaire page 90, such as, on the left side and the rest of the questionnaire page 90 may comprise the questionnaire filling section 96 which also comprises the main and most part of the questionnaire page 90.

The header section 92 can comprise a different color from the rest of the questionnaire page 90, to distinct it. The header section 92 can comprise contact information field 921. The contact information field 921 may comprise information to establish a communication link with a skilled person or operator of the questionnaire, such as a human operator 70 (see FIG. 7). For example, in the instance wherein the questionnaire targets the evaluation of data protection policies in a company, the human operator 70 may be a person skilled in this art, such as, a data protection officer 70. The contact information field 921 may comprise a phone number (as depicted in the figure), an email, link to a chat line, or other means of contact. The contact information field 921, may allow the user 10 to contact a human operator 70 in case of confusion or need for help. For example, a term or a question in the questionnaire may not be clear to the user 10. The contact information field 921 provides contact information of a skilled person, which the user 10 can ask for additional clarifications.

Further, the header section 92 can comprise a photo 922 and the name (not shown) of the trained person. This may make it easier for the user 10 to communicate with the trained person in case of questions—as the user 10 gets familiar with the name and look of the trained person they can communicate with.

Further still, the header section 92 may comprise a help menu button 923. The help menu button 923 may open, if clicked, a help menu. The help menu can provide additional information regarding the questionnaire. The help menu can also provide instructions on how to fill the questionnaire and how to navigate and understand the different question types and sections it may comprise.

The navigation section 94 can facilitate the navigation of the user 10 through different sections of the questionnaire. That is, the navigation section 94 may comprise a list of different question topics or groups. As discussed in FIG. 8, questions 110 of a questionnaire may be grouped in question groups 841. The grouping of questions 110 may be done on different criteria, such as, based on the topic of the questions 110—i.e. questions 110 addressing the same topic can form a question group 841. Such question groups, denoted by a short description, may be provided on the navigation section 94, for example, the "Application procedure" or the "Publication of personal data question group".

Further, the navigation section 94 can be configured to depict progress status—i.e. how much of the questionnaire is filled or not. For example, as can be depicted in FIGS. 9*a* and 9*b*, question groups can be associated with a circle sign adjacent to them. A filled circle 942 can depict that the questions in that question group are already filled or answered by user 10. A non-filled circle 943 can depict that the questions in that question group are not addressed yet. Current question group 941 can also be highlighted. For example, it can be surrounded by a border and adjacent to the title of the question group a "pencil" sign may be provided indicating the question group is in progress of being filled.

Further still, the navigation section 94 can be configured to depict a respective category 944 which category the user 10 is part of. For example, the category field 944 may depict the profession of the user 10 or the department the user 10 works in (depicted in FIGS. 9*a* and 9*b*). Different users 10 may be provided with different questionnaires. That is, the questionnaires can be configured, such that, they are adapted to a specific category the user 10 is part of. For example, in a questionnaire addressing data protection policies of a company the categories 944 may comprise the departments of the company, such as, human resources (HR), marketing etc. Users 10 from the HR department can be presented with questions related to how they store or process data of the employees or applicants while users 10 from marketing may be presented with questions on how they store or process personal data of customers. It may not be ideal to ask users from HR department on how customer data are stored or processed but rather it can be more rational to ask users from marketing department, which can have more knowledge in this regard. Hence, adapting questionnaires, based on user categories may be more efficient and the gathered information from the users 10 may be more accurate—as each user 10 provides information regarding his/her activities.

A button 945 may be provided in the navigation section which, when clicked, may show the different categories 944, hence allowing the user 10 to select the category 944 he/she belong to.

The questionnaire filling section 96 can be configured for facilitating the user 10 to answer questions of the questionnaire. The questionnaire filling section 96 may provide to the user the current questions that are in the progress of filling and also the next questions that are to be filled by the user 10. The current questions, such as, the current independent question 961 can be highlighted. As depicted in FIGS. 9*a* and 9*b*, the current question can be highlighted by surrounding it with a chat box 964. In contrary, the future questions 962 can be made less visible or may not be highlighted, such that to increase visibility of the current question 961.

As it can be noticed in FIG. 9*b*, the user 10 after providing the answer "Yes" to the current question 961 (i.e. question 3 of the provided questionnaire) further dependent questions 961*a* can be made visible to the respondent 10. The dependent questions 961*a* can be provided inside the chat box 964—the chat box 964 can be adapted to surround the current independent questions 961 and the current independent questions 961*a*—such that, the current dependent questions 961*a* can be highlighted.

Further, the questionnaire filling section 96 can comprise a photo or emoji 963. The photo 963 may comprise a photo of a contact person of the user 10 (e.g., a trained data protection officer responsible for the user).

In others words, in embodiments of the present technology, the questionnaire is displayed to the user 10 by the terminal 30 (e.g., a computer or laptop) in a chat like fashion. In particular, a currently active question may be displayed to the user in a chat box 964 and may be associated with a photograph 963, e.g., with a photograph of a data protection officer. This may provide a more chat like appearance of the present technology and may motivate the user to answer the questionnaire. Further, the above described features may focus the user's attention to the current question and may thus increase the quality with which the questionnaire is being filled out. It may thus ultimately improve compliance and may lead to the questionnaire being filled out more rapidly and thus efficiently.

Generally, it will be understood that embodiments of the present technology allow the questionnaire to be loaded locally, i.e., on a user terminal 30. That is, the complete questionnaire with all its nodes may be locally stored on the user terminal 30, however, only the nodes of importance to the user (e.g., depending on previous user answers) may be displayed to the user. Thus, the questionnaire may be filled out locally, without the need to constantly communicate data between the user terminal 30 and the server 40. This may reduce potential time delays and may render the present technology more time efficient.

Figure 10:
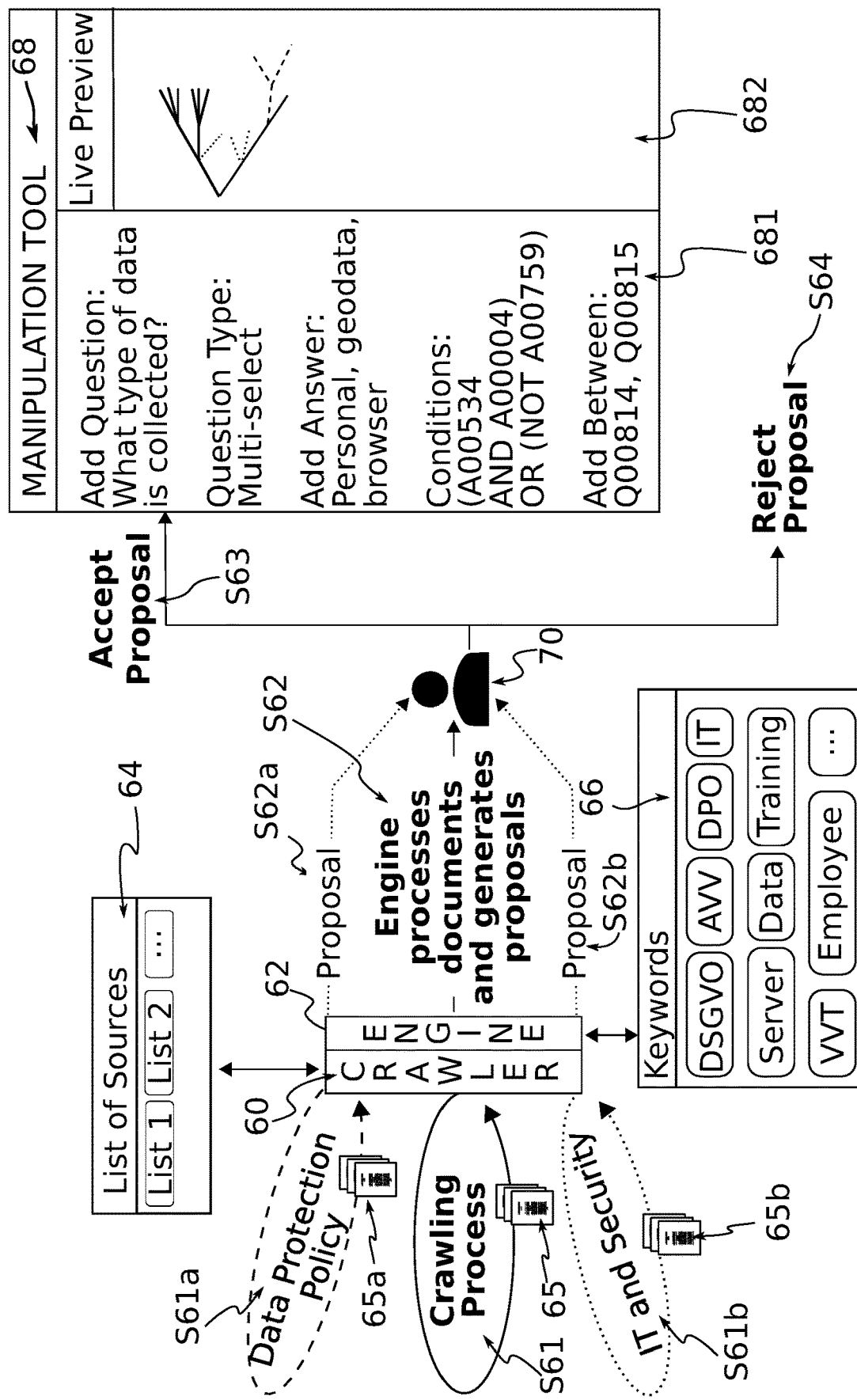
FIG. 10 depicts a method configured for updating background data related to an interactive questionnaire.

In FIG. 10, an embodiment of a method of updating the background data 130 and an interactive questionnaire is provided. As discussed, with reference to FIG. 1, a data processing device 20 can be configured to execute an interactive questionnaire. Among others, as discussed, the data processing device 20 can be configured to provide recommendations 230 based on the user answers 120, as well as prioritize the recommendations on a priority report 250 (which can be embedded on the recommendation report 230 or in a general report comprising a summary of user answers 120, recommendations 230 and prioritization of recommendations 250).

Background data 130 (see FIG. 1) may reflect the state of the art on the topic of the interactive questionnaire carried out by the data processing device 20. New developments on the art, such as, new laws or regulations that take effect, may make the background data 130 outdated. As the background data 130 can be used to provide recommendations 230, outdated background data 130 can provide incorrect recommendations 230 or recommendations 230 that do not suggest the best course of actions or may not provide recommendations 230 when it may be required to. Thus, keeping background data 130 up-to-date with the state of the art may contribute on a better accuracy of the provision of recommendations 230.

Updating background data 130 may be associated with a research process, wherein the corresponding art is searched for new developments. For example, an expert in the field (e.g., in the field of data protection) may have to address a list of sources, usually trusted sources, such as, books, journals, or electronic sources, such as, websites. For example, in the field of data privacy, a data protection officer may conduct such research on the field of data privacy and may update his knowledge and/or the background data 130, if he can find new developments. However, this process, wherein an expert researches state of the art for new developments, is usually an exhaustive process for the person doing the research. It may also be an inefficient process, especially when the number of sources wherein information can be found is large. Hence, new updates may be missed.

The increase of electronic sources can make information accessible to data processing devices. Hence, it can be advantageous to automate the process of researching for new developments by configuring hardware and software resources to search for new developments. The method provided in FIG. 10 provides a method for using hardware and software resources for automating said research process.

A crawler 60, also referred as a crawler data processing device 60, may be provided. The crawler 60, also referred as web crawler or spider, may be a software application configured for carrying out an automated task, which task can comprise browsing the World Wide Web and searching for information. The crawler 60 can be configured to browse a list of sources or web pages for the purpose of identifying or finding targeted information.

The list of sources can be provided by the sources data structure 64. The sources data structure 64 may comprise a list of web pages, e.g. a list of URL-s of web pages. The sources data structure 64 may comprise one list of sources or the sources may be organized on several lists. The crawler 60 can be configured to access the sources provided in the sources data structure 64. Further, the crawler 60 can be configured to obtain or download information provided by the sources 64.

Thus, in a step S61, the crawling process S61 can be executed. The crawling process S61 comprises the crawler 60 accessing the electronic sources provided in the list of sources 64 and downloading information 65, preferably in the form of text, from the sources 64. The downloaded content 65 can be stored in a memory (not shown). For example, the crawling process S61*a* is an example of a crawling process S61 with the topic of data protection policy. Of course, the crawling process S61 or the crawler 60 are not "aware" of the specific topic the crawling process is being conducted. However, the topic may be configured by configuring the list of sources 64. That is, an operator can create one or more lists of sources 64 that provide information regarding a specific topic, such as, the data protection policy. Consequently, the downloaded content 65*a* relate to the topic of data protection policy. Similarly, a crawling process S61*b* can be conducted for the topic of IT and security and the downloaded content 65*b* relate to IT and security. Different topics may be provided by organizing the sources in respective lists. For example, in FIG. 10, "List 1" in the list of sources 64 may comprise the list of sources regarding data protection policy and "List 2" may comprise the list of sources regarding IT and security. Hence, the data protection policy crawling process S61*a* can be configured to use "List 1" as list of sources and IT and security crawling process S61*b* can be configured to use "List 2". Thus, crawling processes S61 for specific processes can run in independent manners, which can be executed also on parallel, e.g. through respective threads. Nevertheless, a single crawling process can be configured to use both "List 1" and "List 2" as list of sources 64 hence searching for both topics together.

Further, the list of sources 64 may be a list, a queue or an ordered (priority) queue. In the later data structure mentioned, the sources provided in the list of sources 64 can be ordered or prioritized such that the crawler accesses the sources according to the order or the crawler 60 downloads can be allowed to download more content or spend more time crawling sources with a higher priority.

Additionally, a search engine 62 or engine 62 can be provided. The engine 62 can be configured to search for specific content. The content can be specified in the form of keywords 66. The keywords 66 can comprise a list of keywords that the search engine 62 can be requested to search for. The search engine 62 ca be configured to access the downloaded content 65, which can be obtained in the crawling process S61 and searching for information in the downloaded content 65, which information is specified by the keywords in the list of keywords 66.

Thus, in a step S62, the engine can process downloaded contents 65. As information comprised in the downloaded content 65 may be unorganized or with a large content or part of it may be irrelevant, it can be efficient to organize or narrow or filter the information comprised in the downloaded content 65 to relevant content. Hence, keywords 66 can be provided to the engine 62, which can be used to search for information comprising keywords 66. Keywords 66 can be configured or constructed to describe relevant or desired information. For example, keywords "DPO", "protection", "data", "policy", "law", "regulation", "employee", "personal", "company" may describe information regarding data protection policies related to personal information of employees in a company. In another example, keywords "server", "security", "high", "breach", "privacy" may be used to search for information regarding security of servers.

Further, in step S62, the engine may be configured to configure the information it can retrieve based on keywords 66 in the form of update proposals. Hence, for example, in step S62*a* the engine 62 can generate update proposals related to data protection policies by processing the downloaded content 65*a* obtained during the data protection policy crawling process S61*a*. Similarly, in step S62*b* the engine 62 can generate update proposals related to IT and security by processing the downloaded content 65*b* obtained during the IT and security crawling process S61*a*.

For example, using keywords "server", "security", "high", "low", "safe", "unsafe" "breach", "privacy", "protocol" to process downloaded documents 65b, engine may recognize sentences, such as, "Server X is recently updated with new high security protocol". Though, the engine 62 may not "know" the meaning of the sentence, it can infer that the sentence comprises relevant information as it contains multiple keywords the engine 62 is configured to search for. Hence, the engine 62 may generate an update proposal based on the sentence.

As engine 62 may not understand the true meaning of sentences stated in human-readable form, it can be advantageous that they are presented to a human operator 70 before doing an action based on the update proposals. Thus, further in step S62, the generated update proposals are presented to a human operator 70. For example, the human operator 70 may be a data protection officer 70. The human operator 70 can further judge on the relevancy of the update proposals and on the actions following the update proposals.

That is, the human operator 70 may accept the update proposals, in a step S63. For example, the human operator may accept the update proposal "Server X is recently updated with new high security protocol" by adding Server X to a list of safe services contained in the background data 130—however, it will be understood that it is also possible that the engine suggests such an update and that only the respective update is the approved by the human operator. That is, the human operator 70 upon acceptance of update proposals in step S63, may update the background data 130 and/or the interactive questionnaire. This process can be facilitated by a manipulation tool 68 which can guide the human operator through the process of updating the update the background data 130 and/or the interactive questionnaire. The manipulation tool 68 can be a graphical user interface that can be run on a terminal or computer. The manipulation tool 68 can comprise an editing section 681, wherein the human operator 70 updates the background data 130 and/or the interactive questionnaire. Additionally, the manipulation tool 68 can comprise a live previewer 682, which can depict, in live time, as the changes are made in the editing section 681, the updates and changes to the background data 130 and/or the interactive questionnaire. For example, the updates and changes done in the decision tree(s) of the interactive questionnaire can be depicted graphically in the live previewer section 682.

The manual changes, i.e. changes done manually by a human operator 70, required such that the interactive questionnaire and the background data 130 reflect the new updates can be minimized. Continuing the above example with server X, only the addition of server X on a list of trusted servers may be manually performed by the human operator 70. This action may trigger automatic actions that update Boolean expression and decision tree(s) regarding server security. For example, addition of server X in the list of trusted servers can allow the data processing device 20 (see FIG. 1) to recommend the use of server X in a recommendation report 230, without the human operator directly manipulating the recommendations that can be provided or the Boolean expressions regarding recommendations.

However, the human operator 70, in a step S64, may determine to reject the received update proposals. That is, the update proposals received from the engine 62 may not be considered and hence may not trigger changes on the background data 130 and/or the interactive questionnaire.

That is, a human operator as discussed may receive at least one update proposal, said update proposal being generated by the engine 62 in a step S62. The human operator 70 may either accept the at least one provided update proposal in a step S63 or may reject the at least one provided update proposal in a step S64—i.e. only one of the steps S63 or S64 may be executed for an update proposal. Accepting an update proposal in step S63 can trigger updates and changes to the background data 130 and/or the interactive questionnaire, as discussed. In contrary, rejection of an update proposal, in step S64, can discard the update proposal and thus no changes can be made to the interactive questionnaire and/or the background data 130.

That is, in other words, embodiments of the present technology may also allow, e.g., the generated recommendations to be updated automatically or at least partially automatically. To do that, a crawler 60 may crawl relevant sources, e.g., web pages, that may be specified on a list of sources 64. In case the questionnaire is used for data protection purposes, the sources to be crawled may be, e.g., government-based websites (e.g., in Germany the website of the BSI, i.e., the governmental office for security in the information technology). Such sources may be "crawled" to determine changes (e.g., additions to the source or amendments to the sources).

Such changes may lead to changes in the recommendations. In a first embodiment, a human operator 70 may be notified as regards the changes in the sources. The human operator 70 may then trigger the changes in the recommendations (i.e., rules on the recommendations depending on user answers). In a second embodiment, the engine 62 may itself suggest changes to relations (and thus recommendations) in the questionnaire, which may then be reviewed and approved by the human operator 70. It will be understood that in the latter case, artificial intelligence functionality may be used to translate the changes in the sources to changes in the recommendations.

Figure 11:
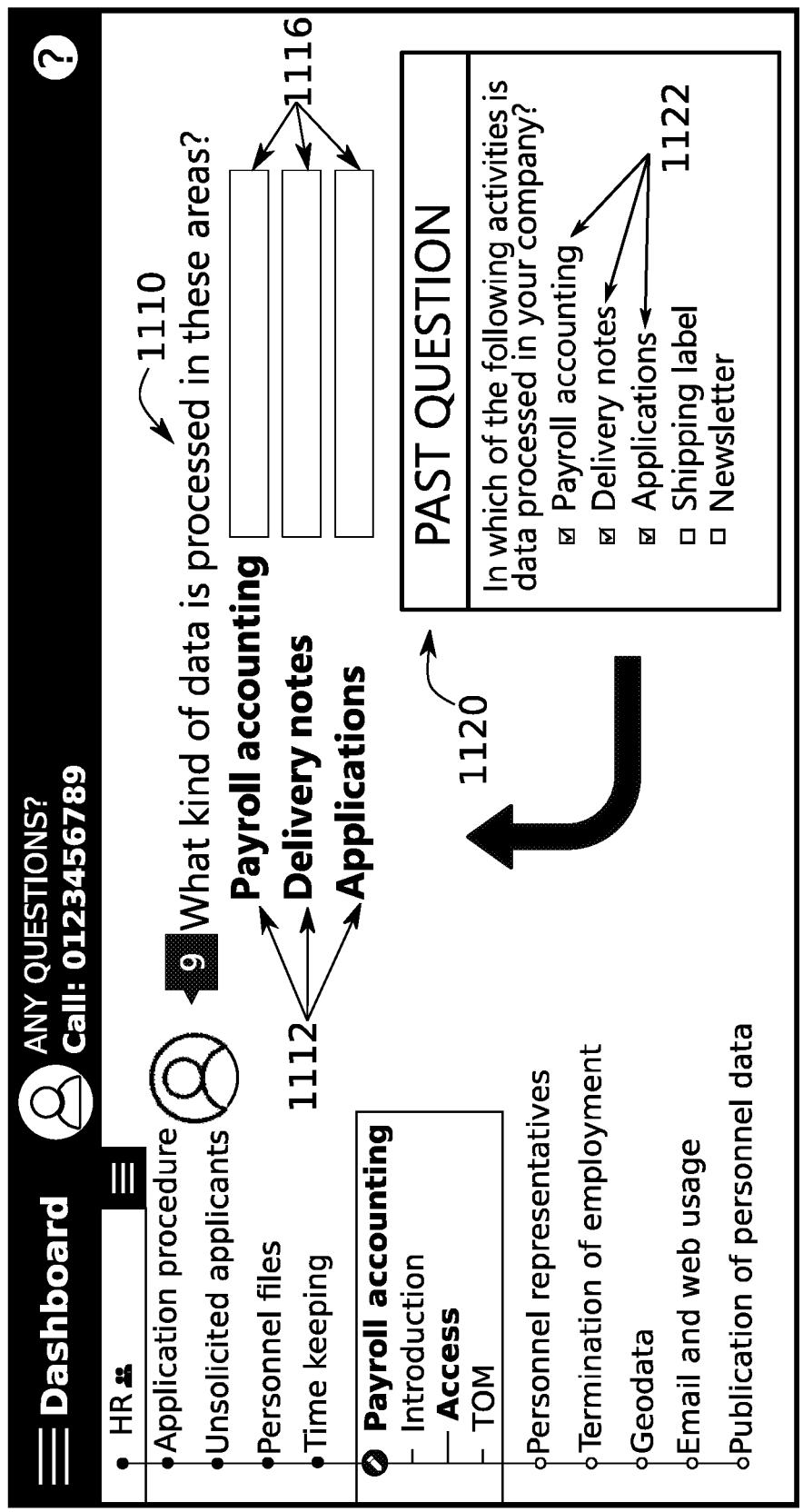
FIG. 11 depicts an example of a preselected question type.

FIG. 11 depicts an example of a preselected question type 1110. As discussed at least one prompt 110 can be output to the user 10. The at least one prompt may be of different types, such as, a preselected question type 1110, an example of which is depicted in FIG. 11.

The preselected question 1110, can be of at least one of the following question types: single select questions, multiple select questions, text input questions and document upload questions. Based on the type of the preselected question 1110 it can comprise at least one answer choice and/or at least one text input field and/or at least one document upload field. In FIG. 11, as an example, a preselected question 1110 of the text input question type is depicted, hence it comprises the text input fields 1116. That is, the user 10 may respond to the preselected question type 1110 depicted in FIG. 11 by inputting text on the text input fields 1116. Further each text input field 1116 is labelled by a label 1112 which provides further clarifications to the user 10 on the required information.

In the preselected questions 1110 the answer choices, text input fields (such as, a label of the text input field) and/or document upload fields (such as, a label of the document upload field) can be selected based on an answer choice of at least one previous question. Illustrated in FIG. 11, for example, the text input fields 1116 and labels 1112 can be generated based on the selected answers of a past question 1120. As it can be noticed the selected answers 1122 of the past question 1120 match the labels 1112 of the text input fields 1116.

The at least one previous or past question 1120 can be of at least one of the following types: single select question; multi select question; text input question; multiple text input question; and object select question.

In FIG. 11, the past question 1120 is made visible too, when the preselected question 1110 is output to the user. It should be noted that the past question 1120 is output in FIG. 11 to make the illustration better. The past question 1120 may or may not be made visible when the preselected question 1110 is output to the user 10.

In other words, a question of the preselected question type is "built" based on the answer of a previous or past question. In the present example, the past question 120 was a multi-select question, where the user could select from the answer choices "Payroll accounting", "Delivery notes", "Applications", "Shipping label", and "Newsletter". The user selected the answers 1122 "Payroll accounting", "Delivery notes", "Applications" in the present example. As discussed, in some embodiments the previous question 1120 on which the preselected question is built may be displayed. However, in other embodiments, the previous question may not be displayed simultaneously with the preselected question.

The preselected question 1110 and/or the labels 1112 are typically based on the answers of the previous or past question 1120. That is, in the present example, the labels 1112 and text input fields 1116 are based on the answers provided to the past question 1120.

In the present example, the user may thus add the text inputs for the preselected question 1110.

The past question 1120 can also be referred to as the previous question or the source question for the preselected question. In the above example, the past or source question 1120 was a multiple select question. However, it will be understood that the source question can also be a single select question, a text input question, a multiple text input question, or an object select question.

Further, in the above, the preselected question 1110 was embodied as a text input question. However, it will be understood that the preselected question 1110 can also be a single select question, a multi select question, or a document upload question.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

LIST OF ELEMENTS

1 System configured for interactive questionnaire with server
2 System configured for interactive questionnaire without server
3 System configured for an assessment of the data security of a firm
10 Respondent/User
20 Data Processing Device
30 Terminal
   31 Display
   32 Camera
   33 Keyboard
   34 Pointing Device
   35 Speaker
   36 Microphone
40 Server
   1340 Upload Connection (Terminal-Server)
   1430 Download Connection (Server-Terminal)
   1500 Control Data
50 Client Company
60 Crawler
   62 Search Engine
   64 List of Web Pages to crawl
   65 Obtained documents
   66 Keywords
   68 Manipulation Tool
      681 Questionnaire Editor
      682 Live Editing Previewer
   S61 Crawling Process
      S61a Crawling Example: Data Protection
      S61a Crawling Example: IT and Security
   S62 Proposal Generation Process
      S62a Proposal Example: Data Protection
      S62b Proposal Example: IT and Security
   S63 DPO accepts proposal
   S64 DPO rejects proposal
70 Data Protection Officer
80 Audit
   82 Audit Sections
   84 Structure of a section/process
   86 Structure of a question
   841 Question Groups
   1141 Follow-up-action
90 Questionnaire Page
   92 Header Section
      921 Contact Info
      922 DPO's Photo
      923 Help Menu Button
   94 Navigation Section
      941 Current Question Group
      942 Filled Question Group
      943 Unfilled Question Group
      944 Department
      945 Department Menu
   96 Questionnaire Filling Section
      961 Current Independent Question
      961a Current Dependent Question
      962 Future Question
      963 Photo
      964 Chat box
110 Question/Prompt
   112 Information request section
   114 User answer section
   1110 Preselected question
   1112 Labels of preselected questions
   1116 Text input field of preselected questions
   1120 Past Question
   1122 Selected answers of past questions
120 User Answer/Information Input
   122 Commands
   130 Background Data 210 Answer Report/Documentation Report
211 Title Field
213 Answer Field
215 Question Field
230 Recommendation Report
231 Title Field
233 Answer Field
235 Question Field
250 Priority Report
251 Title Field
253 Answer Field
255 Question Field
270 General Report
271 Title Field
273 Answer Field
274 Recommendation Field
275 Question Field
276 Priority Field Interactive Questionnaire Execution Steps 320 Transmit question to user
310 Transmit user answer to data processing device
350 Transmit report/recommendation/prioritization to user
311 User comprehend and answers
321 Generate next question
325 Generate "General" Report
327 Generate "General" Recommendations
329 Generate "General" Priority
335 Generate "Singe Question" Report
337 Generate "Singe Question" Recommendations
339 Generate "Singe Question" Priority Question Generation Process Steps 400 Start
401 Initialize "Question Bank" list
403 Initialize "User Answer" list
405 "Current Question"="First Question"
407 Wait for "user answer" of "Current Question"
409 Add "user answer" to "User Answer" list
411 Are there still questions left in the "Question Bank"?
413 "Current Question"=Next question in the "Question Bank" list
415 Is "Current Question" in correspondence with "User Answer" list?
450 End Question Generation Process Elements 461 Question Bank
462 User Answer
463 Current Question

What is claimed is:

1. A method for generating reports related to a firm's data security assessment, the method comprising
outputting a prompt prompting at least one user to input at least one information input;
receiving the at least one information input by the at least one user;
processing the at least one information input and in response thereto, automatically generating both a documentation report and a recommendation report; and
outputting the documentation report and the recommendation report;
wherein a user terminal outputs the prompt prompting the at least one user to input at least one information input, and the user terminal receives the at least one information input by the at least one user, and further wherein a data processing unit processes the at least one information input and generates the documentation report and the recommendation report based on the at least one information input, wherein the data processing unit is a server external to the user terminal;
wherein the step of generating a recommendation report comprises processing background data, wherein the background data (a) relates to one or more of legal documents, interpretation of said legal documents and state of the art, and (b) is time dependent such that the same information input at different times leads to different recommendations;
wherein the documentation report comprises information reflective of the information input by the at least one user, in response to the prompt;
wherein the recommendation report comprises a plurality of recommendations to bring the firm into data security compliance, and wherein the method further comprises prioritizing the recommendations and outputting the prioritization of the recommendations;
wherein the step of prioritizing the recommendations is performed by the data processing unit;
wherein the step of prioritizing the recommendations is based on background data, wherein the background data is time dependent such that the same information input at different times leads to different prioritization of recommendations; and
the method further comprising:
updating the background data with a web crawler visiting at least one electronic source and obtaining one or more of updated legal documents, updated interpretations of legal documents and updated state of the art; and
processing the obtained data of the electronic sources and generating at least one update proposal, the update proposal concerning at least one rule for generating the recommendation report based on the at least information input;
wherein the step of generating at least one update proposal comprises searching for the presence of at least one keyword on the obtained data of the electronic sources.

2. The method according to claim 1, wherein the method comprises outputting a plurality of prompts each prompting the at least one user to input at least one information input, wherein the method further comprises, for at least one prompt of the plurality of prompts, determining whether the prompt is output to the at least one user, wherein this determination depends on at least one information input by the at least one user, wherein the user terminal performs the determination.

3. The method according to claim 2, wherein the plurality of prompts are comprised in a questionnaire, wherein the method comprises locally storing the questionnaire on the user terminal.

4. The method according to claim 2,
wherein the step of outputting a prompt comprises:
outputting a first prompt set comprising a plurality of prompts to a first user using a first user profile, and
outputting a second prompt set comprising a plurality of prompts to a second user using a second user profile;
wherein the step of receiving at least one information input comprises:

receiving a first information input set comprising a plurality of information inputs by the first user using the first user profile, and receiving a second information input set comprising a plurality of information inputs by the second user using the second user profile;

and wherein the documentation report and the recommendation report are based on both the first information input set and the second information input set.

5. The method according to claim 1, wherein the prompt is output as part of a questionnaire page, wherein the questionnaire page comprises a photo of a human operator and a chat-box surrounding the prompt, and wherein the human operator and the at least one user are different persons.

6. The method according to claim 1, wherein the step of prioritizing the recommendations comprises assigning a rank to each recommendation.

7. The method according to claim 1, wherein the step of processing the at least one information input and generating a documentation report and a recommendation report based on the at least one information input comprises utilizing an artificial neural network algorithm.

8. The method according to claim 1, wherein the method further comprises grouping a plurality of prompts in sections, wherein each section comprises at least one prompt related to a department of the firm and wherein the user chooses a section based on the department of the firm the user works for.

9. The method according to claim 1, wherein the updated state of the art comprises an updated list of safe servers for storing the firm's data.

10. The method according to claim 1, wherein the legal documents to which the background data relates, comprises one or more of regulations, rules, orders, directives, acts, laws, requirements and guidelines.

11. A system configured for generating reports related to a firm's data security assessment, the system comprising:

a user terminal configured to output a prompt prompting at least one user to input at least one information input and to receive the at least one information input by the at least one user;

a data processing unit configured to process the at least one information input and in response thereto, automatically generate both a documentation report and a recommendation report;

an output user interface configured to output the documentation report and the recommendation report; and wherein the data processing unit is further configured to process background data to generate the recommendation report; and wherein the documentation comprises information reflective of information input by the at least one user, in response to the prompt;

wherein the recommendation report comprises a plurality of recommendations to bring the firm into data security compliance, and the data processing device is further configured to prioritize the recommendations based on background data;

wherein the output user interface is configured to output the prioritization of the recommendations; and wherein the system further comprises:

a crawler data processing device comprising a web crawler configured to visit at least one electronic source and obtain updated data security information therefrom, the updated data security information including one or more of updated legal documents, updated interpretations of legal documents and updated state of the art; and a search engine configured to access the updated data security information obtained by the web crawler and search for the presence of at least one provided keyword with the updated data security information, wherein the search engine is configured to generate at least one update proposal for display to a human operator to facilitate an update to the background data; and wherein the human operator and the at least one user are different persons.

12. The system according to claim 11, wherein the data processing unit is a server external to the user terminal.

13. The system according to claim 11, wherein the user terminal comprises at least one of: screen, speaker, smart speaker, printer, fax and wherein the user terminal further comprises an input user interface, such as, at least one of: keyboard, pointing device, microphone, smart speaker, camera, scanner, data uploading means.

14. The system according to claim 11, wherein the background data is time dependent such that the same information input at different times leads to different recommendations and prioritization of recommendations.

15. The system according to claim 11, wherein the user terminal is configured to output a plurality of prompts each prompting the at least one user to input at least one information input, and wherein the user terminal is further configured to determine for at least one prompt of the plurality of prompts whether the prompt is output to the at least one user based on at least one information input by the at least one user.

16. The system according to claim 15, wherein the plurality of prompts is comprised in a questionnaire.

17. The system according to claim 11, wherein the updated state of the art comprises an updated list of safe servers for storing the firm's data.

18. The system according to claim 11, wherein the legal documents to which the background data relates, comprises one or more of regulations, rules, orders, directives, acts, laws, requirements and guidelines.

* * * * *